United States Patent [19]

Goldman et al.

[11] 3,810,107

[45] May 7, 1974

[54] ELECTRONIC TEXT DISPLAY AND PROCESSING SYSTEM

[75] Inventors: Arnold J. Goldman; Stephen L. Kurtin, both of Sherman Oaks; Carver A. Mead, Pasadena, all of Calif.

[73] Assignee: Lexitron Corporation, Chatsworth, Calif.

[22] Filed: Jan. 18, 1973

[21] Appl. No.: 324,776

[52] U.S. Cl. .............................................. 340/172.5

[51] Int. Cl. ....................... G06k 15/02, G06k 15/20

[58] Field of Search .................................. 340/172.5

[56] References Cited

UNITED STATES PATENTS

| | | | |
|---|---|---|---|
| 3,648,271 | 3/1972 | McConnell et al. | 340/172.5 |
| 3,706,075 | 12/1972 | Fredrickson et al. | 340/172.5 |
| 3,501,746 | 3/1970 | Vosbury | 340/172.5 |
| 3,454,929 | 7/1969 | Hynes et al. | 340/172.5 |
| 3,610,902 | 10/1971 | Rahenkamp et al. | 340/172.5 |
| 3,540,012 | 11/1970 | Ehrman | 340/172.5 |
| 3,714,636 | 1/1973 | Manly | 340/172.5 |
| 3,618,032 | 11/1971 | Goldsberry et al. | 340/172.5 |

*Primary Examiner*—Paul J. Henon
*Assistant Examiner*—Paul R. Woods

[57] ABSTRACT

An electronic test display and processing system having a display, a memory, and a manually operable data and control function entry device for interactive text processing by an operator via a keyboard whereby text entered on the display is modifiable under the control of the operator. By utilization of a position indicator or cursor which is positionable by the operator on the display screen at the desired position with respect to the text the operator can perform text editing functions such as adding a character, deleting a character, adding or deleting a line of text, selecting a block of text from the display for deletion or insertion into another page of text displayed on the screen, or erasing text.

The text editing functions are accomplished by means of a processor receiving commands indicative of operator action as well as commands indicative of internal signals generated in proper time sequence to perform the functions selected by the operator. The memory includes a display memory capable of storing information in coded form for displaying a full "page" of text; a character buffer for storing information indicative of two characters within a line of text, the two characters being the character currently being displayed as well as the character previously displayed; and a line buffer capable of storing two of the lines of textual information, one line being the line of text currently being displayed while the other line is the line of text previously displayed. Multiplexing and data selection means are provided for sequentially reconfiguring the flow of information through the various storage means within the memory to accomplish the text editing functions.

15 Claims, 88 Drawing Figures

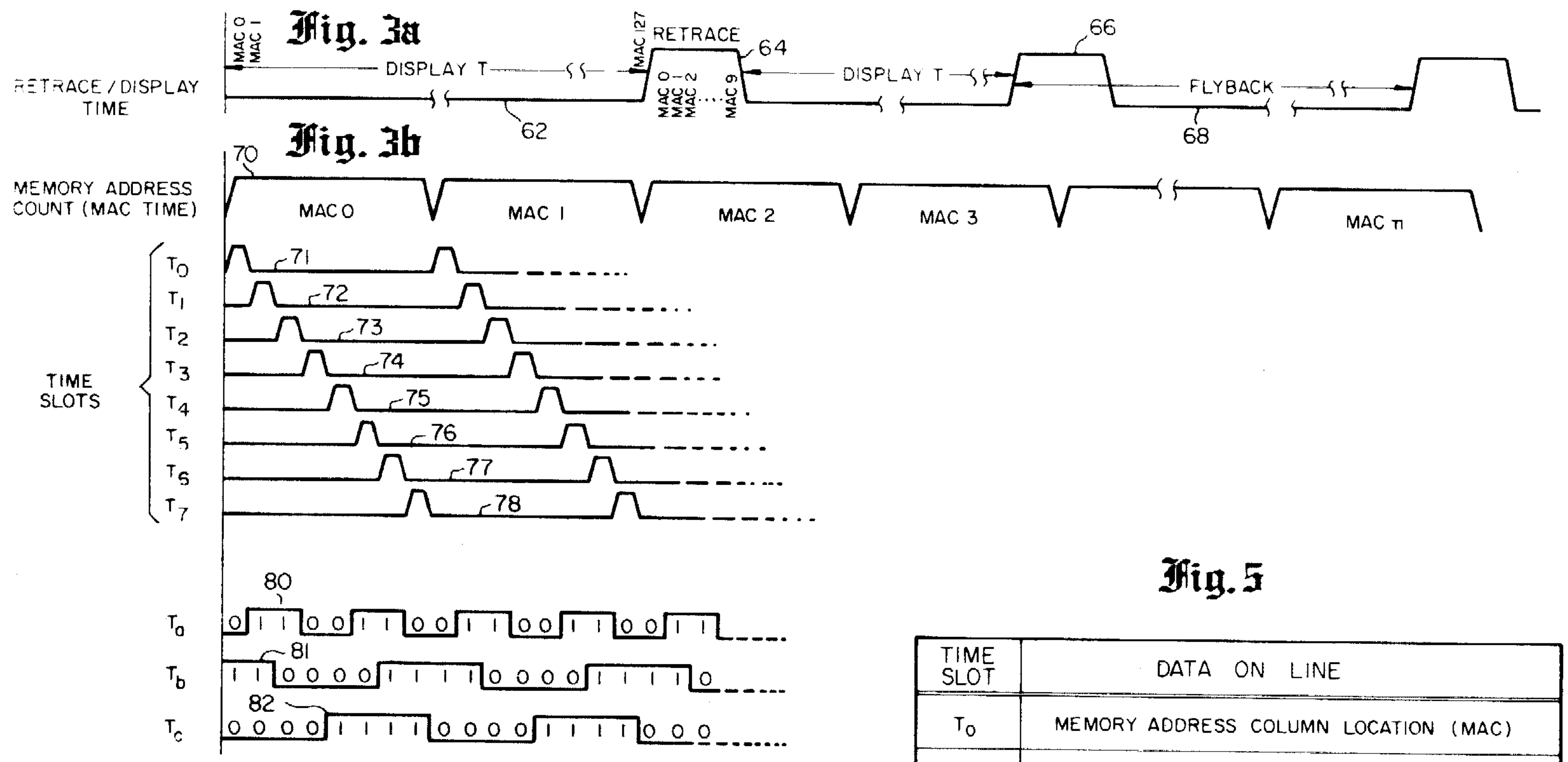
Fig. 3a, Fig. 3b
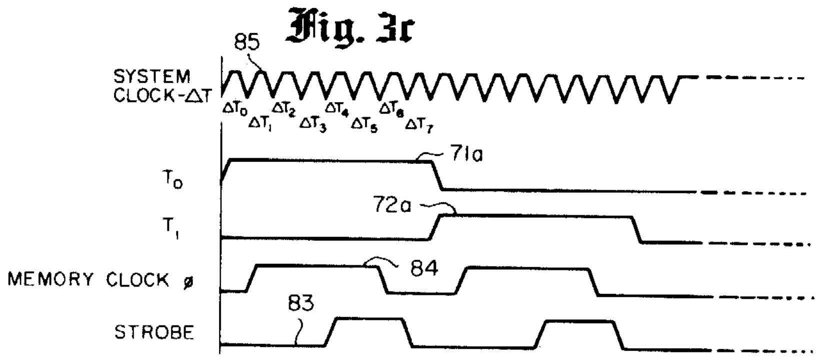
Fig. 3c
Fig. 5
| TIME SLOT | DATA ON LINE |
|---|---|
| $T_0$ | MEMORY ADDRESS COLUMN LOCATION (MAC) |
| $T_1$ | (READ FROM) DISPLAY MEMORY OUTPUT ON LINE |
| $T_2$ | (READ FROM) BUFFER MEMORY OUTPUT ON LINE |
| $T_3$ | WRITE INTO DISPLAY MEMORY PRESENT MEMORY LOCATION |
| $T_4$ | WRITE INTO DISPLAY MEMORY PAST MEMORY LOCATION |
| $T_5$ | |
| $T_6$ | |
| $T_7$ | CARD TO CARD TRANSFERS |

Fig. 9a

| SPECIAL CONTROL AND INDICATOR BUS | | | | | | | | |
|---|---|---|---|---|---|---|---|---|
| DISPLAY TIME | | | | | | | | |
| PIN NO | $T_0$ | $T_1$ | $T_2$ | $T_3$ | $T_4$ | $T_5$ | $T_6$ | $T_7$ |
| 39 | | | "BEGIN SELECT" INDICATOR | WRITE INTO PRESENT MEMORY LOCATION | WRITE INTO PAST MEMORY LOCATION | | | WRITE INTO THE ADDRESS MEMORY COMMAND |
| 41 | ERASE INDICATOR | HYPHEN CODE IS ON DATA BUS | BLANK LINE INDICATOR | HYPHEN IS BEING WRITTEN INDICATOR | "END SELECT" INDICATOR | LOAD COLUMN CURSOR | | LOAD COLUMN CURSOR |
| 45 | | BURIED CONTINUE WORD INDICATOR | INCREMENT/ DECREMENT UNIT SPACE COUNTER | JUSTIFY COMMAND | DECREMENT ROW CURSOR | INCREMENT ROW CURSOR | | INCREMENT ROW CURSOR |
| 46 | | CONTINUE WORD INDICATOR | BLINK DISPLAY | CONTINUE WORD INDICATOR | DECREMENT ROW CURSOR | INCREMENT COLUMN CURSOR | CLEAR COLUMN CURSOR TO ZERO | INCREMENT COLUMN CURSOR |
| 49 | | BACK SPACE INDICATOR | MEMORY ADDRESS COUNT EQUALS ZERO | HOLD ON LINE | PRESENT LINE IS FOLLOWED BY A LINE | | | INHIBIT DISPLAY |
| 50 | RIGHT HAND LIMIT AT END OF JUSTIFY ZONE | NON-DISPL CHAR INDICATOR | CHARACTER INDICATOR | JUSTIFY F/F CONTROL | END OF PARAGRAPH | AT RIGHT HAND MARGIN (LOCK KEYBOARD) | UNIT SPACE COUNT EQUALS 288 UNS | |
| 51 | EDIT/ MERGE BUSY | ACTIVE BLANK INDICATOR | ACTIVE BLANK INDICATOR | ACTIVE BLANK INDICATOR | PROTECT INDICATOR | END PROTECT INDICATOR | INHIBIT KEYBOARD | CHAR ADD INDICATOR |
| 52 | MEMORY BUSY | NUL BLANK INDICATOR | NON DISPLAYABLE CHAR INDICATOR | LEFT HAND MARGIN INDICATOR | C STROBE INDICATOR | INHIBIT CLEAN-UP CARD | AUTO-MARGIN JUSTIFY | CHAR DELETE INDICATOR |

Fig. 9b

SPECIAL CONTROL AND INDICATOR BUS

RETRACE · $\overline{\text{FLYBACK}}$

| PIN NO. | MAC 1 | MAC 2 | MAC 3 | OTHER |
|---|---|---|---|---|
| 39 | | INHIBIT ROW ADD ($T_2$)<br>MEMORY LINE 0 ($T_4$) | | |
| 41 | END MEMORY LINE 59 ($T_4$) | MEMORY LINE 59 ($T_4$) | ACTIVATE HYPHEN LIGHT CONTROL<br>RET·FLY·MAC 3·$T_3$ | INHIBIT ERASE<br>RET·$\overline{\text{FLY}}$·MAC4,$T_3$ |
| 45 | | RECIRCULATE LOWER BUFFER FOR ONE LINE ($T_6$) | | |
| 46 | | TOGGLE UPPER AND LOWER BUFFER ($T_6$) | | |
| 49 | RING THE BELL SIGNAL ($T_2$) | DISPLAY VERTICAL MARGIN ($T_1$)<br>LOWER VERTICAL MARGIN DISPLAY MEMORY ($T_6$) | | INHIBIT ROW COUNT INDICATOR MAC 0·$T_7$ |
| 50 | END OF DISPLAYABLE REGION ($T_1$) | TERM CLEAN-UP MERGE ($T_2$)<br>UPPER VERTICAL MARGIN DISPLAY MEMORY ($T_6$) | | |
| 51 | | | | |
| 52 | MEMORY BUSY ($T_0$) → (through OTHER) | C STROBE IND ($T_4$)<br>CURSOR LINE 59 ($T_5$)<br>LINE 58 IND ($T_6$) | ROW DELETE ($T_3$) | |

Fig. 9c

| SPECIAL CONTROL AND INDICATOR BUS | | | | |
|---|---|---|---|---|
| RETRACE · FLYBACK | | | | |
| PIN NO | MAC 1 | MAC 2 | MAC 3 | OTHER |
| 39 | | INHIBIT ROW ADD ($T_2$) | PRINTER BUSY ($T_3$) | AUTO MARGIN MAC9·$T_2$ PRINT BUSY MAC 9·$T_3$ |
| 41 | INHIBIT ROLL-UP ($T_2$) | INHIBIT TAPE COMMAND ($T_1$) INHIBIT TAPE AFTER READING PAGE ($T_5$) RESET TAPE INHIBIT ($T_7$) | TAPE BUSY ($T_3$) TAPE WRITING ($T_5$) | |
| 45 | | I UNIT CHAR DELETE FROM KYBD· ($T_3$) DISPLAY DEC TAB + INHIBIT OVERSTRIKE ($T_5$) | | INCR. ROW CURSOR W/PLATEN MAC9·$T_2$ DECREMENT ROW CURSOR W/PLATEN MAC9·$T_4$ RESET COL TO ZERO MAC9·$T_5$ RESET ROW CURSOR (O) MAC9·$T_6$ RESET ROW CURSOR (58) MAC9·$T_7$ |
| 46 | | I UNIT CHAR ADD FROM KEYBD ($T_3$) | | |
| 49 | RING THE BELL SIGNAL ($T_2$) | C STROBE IND. ($T_3$) | | |
| 50 | | TERMINATE CLEAN-UP MERGE ($T_2$) BACKSPACE INDICATOR ($T_3$) | | LOAD ROW CURSOR MAC9·$T_3$ SPACING BETWEEN LINES MAC O·$T_2$ |
| 51 | EDIT ($T_1$) SELECT TEXT ($T_2$) | SPACE BAR INDICATOR ($T_3$) | VERT MARGIN SET ($T_2$) MERGE TEXT ($T_6$) PRINT ($T_7$) | |
| 52 | MEMORY BUSY ($T_0$) → DEC TAB SET ($T_2$) | CHAR IND ($T_3$) | DON'T ISSUE COMMAND ($T_3$) | |

Fig. 10

| TRANS NO. | TRANS-MITTING CARD | RECEIVING CARD | COMMAND OR DATA | COMMAND ON PIN NO. | COMMENT |
|---|---|---|---|---|---|
| I | ANY CARD | MEMORY CARD | CHARACTER ADD | C PIN 1 ($T_7$) | AFTER ADDRESSING THE MEMORY |
| II | ANY CARD | MEMORY CARD | CHARACTER DELETE | C PIN 2 ($T_7$) | AFTER ADDRESSING THE MEMORY |
| III | ANY CARD | MEMORY CARD | CHARACTER DOUBLE DELETE | C PIN 3 ($T_7$) | AFTER ADDRESSING THE MEMORY |
| IV | ANY CARD | MEMORY CARD | ROW ADD | C PIN 5 ($T_7$) | AFTER ADDRESSING THE MEMORY |
| V | ANY CARD | COMMUNICATIONS BUS | ROW DELETE | MAC3 · RETRACE $\overline{\text{FLYBACK}}$ · C PIN 52 · $T_5$ | |
| VI | ANY CARD | MEMORY CARD | INITIATE SHIFT DOWN | C PIN 55 ($T_5$) | AFTER ADDRESSING THE MEMORY |
| VII | ANY CARD | MEMORY CARD | SHIFT DOWN STEP LOWER BUFFER COMMAND | C PIN 55 ($T_5$) | AFTER ADDRESSING THE MEMORY FOLLOWING THE INITATE SHIFT DOWN COMMAND |
| VIII | ANY CARD | MEMORY CARD | INITATE SHIFT OF COMMAND | C PIN 57 ($T_5$) | AFTER ADDRESSING THE MEMORY |
| IX | ANY CARD | MEMORY CARD | SHIFT UP STOP LOWER BUFFER COMMAND | C PIN 56 ($T_7$) | AFTER ADDRESSING THE MEMORY FOLLOWING THE INITIATE SHIFT UP COMMAND |

ELECTRONIC TEXT DISPLAY AND PROCESSING SYSTEM

BACKGROUND OF THE INVENTION

This invention relates to Electronic Text Display and Processing Systems and particularly to an information processing system having a manually operable keyboard, a processor, a display, and a memory. The keyboard is utilized to enter into the system information indicative of characters to be displayed or text manipulation functions desired by the operator.

In sub-systems for processing information indicative of textual material the characters that are entered by the operator are either typed directly on a sheet of paper or onto a display tube for operator viewing. Simultaneously, the coded information relating to the character or function is stored in a memory, a magnetic card, a magnetic tape, or other suitable recording media. Information so recorded is then subsequently available upon command of the operator for further utilization such as adding characters, deleting characters, inserting words, etc. In systems of the type having a display tube for operator viewing of the character or text entered, a position indicator or cursor is provided on the display tube to provide a visual means for the operator to identify the precise location on a display tube where operator action is occurring. The cursor is generally under the control of the operator and is positionable on the display tube by the operator. The cursor location is used to address the display and memory associated therewith to effect the changes required in the memory based on operator action.

In prior art systems of this type a central processor is usually employed which processor is programmed to initiate certain actions in response to certain input signals dependent upon the program used. If a certain text manipulation or text editing function is desired in some cases the program has to be changed or instructions have to be written into the computer to perform the desired function. In most such systems the text editing capabilities are limited to simple text manipulation functions such as character add, character delete, character erase or the like. Often times the memory employed to store a page of text is a one line recirculating memory which requires changes in memory addressing if the text is shifted up or down on the display tube by the operator.

SUMMARY OF THE INVENTION

The present invention is an Electronic Text Display and Processing System having a display and manually operable keyboard for entering information indicative of text to be displayed or functions to be performed on the text so displayed. The system includes six operational systems which are keyboard, display, processor, magnetic tape unit, printer, and memory. The memory includes a main memory and a buffer memory each of which is line organized containing 60 lines with each line capable of storing 128 characters (displayable or non-displayable) of textual information of 8 bits per character. The memory further includes a character buffer having the capability of storing the character under consideration in a given line of text as well as the character previously on line while the line buffer is capable of storing two lines of textual information such as the line of text currently under consideration as well as the line of text previously displayed. All textual information entered by means of the keyboard whether displayable (character, underline, etc.) or non-displayable (space, carriage return, etc.) is directed by the processor to the memory and is therefrom displayed. The text actually enters the display or main memory where a given line of memory represents a given row of text on the display screen. The information from the display memory is serially transferred from a given line into an upper line buffer (one line of storage in the line buffer) and from there into an on-line register (one character storage of the character buffer) from which the display is enabled to display a character at a time. The information is then transferred to a previous position register (one character storage of the character buffer) from where it is simultaneously returned to the display memory as well as being transferred to a lower line buffer (one line of storage in the line buffer) where the character information is serially "dumped" after the lower line buffer is filled with the 128 character capacity. The memory is further provided with multiplexing means and data select means to reconfigure the flow of information to and from the main memory; to and from the line buffers; as well as to and from the buffer memory. The data select means and multiplexing means are sequentially activated in response to selection by the operator of the desired text manipulation function, with the sequencing being subsequently determined by event recognition within the system. In the sequencing of the various sub-systems of the memory the contents of the upper and lower line buffers can be completely interchanged or "toggled" on command of one of the subsystems.

Accordingly, it is an object of this invention to provide a new and improved electronic text display and processing system.

It is another object of this invention to provide a new and improved electronic text processing system having the capability of reconfiguring the flow of information through the memory to accomplish text manipulation functions.

It is a further object of this invention to provide an electronic text processing system having means for selecting a block of displayed text which block of text can be further acted upon such as by insertion into another location within the text, deletion or erasure.

BRIEF DESCRIPTION OF THE DRAWINGS

These and other objects, features and advantages of the present invention will be better understood with reference to the following detailed description when taken in conjunction with the drawings, in which:

FIGS. 3*a* through 3*c* graphically illustrate system timing;

FIG. 6 shows in tabular form the time slot and information transferred over the data bus during flyback and retrace;

FIGS. 9a through 9c show in tabular form the information transfer over the special control and indicator bus;

FIG. 10 shows in tabular form the sub-system to subsystem data transfers;

DESCRIPTION OF THE PREFERRED EMBODIMENT

Figure 1:
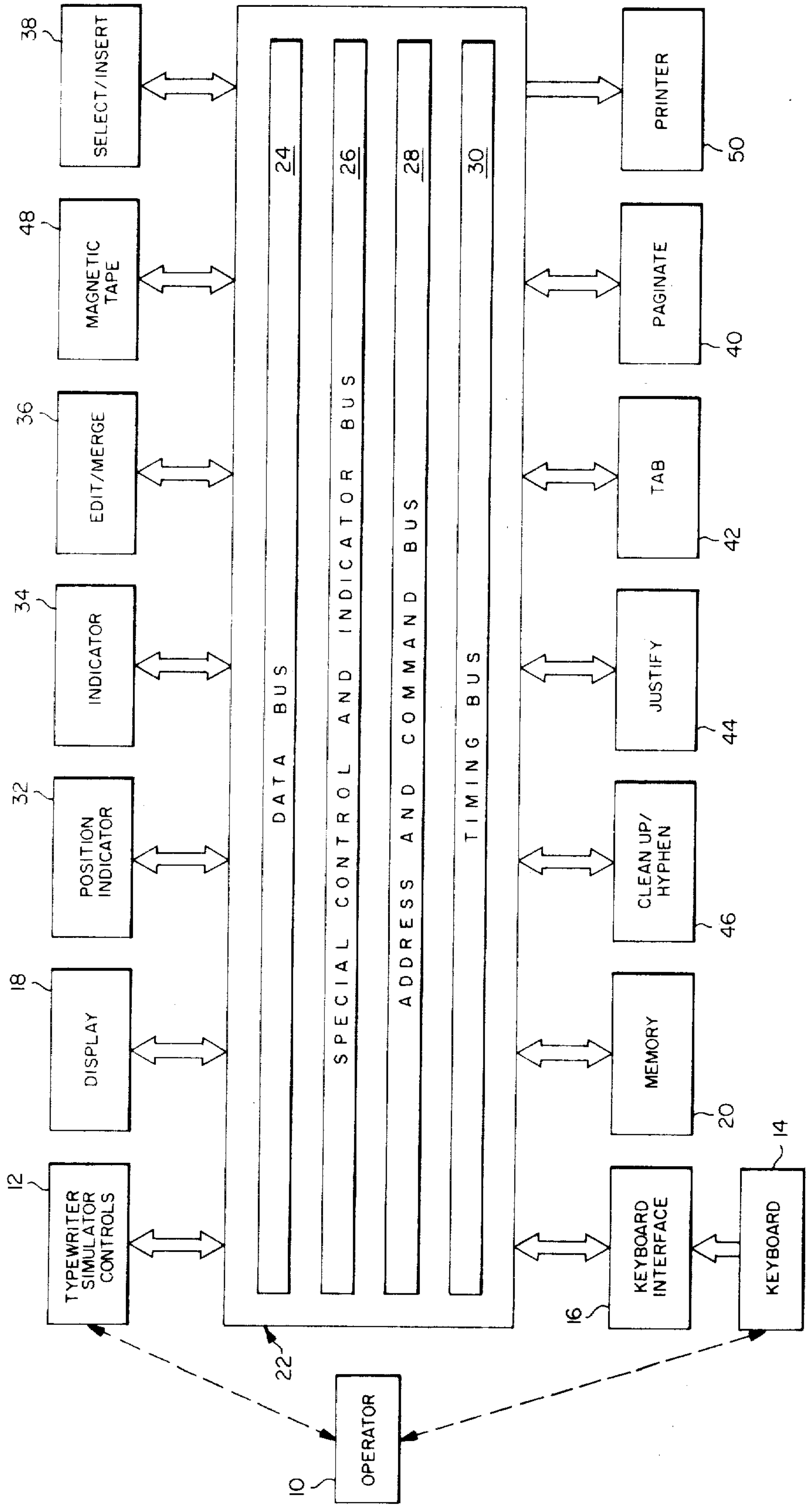
FIG. 1 is a functional block diagram of a system according to the present invention.

Referring now to the drawings, and particularly to FIG. 1, there is shown an information processing system wherein an operator or typist can interact with the typewriter simulated controls 12 and a keyboard 14 to enter data through the keyboard interface 16 to the memory 20 and then to the display 18 for viewing. The text information entered into the memory 20 is then available for further processing or the generation of signals relating to character sequence occurrences necessary to perform text manipulation functions. Data transfer between sub-system occurs over a communications bus 22 which includes a data bus 24, a special control and indicator bus 26, an address and command bus 28 and a timing bus 30. The communications bus 22 is also coupled to a position indicator sub-system 32 to receive information indicative of the operator action and provide information to the communications bus 22 indicative of upper and lower and left hand margin displayable limits on display 18 as well as information correlating cursor position with memory location. Also connected to the communications bus 22 are text manipulation sub-systems such as indicator sub-system 34 Edit/Merge sub-system 36, Select/Insert sub-system 44, Cleanup/Hyphen sub-system 46, as well as Input/Output (I/O) Magnetic Tape sub-system 48 and Printer Output sub-system 50.

Figure 2:
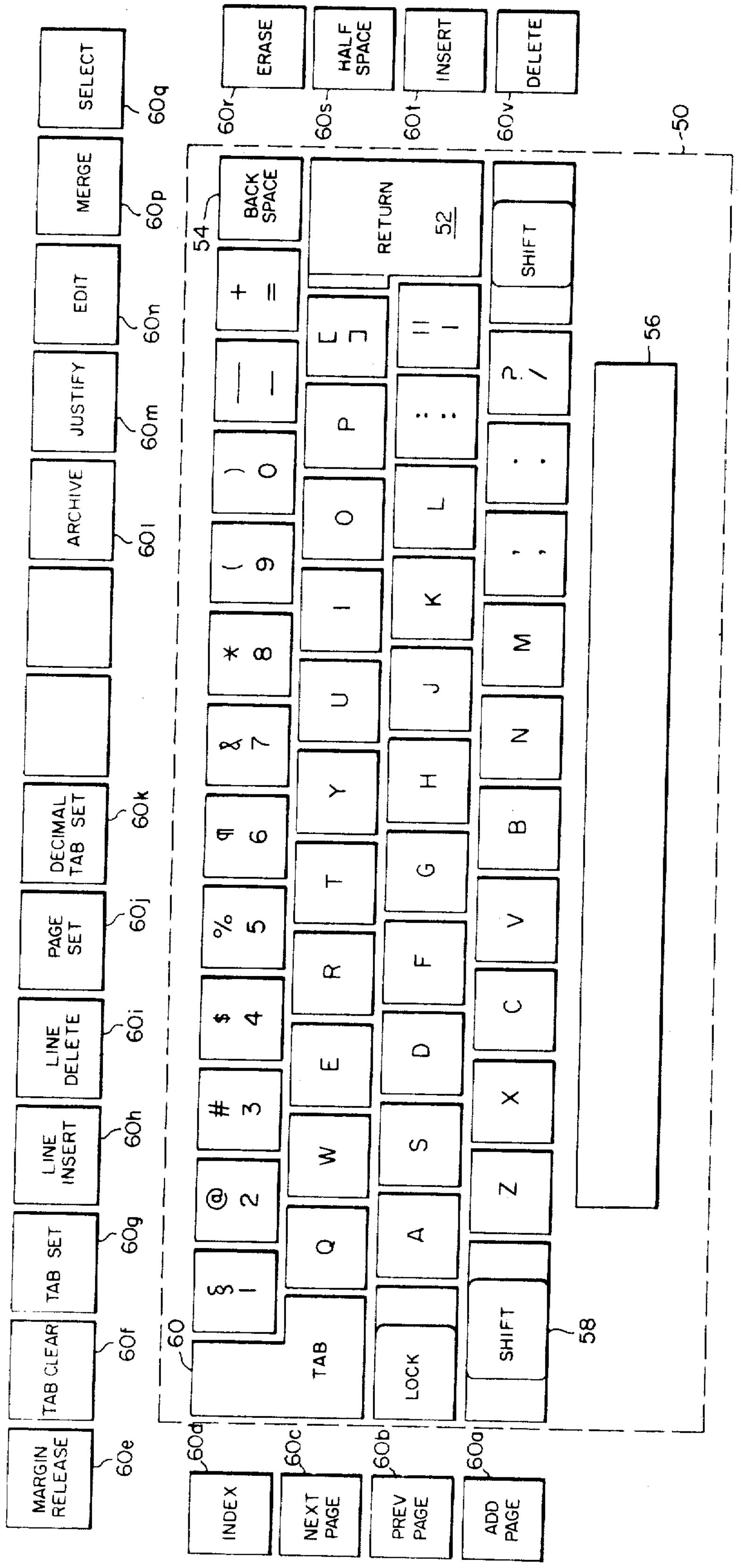
FIG. 2 is a plan view of the keyboard utilized in the system of FIG. 1.

In the systems of the type shown in FIG. 1, the operator 10 enters information into the system by means of a keyboard 14 which, as shown in FIG. 2, has a central keyboard cluster 50 containing alpha-numeric characters as well as the normal function keys of a standard typewriter keyboard, such as carriage return 52, backspace key 54, space bar 56, shift 58, and tab 60. Arranged around the central keyboard cluster 50 are a plurality of function keys **60*a*–60*n*, 60*p*–60*t* and 60*v*. The output of the alpha numeric keys of the central keyboard cluster 50 is in the form of electronic signals representing, in coded form, textual information. The outputs of the text editing and manipulating function keys as well as the space bar 56 and other function switches of the keyboard cluster 50**, likewise are electronic signals which are interpreted by the sub-systems to initiate and control the various functions, including editing and manipulating of text desired without requiring the operator to perform or know any complicated commands or programs.

The typewriter simulator controls 12 are fully shown and described in copending U.S. Patent application, Ser. No. 161,554 filed July 12, 1971, entitled "Electronic Text Display System Which Simulates a Typewriter", by Arnold J. Goldman, Stephen L. Kurtin, and Carver A. Mead, said patent application being assigned to the assignee of the instant application. Briefly, the typewriter simulator controls 12 as described in the aforesaid application, includes rotatable platen knobs such as those on a conventional typewriter for rolling a sheet of paper up or down with respect to the printing means. A display is provided, displaying thereon an outline of a page, which outline is rolled up or down the display screen in the same manner as a page would be rolled up or down by rotation of the platen knobs. The typewriter simulator controls also contains horizontally slidable left and right margin indicators similar to those on conventional typewriters selecting left and right margin limits, with the left margin limit indicating the displayable limit on the left hand side of the display screen and the right hand margin limit providing keyboard lock-up once that right hand margin is reached. Alternatively, the right hand margin limit when set, can provide a "ring bell" signal, a predetermined number of spaces prior to the right hand margin limit indicator. A line spacing indicator is also provided to select single, or double spacing in the same manner as a conventional typewriter. Each of the platen knobs, the left and right margin indicators, and the spacing indicator provide suitably encoded electronic signals to the system for processing therein.

The position indicator sub-system 32, as well as the keyboard 14 and keyboard interface 16, as shown and described in the aforesaid patent application, generate a position indicator or cursor on the display screen which is visible to the operator to indicate the position at which operator action is occurring or can occur. The cursor position, with respect to the page outline, is controllable by the operator 10. The cursor travels horizontally at a position adjacent the bottom of the display, this corresponding to the last displayable line on the screen with the length of travel along a line being determined by the left and right margin indicator positions. The cursor in the instant system traverses this one line only, and is moved along the line by the operator typing, spacing, or backspacing, similar in manner to the conventional typewriter where the line being typed is at a fixed position with respect to the printing means. The cursor however, is positionable relative to the page outline on the display screen by rotating the platen knobs to move the page outline up or down the display screen.

It can be seen then that the operator can enter textual information onto the display 18 by suitably positioning the page outline with respect to the display 18 by means of the platen knobs of the typewriter simulator controls 12 for text entering. For normal typing operations the operator 10 then positions the cursor along the bottom or "print" line with the cursor identifying the position in which, or at which the character will be displayed. The operator then depresses an alpha-numeric key of the cluster 50 which indicates that the operator desires that that alpha-numeric character to appear on the display in the correct print position. The coded signal coming from the keyboard is entered into memory 20 by means of the communications bus 22 while the display sub-system 18 utilizes the information to display the result. Successive depressions of the alpha-numeric keys and space bar successively display the alpha-numeric characters so entered with the appropriate spacing between words as entered by the operator. With the depression of the carriage return key 52, the page outline shifts up on the display screen one or two spaces depending on the initial operator setting of the line spacing indicator. The cursor likewise shifts to the left, to the first displayable space on the screen, which is determined by the left hand margin position indicator.

If the operator desires to perform text editing (i.e., deleting and/or adding one or more characters) the operator can select the line upon which the editing is desired by rotating the platen knobs until that line is the lower most line to be displayed (the print line) which is the line where the cursor appears. The cursor is then positioned along the print line under the control of the "space" key 56 and "backspace" key 54 located in conventional positions of the keyboard cluster 50. If the operator then wishes to erase that particular character located immediately above the cursor, the operator then depresses the erase key **60*r* which erases the character in memory and consequently on the screen while maintaining the space on the screen. If the operator desires to enter another character in place of the one erased, the operator then depresses the backspace key 54 to reposition the cursor under the now blank space, then depresses the desired alpha-numeric key to enter the new character which is simultaneously entered into memory 20 in the same location. Alternatively, if the operator desires to delete the character without substitution, the operator positions the cursor at the proper location, depresses the "delete" key 60*v*, resulting in the character being deleted and all text on the line occurring to the right thereof, moving to the left an amount equal to the deleted character to take up the space previously occupied by the character deleted. The delete key 60*v*** is a double depression key which can be used to delete successive characters by depression thereof to the second position.

In the keyboard shown in FIG. 2 there are 10 double depression keys which are Backspace key 54, "Carriage Return" key 52, "Space Bar" 56, "period", "hyphen" and "underline", justify key **60*m*, merge key 60*p*, erase key 60*r*, insert key 60*t*, and delete key 60*v***. The first level of depression is reached upon a normal typing depression while additional force above the normal will further depress the key thereby reaching the second level of operation.

As will be hereinafter discussed, the memory 20 includes a display memory which is line organized and holds the text being displayed, edited and manipulated. The displayed text is a subset of information stored in memory as determined by the processing subsystems as it interprets operator commands. For example, depression of an alpha-numeric key causes a code to be stored in memory corresponding to the desired character; depression of the Carriage Return key causes a carriage return code to be stored in memory; depression of the Space Bar 56 causes a space code to be stored in memory; and so forth. The text in memory is available for display and is manipulated by the operator by keyboard commands issued to the communications bus 22 for simultaneous transmission to the other sub-systems for operation thereon as required. The display memory within the sub-system 20 is line organized to hold 60 lines (lines 0–59) with each line or row in memory having sufficient storage for 128 characters each 8 bits long. A character may be displayable (alpha-numeric) or non-displayable (buried continue word). A displayable character occupies a given width on the display screen and may be, for example, a space. Each row of memory corresponds to a text line on the displayed page but the first and last rows (row 0 and row 59) are not used for text display but instead are used to generate the horizontal lines indicative of the upper and lower limits of the page as displayed on the display 18. Lines of information are held serially in respective memory rows and the information in each memory row is recirculated. The characters stored therein are periodically applied such as approximately 30 times per second, to a character generator within a display sub-system 18 for a continuous display of the stored text.

In typical prior memory display systems, there is direct correspondence between a memory character position and a display character position, and an entire page of text is stored in a one-line circulating memory. Although in the present system, memory rows correspond to displayed lines, character position within a line of the display, do not necessarily correspond with locations in a row of memory, because of the inclusion of coded signals, or non-displayable characters such as the backspace code for overstrikes and carriage return codes noted previously along with the text. The present arrangement allows absolute addressing of the memory even as the displayed lines of text are rolled up or down on the screen with the platen knobs or cursor. That is a given line on the display always corresponds with a given row of memory no matter where this particular line may appear on the display. Inasmuch as the cursor row is under control of the operator by rotation of the platen knobs, the system is provided with a cursor row count signal indicative of cursor position with respect to the page outline. A second count signal is generated in the system to provide information indicative of the memory row being addressed. The memory row address count is compared with the cursor row count to provide a row compare signal which occurs when the two counts are equal. It should be remembered that the cursor row count is indicative of the last displayable line of text on the display screen. This signal stays true until the next row of memory is addressed (at which time there is no longer a comparison between cursor and memory rows). When the row compare signal goes false, flyback of the display is triggered and the electron beam of the cathode ray tube returns to the top of the screen. If the cursor row count is incremented, for example, with the platen knobs, the row compare signal occurs one line later, thereby giving flyback one line later, thereby causing display of an additional line of text from memory. If the cursor row is decremented, for example, with the platen knobs, the row compare signal occurs a line earlier thus causing flyback to occur at the end of the earlier line. If the memory contains textual information in subsequent rows (in memory rows after the row corresponding to the print line on the display screen) the subsequent rows of memory are being read from memory and applied via a character generator to the display for display at the top of the display screen; however, all lines after the print line, although supplied to the display, are blanked or inhibited by the video circuit of the display sub-system 18 to prevent display thereof. This allows absolute addressing of the memory without shifting up and down the contents of memory which would require a change in memory addressing.

SYSTEM TIMING

The timing for the system is transmitted over the timing bus 30 of the communications bus of FIG. 1 and briefly, system timing is divided into three major time frames; display time, retrace time, and flyback time. This is illustrated on a reduced scale in FIG. *3a* where portion 62 of the curve is display time, portion 64 is retrace time, and portions 66 and 68 are flyback time corresponding to the same time period required for one retrace cycle and one display cycle. For illustrative purposes, the relative time periods involved are 512 microseconds for display time, 40 microseconds for retrace or horizontal sweep return time, and 552 microseconds for flyback time.

Each of these major time frames is further subdivided into MAC times as shown in FIG. *3b*. A MAC time corresponds to the time period between successive memory address counts and are designated MAC 0, MAC 1, etc. as shown on curve 70 of FIG. *3b*. The display time 62 section of the curve of FIG. *3a* is equivalent to 128 MAC times (128 being the number of character storage locations per line of memory) which equates to 4 microseconds of MAC time in the illustration given. Retrace time corresponds to 10 MAC times (i.e., MAC 0–MAC 9). As will be hereinafter discussed, the system provides memory address counts to provide the MAC time signals which control display time and retrace time while flyback is initiated on a row compare signal as previously mentioned (or on a line 59 signal when an entire page is displayed).

Each MAC time is further subdivided into time slots $T_0$–$T_7$ as shown in curves 71 through 78, inclusive, of FIG. 3b. Each of the time periods, $T_0$, $T_1$, etc., are derived from a basic clock signal which is eight "Delta T" times for each time slot. The basic clock time pulses are further utilized to provide enabling pulses as required of shorter duration than a time slot in order to sample data within a "window" of the time slot to compensate for data propagation delays in the system.

In general, certain events occur, certain controls are effected, certain data is transferred within the system at predetermined time frame, MAC time, and time slot. Generally, information which is text related or text dependent is processed during display time while non-text related information is processed during retrace and flyback times. Such non-text information will include, for example, the signal to ring the bell a predetermined number of spaces prior to the right hand margin, the information indicative of the spacing between the lines and information for incrementing or decrementing the cursor with platen knob.

COMMUNICATIONS BUS

Referring again to FIG. 1, the communications bus 22 includes the timing bus 30 which provides the basic system clock and coded time slots which permit text to enter the synchronous special control and indicator bus 26 and the data bus 24; the special control and indicator bus 26 which transfers control terms in specified time slots (i.e., increment cursor, write into memory, etc.) and indicator terms in specified time slots (i.e., carriage return, row compare, etc.); the address and command bus 28 which provides a means for any sub-system to address another sub-system, or for any sub-system to cause any other sub-system to transmit commands or data to a third card, which events may occur asynchronously with respect to system timing (this bus contains both a busy and acknowledge signal); and the data bus 24 which provides a channel to transmit textual information suitably encoded from one sub-system to another within specified time slots.

Figures 4, 5:
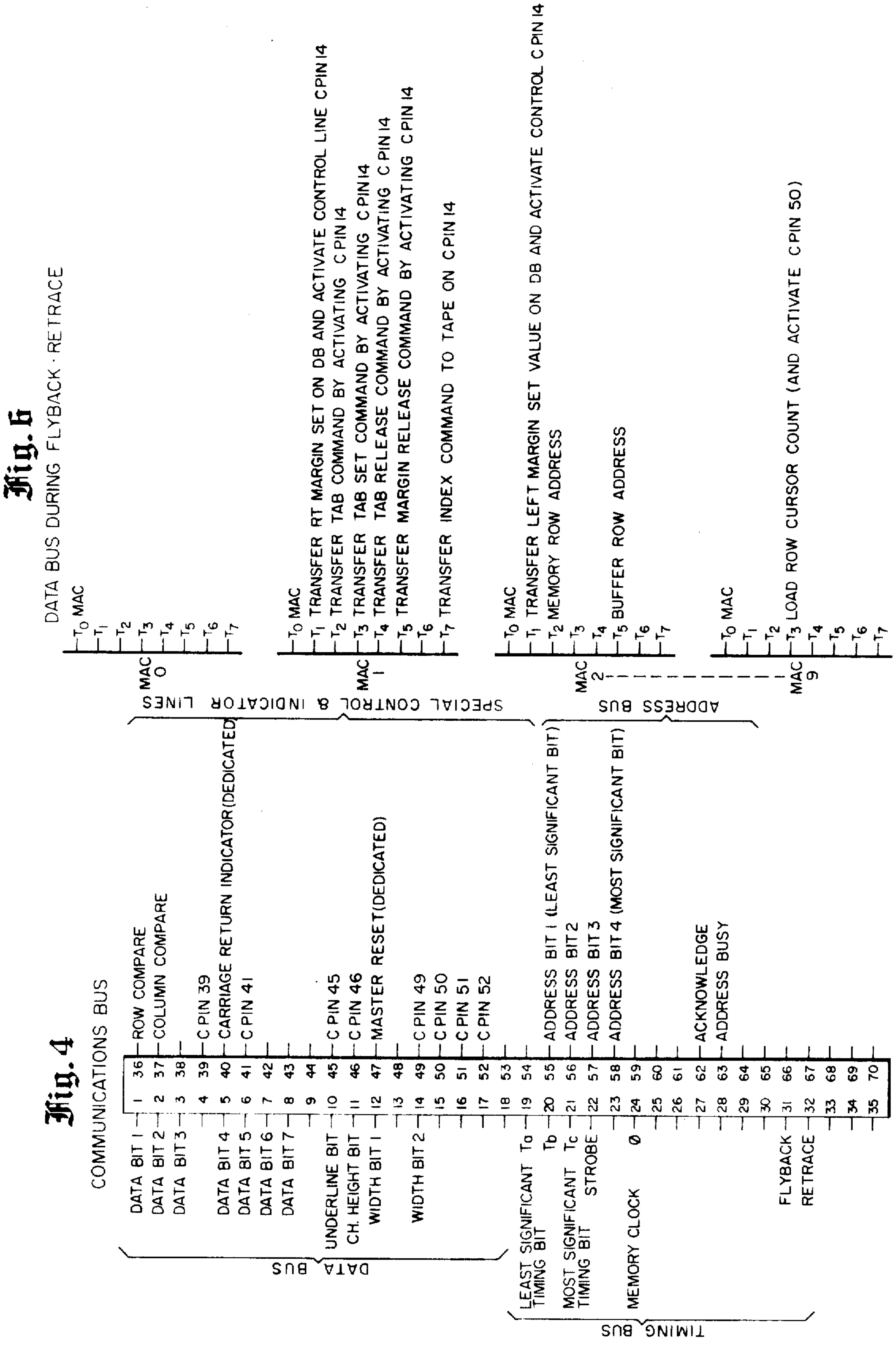
FIG. 4 is a diagrammatic representation of a connector showing the communications bus detail.
FIG. 5 shows in tabular form the time slot and information transferred over the data bus during display time.

Referring now to FIG. 4 the content and function of the data bus 24 will be discussed with reference to the diagram illustrated therein. Within the elongated rectangle of FIG. 4 indicative of a connector there are two rows of numbers from 1 through 70, inclusive, which will hereinafter be referred to as C PINS. As can be seen, the data bus 24 encompasses C PINS 1 through 18, the timing bus encompasses C PINS 19 through 32, the special control and indicator bus 26 encompasses C PINS 36 through 54 and the address bus 28 encompasses C PINS 55 through 64. Positioned adjacent each C PIN number is a brief description of the information transferred over that line of the respective bus. Certain of the pins such as C PIN 41, C PIN 45, etc., are designated as such inasmuch as these particular pins are multi-function as will be hereinafter discussed.

The data bus is used to transfer data pertaining to text during display time with seven bits of character information being transferred in parallel over C PINS 1, 2, 3, 5, 6, 7 and 8. C PIN 10 simultaneously transfers a "one" or a "zero" to indicate "underline" or "no underline" while C PIN 11 transfers character height information, that is whether it is a high character such as *k*, *l*, *f*, etc., or a low character such as *a*, *c*, etc. C PINS 12 and 14 are used to transmit digital code indicative of character width. In this way, information pertaining to character height can be utilized subsequently for example, in "justifying" (that is arranging the spacing between the words on each line of text, so that text on each line extends to both margins). Similarly, the character width information is useful for proportional spacing (allowing each character a space on the display or typewritten page proportional to its width rather than allowing one space width to each character).

By providing a character height bit and width bits, the justifying of text can be done in an aesthetically pleasing manner. Expansion of spaces between words in a given line of text is determined on an order of priority of preferred blanks, acceptable blanks and non-decrementable. A "preferred blank" is defined to be the space between the two words where one word ends and the other word starts with letters of opposite height; an "acceptable blank" is defined to be the space between the words where one word starts and the other word ends in a low letter (e.g.; *e*, *i*, *a*, *c*); and a "non-decrementable blank" is defined as a space between words where one word starts and the other word ends in a high letter (e.g.; *t*, *l*, *k*, *b*). The width code provides information indicative of the number of units of space occupied by each character and blank space within a line of text. This information is used by the justify sub-system 44 to keep an accumulative count which is continually incremented by the number of unit spaces corresponding to the width of the last character entered into memory. The justify sub-system 44 also keeps a running total of the number of unit spaces that can be added to or subtracted from a line of text. The number of unit spaces that can be added to a line is equal to twice the number of preferred blanks plus the number of other blanks. The number of unit spaces that can be subtracted is equal to the number of preferred blanks plus the number of acceptable blanks on a line.

Additionally, other sub-system such as the edit/-merge sub-system 36 and the clean-up/hyphen sub-system 46 recognizes certain operator action sequences and interpret these sequences to place codes such as "continue word" in text without requiring the operator to hit any special keys or provide an "inhibit merge" signal when a line of text is interpreted as a paragraph beginning due to certain end of paragraph sequences occurring. Typical operator sequences for indicating the end of a paragraph are: end of line punctuation followed by a double carriage return signal: end of line punctuation followed by a carriage return and a tab signal; or end of line punctuation followed by a carriage return and a space. The logic continually monitors the text in memory and if any of the proper sequences are detected an inhibit merge signal is transmitted to prevent the line which begins the paragraph from merging into the preceding line.

The clean-up/hyphen sub-system 46 monitors the text coming from the keyboard interface 16 and when a hyphen code followed by a carriage return is detected the hyphen code is immediately converted to a continue word code. This is done to indicate that the hyphenated word appearing at the end of the line would generally appear to be a word broken up due to lack of typing space. If the continue word code is buried in text due to text manipulation such as merge th code is converted to a "buried continue" code. This latter code is not displayed but can be used in the future to hyphenate the word if the word should appear at the end of the line as a result of a text editing (shift up or shift down operations). In this case, the buried continue code would be once again a continue word code.

TIMING BUS

Referring again to FIG. 4, the details of the timing bus 30 will now be discussed. C PINS 19, 20 and 21 transfer basic timing information designated as $T_a$, $T_b$, $T_c$, which is essentially digital coded information of three bits to designate one of the particular time slots $T_0$–$T_7$. This digital information is generated by the transmission of the pulses shown in FIG. 3*b*, the curves being designated 80, 81 and 82. Curve 80 has twice the frequency of the MAC time while curves 81 and 82 have the same frequency as the MAC time with curve 82 being time phased shifted to the right relative to curve 81. The digital coded information indicative of the particular time slot is indicated by the "0" or "1" in time relationship on curves 80, 81 and 82 with the three bits of information in vertical alignment ($T_c$, $T_b$, $T_a$) representing the time slots ($T_0$–$T_7$ of curves 71 through 78) in vertical alignment therewith. For example, the digital information indicative of $T_0$ is 010. The pulses of curves 80, 81 and 82 are continually applied to C PINS 19, 20 and 21 over the timing bus 30 to provide the time slot timing information to all sub-systems. C PINS 22 and 24 transmit recurring pulses designated as the "strobe" and "memory clock" which are designated as curves 83 and 84 in FIG. 3c. These pulses occur within each time slot with each having a duration less than the time slot. FIG. 3*c* is essentially an enlargement of curves 71 and 72 of FIG. 3*b* with the corresponding curves for $T_0$ being designated 71a and $T_1$ being designated as 72*a*. As previously discussed each time slot is divided into eight Delta T time pulses which are shown on the curve 85 (Delta $T_0$-Delta $T_7$). The memory clock pulse 84 begins at Delta $T_1$ and ends at Delta $T_6$ while the strobe pulse 83 begins at Delta $T_4$ and ends at Delta $T_7$. In many instances within the sub-systems it is desirable because of propogation delays within the system to permit a particular sub-system to have access to the data during some small window of time and in such cases the strobe pulse 83 is ANDed with the time slot pulse such as $T_0$ to provide a smaller duration time pulse within a time slot which $T_0$ would be designated $T_{p0}$. In the instant system data is put on the data bus 24 as close as possible to the beginning of a $T_0$, $T_1$, etc., time slot and when the strobe pulse occurs, the data is assumed to be valid.

DATA BUS

Referring again to FIG. 4, as can be seen, the data bus 24 includes 11 lines, seven lines of which transmit MAC count information as well as character information of 7 bits; one line transmits information for underlining; C PIN 11 transmits character height information; and C PINS 12 and 14 transfer width information. Additionally, during non-display time, any line of the data bus can be used to issue commands from one sub-system to another.

The information present on the data bus during display time is better illustrated in FIG. 5 which shows in tabular form the time slot within each MAC time, with respect to the data present on the data bus during that particular time slot. During each $T_0$ of each MAC time of display time, data relating to the memory address column location (MAC count) is on the data bus. This corresponds to the display memory address and is available to every sub-system in the system and any one or more sub-systems can act on this address and, if necessary, with each other over the other buses. At $T_1$, the addressed character is put on the data bus 24 from the memory. Every sub-system can now read the character and perform any process on the character that is required. As will be discussed hereinafter, each sub-system also has access to a row inhibit line within the special control and indicator bus 26 which can be used to stop the memory from advancing to the next row thereby keeping the line being worked on available until any operation or process is finished. At $T_2$, if directed, or if needed, any contents of the buffer memory are put on the data bus. At $T_3$ any sub-system can write into the main memory by putting data on the data bus and activating a "write command" signal on the special control and indicator bus. Similarly, during $T_4$ and sub-system can write into the memory location put on the data bus during the previous character time. The method of accomplishing this will be discussed in detail hereinafter. Time slots $T_5$ and $T_6$ can be used as spares while time slot $T_7$ is used to transfer data between any two sub-systems over the data bus 24. The buffer memory is part of the memory sub-system 20 and has the same storage capacity as the main memory; that is, 60 lines of 128 characters each. In certain operations, portions of the information from the main memory are transferred to the buffer memory for temporary storage.

As previously discussed, the main memory is line organized to contain 128 words of 8 bits each per line. As shown in FIG. 3*a*, display time corresponds to 128 MAC counts with each MAC time being equivalent to one character time. Retrace time (horizontal sweep return time) as shown at 64 of FIG. 3*a* contains 10 MAC counts (MAC 0–9) while flyback time 68 is equivalent to one display time and one retrace time.

During retrace, with no flyback, at each $T_0$ of each of the ten MAC times (MAC 0 – MAC 9) the data bus 24 transmits MAC time information. Also during retrace at MAC 2 and $T_2$ the memory row addressing information is on the data bus while at MAC 2 and $T_5$ the buffer memory row address information is on the data bus. At MAC 9 and $T_2$ of retrace time, the data bus is used to transfer information pertaining to justifying. Any one of the time slots $T_1$–$T_7$ during retrace time can be utilized if necessary, or if desired, to transfer data between any sub-systems.

The utilization of the data bus during flyback and retrace is illustrated in tabular form in FIG. 6. Certain commands and address information are transferred over the data bus during non-display time as indicated.

FLYBACK AND RETRACE

Figures 7A, 7B:
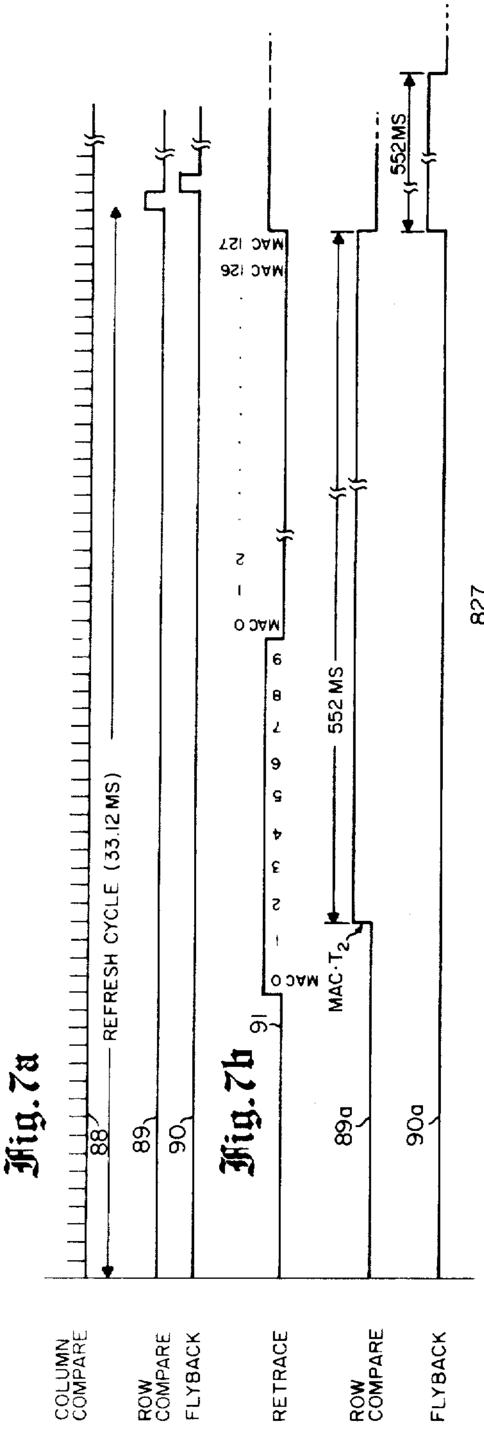
FIGS. 7a and 7b show in graphical form timing signals generated to enable information transfer.

The flyback and retrace signals transmitted over C PINS 31 and 32 of FIG. 4 are illustrated in the timing diagrams of FIGS. 7*a* and 7*b*. As previously discussed a cursor, which is operator controlled, is displayed on the screen of the display sub-system 18 to indicate the position at which operator action is occurring or desired. Furthermore, there are 60 lines of memory, 58 of which are displayable as a line of text on the display screen. The system of FIG. 1 generates a "column compare" signal as shown in curve 88 of FIG. 7*a* each time the cursor count equals the memory column address count. Consequently, there is one column compare pulse per line resulting in 60 column compare pulses per refresh cycle. The system also generates a "row compare" pulse as shown in curve 89 which results when the cursor count equals the memory row address count. The row compare pulse goes high at the beginning of the row. When this pulse is ANDed with a retrace signal it initiates a flyback signal as shown on curve 90. The comparison of retrace and flyback signals are better illustrated in enlarged form in FIG. 7*b* wherein the retrace pulse is shown on curve 91, the row compare pulse is shown on curve 89*a* (beginning at MAC 2–T 2 of retrace just prior to the last displayable line) and the flyback pulse (beginning at MAC 0–$T_0$ of the next retrace pulse) is shown on curve 90*a*. As previously discussed the memory row address information is transferred over the data bus 24 during retrace at MAC 2 and $T_2$ at which time the memory row address count is compared with the cursor count to initiate the row compare signal on curve 89*a* thereby triggering the flyback signal of curve 90*a*. The row compare signal would only be generated as the electron beam is tracing the last displayable line which would be the line where the cursor is located thereby resulting in the vertical sweep return to the top of the display screen at the conclusion of the line. When the entire page is displayed flyback would be initiated on a "Row 59" signal.

TIMING SUB-SYSTEM

Figure 8:
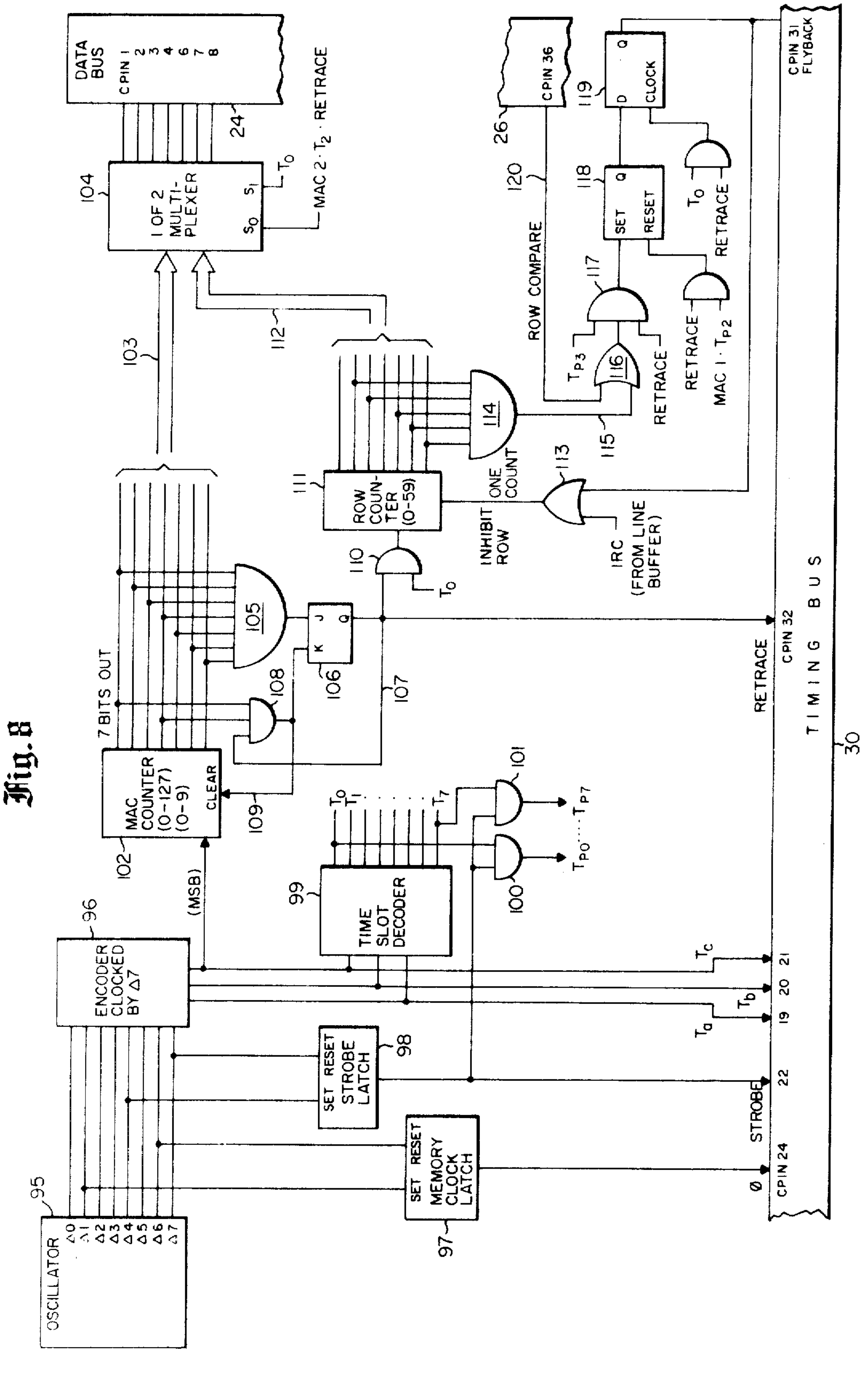
FIG. 8 is a detailed block diagram of the system timing circuitry.

Referring now to FIG. 8, the means for generating the system timing signals will be discussed in detail. An oscillator 95 is used to generate the sequence of eight Delta T time signals which are suitably encoded by encoder 96 into three pulse streams designated $T_a$, $T_b$ and $T_c$ which are transmitted over C PINS 19, 20 and 21 of the timing bus 30. (See also curves 80, 81 and 82 of FIG. 3*b*). The Delta T time bits from oscillator 95 are also used to generate the strobe pulse transmitted over C PIN 22 and the memory clock pulse transmitted over C PIN 24. A memory clock latch 97 is set at the beginning of Delta 1 time bit and reset at the beginning of the Delta 6 time bit (resulting in the pulse shown on curve 84 of FIG. 3*c*). Similarly, there is provided a strobe latch 98 which is set at Delta T time 4 and reset at the beginning of Delta T time 7 (resulting in the pulse shown in curve 83 of FIG. 3*c*).

The timing sub-system is provided with a time slot decoder 99 which is connected to the three output lines of encoder 96 to suitably decode the pulses into time slots $T_0$– $T_7$ for internal timing sub-system use. For timing periods of smaller duration than a time slot period, each of the time slots $T_0$, etc., can be ANDed with the strobe pulse from strobe latch 98 to generate timing pulses of smaller duration as illustrated by AND gates 100 and 101 wherein a $T_0$ pulse is ANDed with the strobe to generate smaller duration timing pulse $T_{p0}$ and AND gate 101 is inputted by $T_7$ and the strobe to generate $T_{p7}$. The smaller duration time pulses would be substantially identical to the strobe pulse (as shown in FIG. 3*c*, curve 83). The Delta T time pulses from oscillator 95 are illustrated in curve 85 of FIG. 3*c* while the time slot pulses are illustrated in FIGS. 3*b* and 3*c*.

Referring again to FIG. 8, the timing sub-system is provided with a MAC counter 102 which is enabled by the most significant timing bit ($T_c$) from encoder 96. As can be seen in FIG. 3*b* at curve 82, the timing cycle for $T_c$ is equal to the duration of one MAC count thereby resulting in one count into the counter 102 of FIG. 8 for every eight time slots. The MAC counter 102 provides 7 bits of information in parallel at its output 103 which is connected to the inputs of a multiplexer 104 which then transmits the information to the data bus 24 when "set" input $S_1$ is pulsed at $T_0$. The seven bits of information are then transferred in parallel over C PINS 1, 2, 3, 5, 6, 7 and 8 to be made available to all sub-systems simultaneously.

A multiple input AND gate 105 has the seven inputs thereof connected to each of the seven outputs of the MAC counter 102 and at MAC 127 all the inputs are at logical 1 thereby providing an output from AND gate 105 to the J input of flip-flop 106 generating an output at Q to provide a retrace signal over C PIN 32 of the timing bus 30. The MAC counter 102 then counts from 0 to 9 during the time the Q output of flip-flop 106 provides the retrace pulse. The retrace output is coupled over line 107 to a three input AND gate 108 which has the other two inputs thereof connected to receive the first and fourth bits of information from the output of MAC counter 102. During the retrace time when the MAC counter reaches 9 the first and fourth bits would go high to provide an output from AND gate 108 to the K input of flip-flop 106 thereby resetting the Q output to zero. When the AND gate 108 is enabled, the output is transmitted over line 109 to clear the MAC counter 102 to restart the count. Thus, at each $T_0$ a MAC count is transmitted over the data bus 24. The output of flip-flop 106 (the retrace signal) is also fed to an AND gate 110 which is enabled at $T_0$ to provide row count pulses to a row counter 111. The row counter 111 provides 7 bits of information in parallel of ourput 112 to multiplexer 104 which is then transferred to the data bus 24 when the set input $S_0$ is enabled at MAC 2 and $T_2$ and retrace. The row count information then made available to all other sub-systems simultaneously.

Five lines of the output of the row counter 111 provide inputs to an AND gate 114 which provides an output pulse on count 59 (111011), the output appearing on line 115 which is then gated through OR gate 116 to provide an input to AND gate 117 which at $T_{p3}$ of retrace provides a set pulse to flip-flop 118. The set pulse to flip-flop 118 drives the Q output high to provide an input to second flip-flop 119 (D-type flip-flop) which is clocked to the Q output at the next $T_0$ of retrace thereby providing a flyback signal at C PIN 31. A flyback signal is alternatively provided by means of a row compare signal over line 120 from C PIN 36 to the second input of OR gate 116. The latter signal would indicate that the last displayable line on the display would be some line other than row 59. In either event, concurrent with the flyback signal an "inhibit row count" signal is transmitted over line 121 through OR gate 113 to the row counter 111 which latter signal would last for the duration of the flyback signal. (An Inhibit Row Count signal is also provided to OR gate 113 from the line buffer.) This amount of time would correspond to the time necessary to display one row (one retrace and one display cycle as indicated by the portions 66 and 68 of the curve of FIG. 3a).

SPECIAL CONTROL AND INDICATOR BUS

Referring again to FIG. 4, the special control and indicator bus generally includes C PINS 36 through 54 with C PINS 36 (row compare), C PIN 37 (column compare), C PIN 40 (carriage return indicator), and C PIN 47 (master reset) being dedicated lines. That is, these lines transfer information pertaining only to the specific assigned function whenever the signal occurs. The C PINS which have no indication of use to the immediate right of the numeral are either logic ground or spares. With respect to the balance of the C PINS of the special control and indicator bus, FIGS. 9*a*–9*c* show in tabular form the control command or indicator function assigned to each of the C PINS according to time frame, MAC count and time slot. The three major time frames are on the uppermost horizontal column, that is, "display time", "retrace time with no flyback", and "retrace and flyback time". Display time is further subdivided into time slots $T_0$–$T_7$ with the control and indicator signals appearing in vertical columns under each time slot. With respect to display time, each of these signals can be issued in each MAC time in the specified time slot.

The C PIN numbers of the special control and indicator bus are listed in the extreme left column with all signals being carried thereon being listed in the horizontal column associated with the C PIN number. However, not all of the listed signals will be discussed hereinafter although they are included here to illustrate the communications bus of the present invention.

The retrace with no flyback (as well as the retrace with flyback) time frames are subdivided into MAC times with the vertical column under each MAC time designating first, control or indicator signal and, second, the time slot during which the signal occurs. In the column entitled "other", signals occurring in other than MAC 1, 2 or 3 are designated with the corresponding MAC time and time slot.

In general, display time control and indicator signals are text dependent or text related while non-display time is generally used for non-text dependent or non-text related signals.

It should be understood that some of the control and indicator signals are operator controlled and are therefore asynchronous in MAC time, therefore requiring that latches be employed to store the information prior to "locking" the signal into its proper time slot. Such operator controlled signals include for instance "begin select" (over C PIN 39 at $T_2$ of display time); "end select" indicator (C PIN 41 at $T_4$ of display time) and all the signals listed for C PIN 51 under retrace time with flyback at MAC 33, these signals corresponding to some of the function keys on the keyboard of FIG. 2. Other signals are generated by a particular sub-system for transfer to one or more of the other sub-systems simultaneously upon the occurrence of certain events. Details of the control and indicator signals will be discussed hereinafter with reference to specific sub-systems.

ADDRESS BUS

The address bus 28 of FIG. 4 include C PINS 55–58 (for transmitting a four bit code indicative of an address of a specific sub-system being addressed); C PIN 62 which transmits an "acknowledge" signal and C PIN 63 which is used to transmit an "address busy". The address bus 28 is used to allow sub-system to sub-system transfers whereby any sub-system can address any other sub-system and transmit or receive information from that card over the address bus. The sub-system to sub-system addressing is a two-step procedure. The sub-system which does this puts the appropriate address on the bus during one of the allocated time slots as indicated in the following table.

| TIME SLOT | ADDRESS BUS ASSIGNMENTS |
|---|---|
| $T_0$ | Address of transmission card |
| $T_1$ | Function of transmission card |
| $T_2$ | Address of receiver card |
| $T_3$ | Address of receiver card |
| $T_4$ | Address of receiver card |
| $T_5$ | Command to receiver card |
| $T_7$ | Command to receiver card |

It is noted in the table above that different time slots have been allocated to addressing a transmission sub-system and a receiving sub-system. This technique permits three-way communications on the address bus. After a sub-system has been addressed it waits for a command to be issued on the address bus during $T_5$, $T_6$ or $T_7$ or over the data bus during $T_7$.

In addition to the sub-system to sub-system addressing capability made possible by the address bus 28 with certain sub-systems as opposed to using the two-step addressing procedure (that is addressing a sub-system and then issuing a command) a one-step procedure is employed. This is typified in FIG. 9 wherein C PIN 52 issues an "inhibit clean-up card" signal at $T_5$ of display time. The clean-up sub-system is continually monitoring the text in memory and consequently the need for addressing this particular sub-system occurs frequently. Therefore, in order to conserve time, the one-step approach is utilized wherein a card can merely issue an inhibit signal over C PIN 52.

In the two-step addressing procedure discussed above, an addressed card or sub-system can initiate an "acknowledge" signal over C PIN 62 to acknowledge receipt of the message or it can issue an address busy signal over C PIN 63 when it is tied up.

The data transfers from sub-system to sub-system are illustrated in tabular form in FIG. 10 wherein the vertical columns indicate the "transmitting card", the "receiving card", the "command or data" to be issued to the receiving card, the "command on PIN number" (illustrating the C PIN used to transmit the command as well as the time slot during which the command is issued), and "comment" concerning the particular transmission. For example, in the first horizontal row, any card has the capability to address the memory card to issue a character add signal. This can be accomplished when the cursor is positioned on the display screen, and the insert key 60*t* of FIG. 2 is depressed, an alphanumeric key of keyboard cluster 50 is depressed, thereby opening a space in memory for the additional character. The command is issued during time slot $T_7$ over C PIN 1 only after the memory is enabled by an appropriate address on the address bus during time slot $T_2$, $T_3$ or $T_4$. The left hand column of FIG. 10 is entitled "Transfer Number" with Roman numeral designations being arbitrarily assigned for convenience. It should be noted that transfers numbered Roman numerals I–IV and X have the command issued over C PINS 1, 2, 3, 5 and 6, respectively, during time slot $T_7$. These particular lines are part of the data bus which, as previously discussed (FIG. 5) can be used for card to card transfer during time slot $T_7$. With respect to transfer number X the justify processor card transmits a command to the justify program card. Although the justify sub-system 44 of FIG. 1 is shown as one sub-system, the present invention utilizes two sub-systems, one being the justify processor and the other being the justify program. In this manner, the justifying capabilities can be expanded by reprogramming of the justify program card.

MEMORY ORGANIZATION

Figure 11:
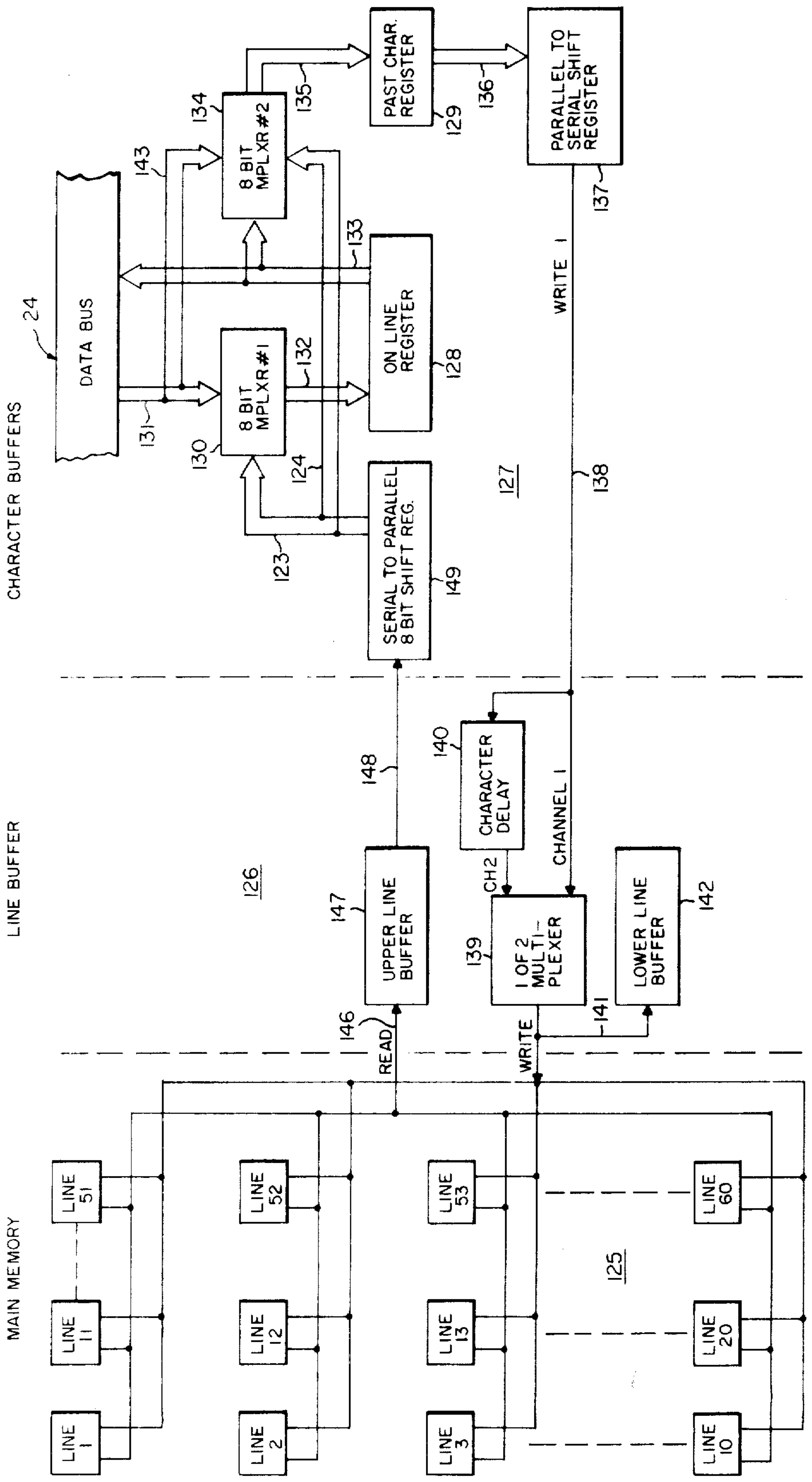
FIG. 11 is a block diagram of the memory configuration used in the system of FIG. 1.
Figure 12:
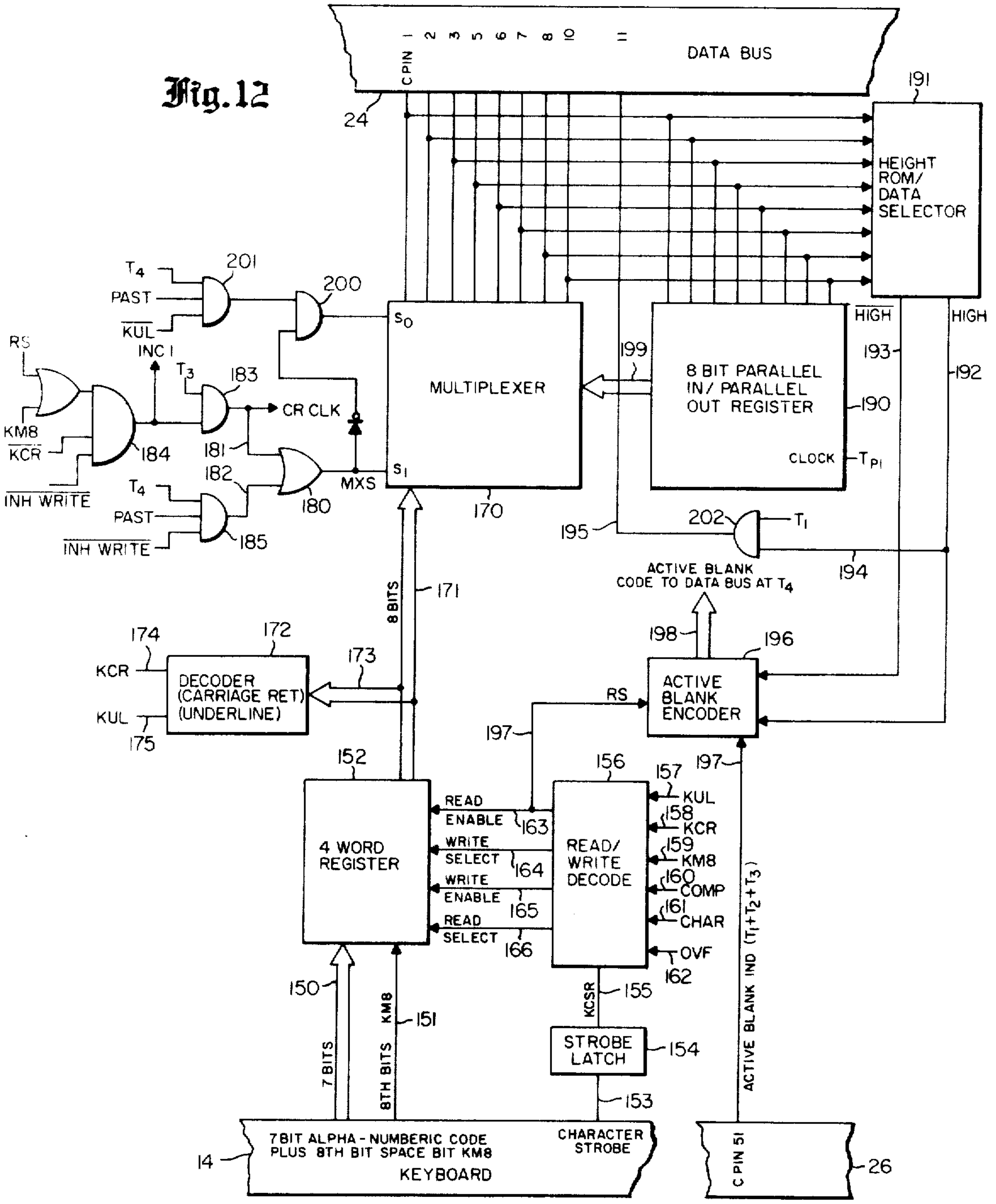
FIG. 12 is a detailed block diagram of a portion of the keyboard sub-system illustrating the transfer of data from the keyboard to the data bus.

In order to better understand the command signals of FIG. 10 and the control and indicator signals of FIGS. 9*a*–9*c* reference is made to FIG. 11 which diagrammatically illustrates the organization of the memory sub-system 20 (see FIG. 1). The memory sub-system 20 includes a main memory 125 which is a read-write memory line organized into 128 words of 8 bits each per line. Communicating with the main memory 125, are line buffers generally designated 126 and character buffers generally designated as 127. The timing sub-system previously described in FIG. 8 is also a part of the memory sub-system 20, and some of the communications between the timing system and the main memory line buffers and character buffers take place directly rather than over the communications bus. The character buffer 127 includes an on-line register 129 (capable of storing one word of 8 bits) and a past character register 129 (capable of storing one word of 8 bits). In a normal mode when the operator is entering data from the keyboard 14, data is placed on data bus 24 during time slot $T_3$ and enters a first 8 bit multiplexer 130 over lines 131, then passing through multiplexer 130 to the on-line register 128 over lines 132. At the next succeeding time slot $T_0$, information from on-line register 128 transfers out over lines 133 through the second 8 bit multiplexer 134 over output lines 135 to the past character register 129. Upon the occurrence of the following $T_0$ time slot the contents of the past character register 129 are transmitted over lines 136 to a parallel to serial shift register 137 which then serially shifts the character information over output line 138 where the character information is written into main memory 125 over one of two channels. The line in which the information is to be written into the main memory is under control of the operator while the column location within the line is determined by the number of locations within a line previously occupied by displayable or nondisplayable code. The output on line 138 enters the main memory 125 either directly (channel 1) through a one of two multiplexer 139 to be written into memory or alternatively through a character delay means 140 (channel 2) through multiplexer 139 into memory. The character delay means 140 delays the entry of the data into the memory 125 2 MAC or character times.

The output of multiplexer 139 is also serially fed by means of line 141 into a lower line buffer 142 capable of storing 128 characters of 8 bits each.

In a second mode of operation, data can enter directly from the data bus 24 into the past character register 129 during time slot $T_4$. In this mode character information on the data bus 24 during time slot $T_4$ is transmitted over lines 143, through the second 8 bit multiplexer 134 over lines 135 to past character register 129. (See time slot $T_4$ in the table of FIG. 5.) As will hereinafter be discussed, this is accomplished by a sub-system placing data on the data bus during time slot $T_4$ with the sub-system then issuing a "write command".

In a third operating mode when main memory 125 contains textual information, the information is read in serial fashion out of read line 146 into an upper line buffer 147 (capable of storing 128 words of 8 bits each) through output line 148 to a serial to parallel 8 bit shift register 149. The output of shift register 149 is selectively transferred over output lines 123 or 124 to the first multiplexer 130 or the second multiplexer 134. Information transferred over lines 123 through the first multiplexer 130 is loaded into on-line register 128 at time slot $T_0$. At time slot $T_1$ the data in the on-line register 128 is transferred over lines 133 to data bus 24 where it can be "viewed" or acted upon by the other sub-systems. At the next succeeding time slot $T_0$ the data in the on-line register 128 is transferred over lines 133 through second multiplexer 134 over lines 135 to the past character register 129.

If a character is to be deleted from the display screen as well as from the memory, functionally, the output of shift register 149 is transferred over lines 124 to go directly to the past character register 129 through the second multiplexer 134 over lines 135. This functional condition exists for the balance of the line of text containing the character to be deleted. This occurs when the cursor is under the character to be deleted and the delete key 60*v* is depressed. The character above the cursor disappears and all characters to the right thereof are moved left an amount equal to the space previously occupied by the deleted character.

With the character buffers 127 arranged as shown, information is transferred from the main memory 125 to the on-line register 128 at time slot $T_0$ of a given MAC time, this information then being transferred to the data bus 24 over lines 133 during time slot $T_1$. If a given sub-system or the operator desires to change the contents of the on-line register 128, this is done by putting data on data bus 24 during time slot $T_3$ and issuing a write command. If a sub-system commands a change to the contents of the past character register 129 (this register containing the character information which would be the previous character on the bus) this is accomplished by placing data on the data bus during time slot $T_4$ and issuing a write command.

With respect to the line buffers 126, the upper line buffer 147 contains the contents of the line currently being displayed while the lower line buffer 142 contains the contents of the line previously displayed. As will hereinafter be discussed, the upper and lower line buffers 147 and 142, respectively, can be toggled to perform various text manipulation functions such as merge or edit.

KEYBOARD INTERFACE-DATA ENTRY

Details of the keyboard interface 16 (FIG. 1) will now be discussed in detail with reference to FIGS. 12–16*b*. In these FIGURES the timing bus 30 has been omitted although it is to be understood that the keyboard interface 16 as well as other sub-systems all have access to the timing bus 30 for the necessary timing signals shown in the drawings. Also input/output buffers between the data bus and the logic have been omitted for clarity of illustration.

The operator can enter character or function data through the keyboard 14 by means of the keyboard interface 16. The data so entered is asynchronous with respect to system timing. Consequently, the striking of a character or function key on the keyboard 14 generates a character strobe or a function strobe respectively, while simultaneously providing the code of the character or function key struck by the operator. Specifically, with reference to FIG. 12, when the operator 10 is entering character data by means of the keyboard 14, a 7 bit alpha-numeric code is generated along with an eighth bit, which is the space bit (KM8). The 7 bit code is transferred by means of cable 150 along with the eighth bit along line 151 to a register 152 capable of storing four words of 8 bits. The register 152 is provided inasmuch as experienced operators are capable of high speed bursts of typing such as when typing the word "the". In this manner, the register 152 is able to retain bursts of character data during fast typing. The register 152 then sequentially supplies the character data at appropriate times. Simultaneously with the transfer of the alphas-numeric data, a character strobe signal is supplied on line 153 to a strobe latch 154 to indicate that the character data is present for storage in or other use by the keyboard interface 16. The strobe latch 154 generates a controlled character strobe pulse (KCSR) on line 155, which is used to enable a read/write decoder 156. The read/write decoder 156 receives input signals KUL (keyboard underline) on line 157; KCR (keyboard carriage return) on line 158; KM8 (space bit from line 151) on line 159; COMP (compare) on line 160; CHAR (character indicator) on line 161; and OVF (over strike flip-flop) on line 162. The decoder 156 then generates the appropriate read/write select/enable signals for the register 152 over lines 163, 164, 165 and 166. The 8 bits of information from register 152 are then transmitted to a multiplexer 170 over cables 171 as well as to a decoder 172 over cable 173. The decoder 172 detects the codes for carriage return and for underline to generate indicator signals KCR on line 174 and KUL on line 175 respectively.

The 8 bits of character information transferred to multiplexer 170, are then transferred to the data bus 24 at time slot $T_3$ or $T_4$ of display time to be written into display memory present memory location ($T_3$) or past memory location ($T_4$) as previously discussed with reference to FIG. 5. The gating of the data through multiplexer 170 is controlled by the control input $S_1$ which receives its input through OR gate 180 from input 181 or input 182. A signal appears on input 181 through AND gate 183 during time $T_3$ if AND gate 184 provides an output when "read enable" (RS) or space bit (KM8) are present with no keyboard carriage return code (KCR) and no inhibit write signal. An output signal appears on line 182 from AND gate 185 at $T_4$ if there is no inhibit write signal and a "past" signal occurs.

In the alternative mode when data has already been entered into the system, as previously discussed in connection with the table in FIG. 5, during time slot $T_1$, character data read from the display memory is on the data bus 24. This data is clocked into an 8 bit parallel in/out register 190 during the window of time $T_{p1}$. Simultaneously, the same data is applied to a "height" read only memory/data selector 191 which provides a first output on line 192 if the character is "high" (i.e.; *l, k, b*, etc.) and a second output on line 193 if the character is "not high" (i.e.; *c, e, a*, etc.). If the character is high, the signal appearing on line 192 is inputted to an AND gate 202 via line 194 where upon concurrence with a $T_1$ signal, an output is provided on line 195 to C PIN 11 to provide the height bit of information to the data bus 24. The outputs on line 192 and 193 are also applied to an active blank encoder 196.

The active blank encoder 196 serves a two-fold purpose. When data is originally entered by the operator via the keyboard 14, between words the sequence is character followed by a space followed by a character. The original space code entered by the space bar 56 of the keyboard 14 is a two unit "preferred" blank. In the system there are 12 active blank codes (that is blank spaces between words) which are classified according to unit space occupied and priority of expansion or contraction for justification of the displayed text. The blank can be one, two, three or four unit space and can be preferable, acceptable or non-decrementable for priority purposes. Each of these active blanks is assigned a unique digital code.

Referring again to the original entry of data by the operator, the active blank encoder 196 has the capability of latching in height information on two adjacent characters having a space therebetween. The blank code indicative of the space generates an active blank indicator pulse during time slot $T_1$, $T_2$ or $T_3$ (from C PIN 51 of special control and indicator bus 26), this pulse enabling encoder 196 to change the active blank code now contained in the display memory past character location. If another active blank code is necessary due to the relative heights of the two characters interposed by a space, the new active blank code is put on the data bus during time slot $T_4$ by the encoder 196 to be rewritten into the past character position by means of cables 198 with the application of a read enable (RS) signal to encoder 196 over line 197.

During the justification process, the expansion of spaces to fill the character information out to the right margin would depend on the relative heights of the adjacent characters with expansion or contraction taking place on the priority of preferable first and acceptable second with non-decrementable blanks being expanded only if necessary.

When a sub-system of the operator directs that a character previously entered be replaced by another character or space, data from the register 190 which is clocked in at time $T_1$ is applied by cable 199 to multiplexer 170 where it is returned to the data bus 24 during time slot $T_4$ when control input $S_0$ is enabled through AND gates 200 and 201 upon concurrence of a past signal with no keyboard underline (KUL) signal.

KEYBOARD INTERFACE-FUNCTION ENTRY

Figure 13:
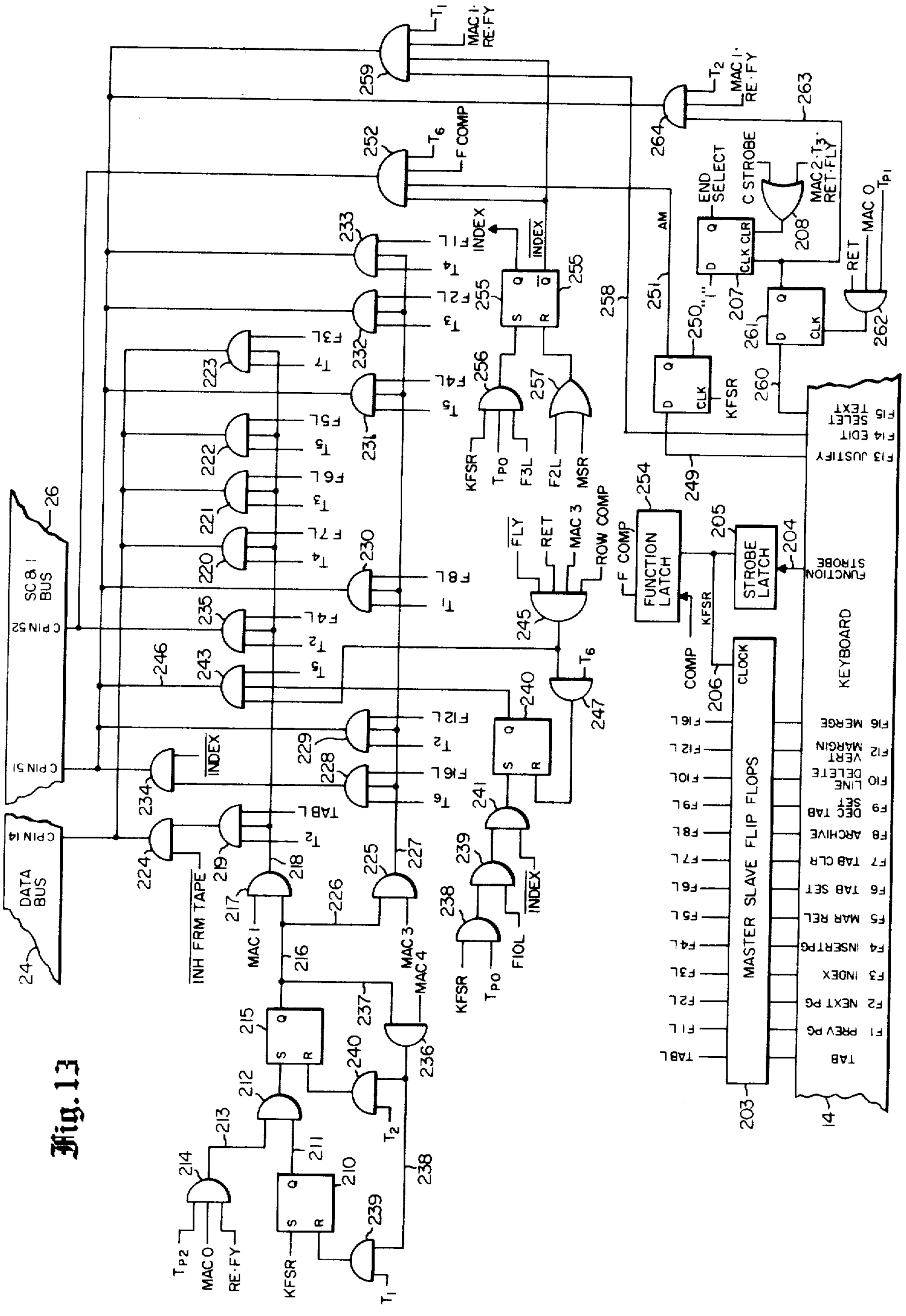
FIG. 13 is a detailed block diagram of the keyboard subsystem illustrating transfer of functional information from the keyboard to the data bus and special control and indicator bus.
Figure 14:
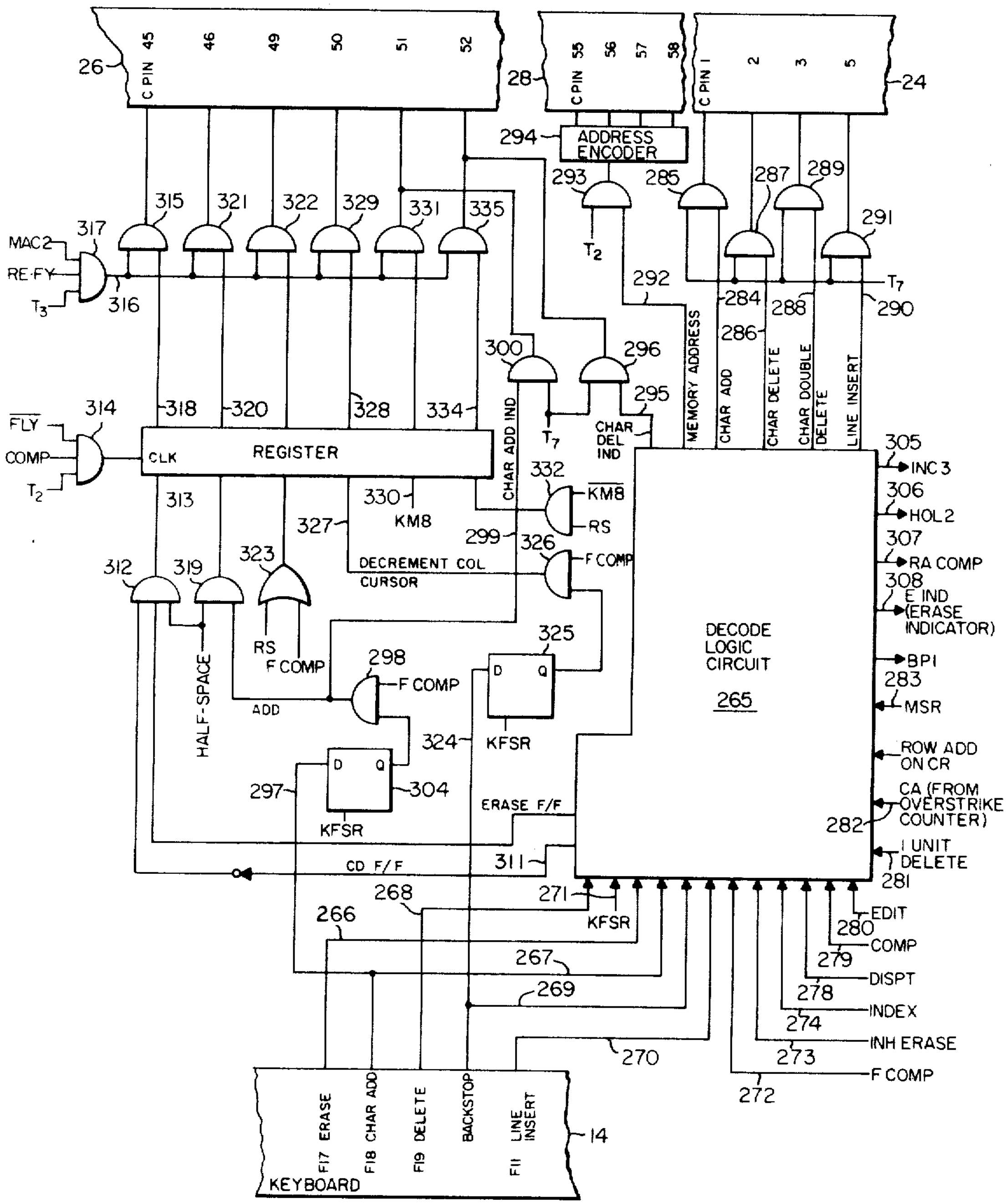
FIG. 14 is a detailed block diagram illustrating the transfer of functional information from the keyboard to the communications bus.
Figure 15:
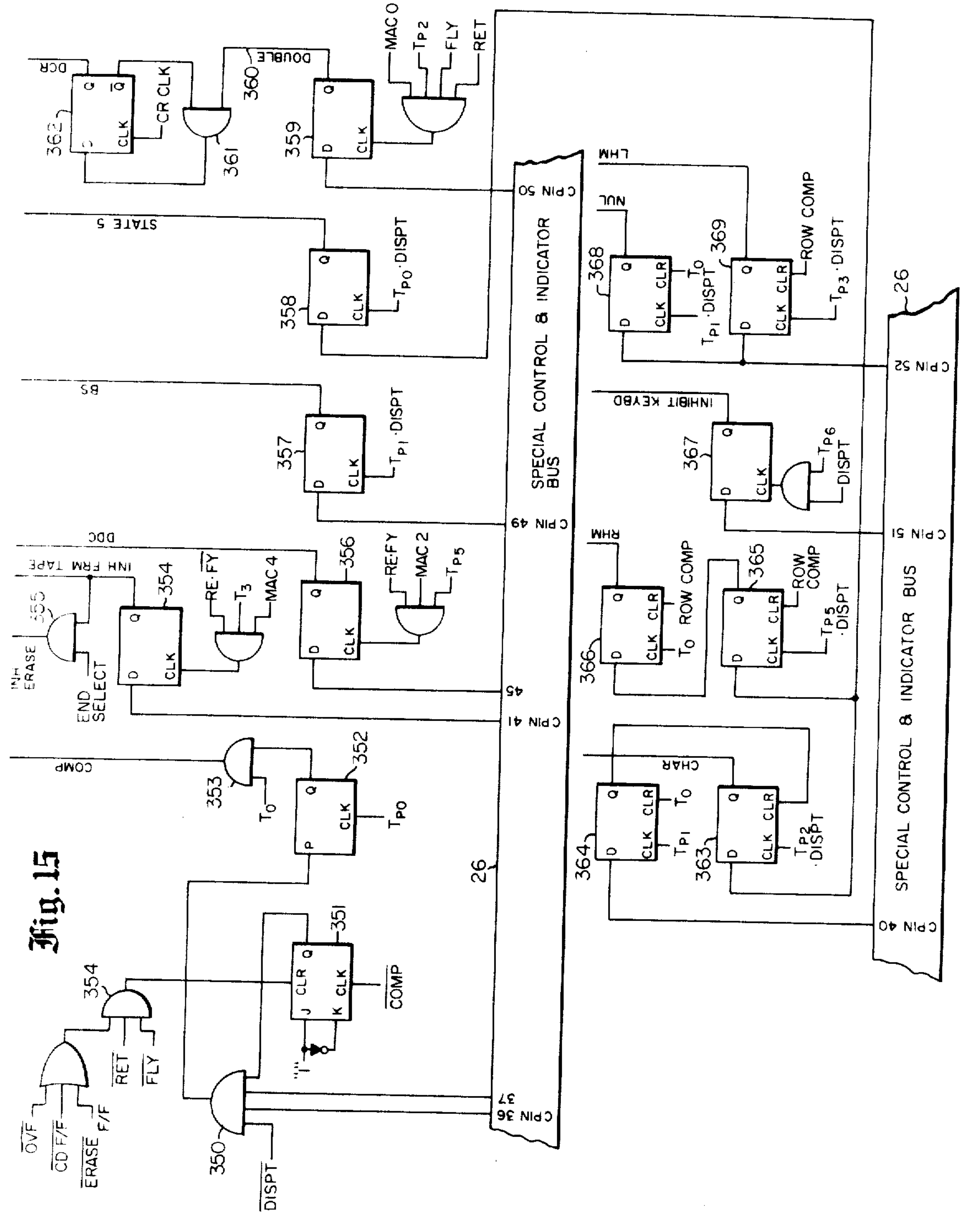
FIG. 15 is a block diagram of a portion of the keyboard sub-system showing signals transmitted to the keyboard sub-system over the special control and indicator bus.

FIGS. 13 and 14 generally illustrate the operation of the function keys of the keyboard to generate signals for application to the special control and indicator bus 26, the address bus 28 or the data bus 24. FIG. 15 generally illustrates signals received by the keyboard interface 16 by means of the special control and indicator bus 26 while FIGS. 16a and 16b generally depict signals applied by the keyboard interface 16 to the special control and indicator bus 26 and the address bus 28.

Referring specifically to FIG. 13 the keyboard 14 has imprinted thereon a series of designations labeled F1, F2, etc., which essentially depict the function keys of the keyboard of FIG. 2. Each of the function keys provides an input when activated to a flip-flop within the rectangle 203 designated master slave flip-flops, with the flip-flop being set by concurrence of the activated key with the generation of a function strobe along line 204 which enables a strobe latch 205 to provide a keyboard function strobe (KFSR) on line 206 to clock the individual flip-flop. As each flip-flop is set, it provides a respective output designated F1L, F2L, etc. In this manner the asynchronous operation of the function keys are latched into the system timing where they are subsequently operated upon to provide outputs on C PIN 14 of data bus 24 and C PINS 51 and 52 of the special control and indicator bus 26.

The outputs supplied at C PIN 14 can be better understood in the following discussion with reference to FIG. 6 and the signals applied to C PINS 51 and 52 can be better understood with reference to FIGS. *9a–9c*.

The functional signals which are transmitted over data bus 24 by means of C PIN 14 include tab, tab clear (F7), tab set (F6), margin release (F5), and index (F3). The tab keys and margin release key are similar in function to those of a conventional typewriter. The index key is a key for establishing a preset condition of a tape to be used with the system. With the activation of any one of these keys and the keyboard function strobe (KFSR) a first latch 210 is set to provide an output on line 211 to enable AND gate 212. The second input to AND gate 212 is provided on line 213 from AND gate 214 which provides an output signal during time slot $T_{p2}$ at MAC 0 with no retrace or flyback. This output sets a second latch 215 providing an output on line 216 to AND gate 217 thereby enabling it so that upon concurrence of a MAC 1 signal, an output is provided on line 218 which provides a first input to each of the three input AND gates 219 (tab function), 220 (tab clear function), 221 (tab set function), 222 (margin release function), and 223 (index function). If the tab key has been depressed a tab L signal is applied to AND gate 219 which during time slot $T_2$ provides an output to a second AND gate 224 which is enabled if there is no inhibit from tape signal present to provide an output on C PIN 14. If the tab clear key has been depressed an output is provided from AND gate 220 to C PIN 14 during time slot $T_4$. Similarly, the depression of the tab set key provides an output from AND gate 221 during time slot $T_3$ to C PIN 14; depression of the margin release key provides an output from AND gate 222 to C PIN 14 during time slot $T_5$; and depression of index key provides an output from AND gate 223 to C PIN 14 at time slot $T_7$. (See, also, the table of FIG. 6 in connection with these functions).

The output of latch 215 available on line 216 is also supplied to AND gate 225 over line 226 with the AND gate 225 providing an output at MAC 3 along line 227. Line 227 provides an input signal to each of the three input AND gates 228 for the merge function (F16), 229 for the vertical margin function (F12), 230 for the archive function (F8), 231 for the insert page function (F4), 232 for the next page function (F2), and 233 for the previous page function (F1).

The insert page function (F4), next page function (F2), and the previous page function (F1) as well as the index function are magnetic tape control functions used to access the recording media of the tape subsystem 48. The archive function (F8) is used in conjunction with the recorded tape to preserve the integrity of selected documents on the tape.

The vertical margin function (F12) is used to establish limits on the page on the display screen, above or below which data cannot be entered. The merge function (F16) is a text manipulation function which causes text from the first following line containing text to be transferred to the line where the cursor is located.

With the depression of the merge key AND gate 228 is enabled upon concurrence of time slot $T_6$ to provide an output signal to AND gate 234 which also provides an output signal if there is no index signal. The output of AND gate 234 is applied to C PIN 51. With the depression of vertical margin key, AND gate 229 is enabled during time slot $T_2$ to apply signal to C PIN 51; with the depression of archive key AND gate 230 provides an output signal during time slot $T_1$ to C PIN 51; when the insert page key is depressed, AND gate 231 is enabled during time slot $T_5$ to provide an output signal to C PIN 51; when next page key is depressed, AND gate 232 is enabled during time slot $T_3$ to provide a signal to C PIN 51; and when the previous page key is depressed, AND gate 233 is enabled during time slot $T_4$ to provide an output signal to C PIN 51.

Also utilizing the enabled signal on line 218 from AND gate 217 during MAC 1 is the decimal tab set function (F9) which upon being depressed enables AND gate 235 during time slot $T_2$ to apply an output signal to C PIN 52. The decimal tab function permits the entry of decimal data from left to right with the decimal point maintaining a preset tabbed position.

During MAC 4 the output of latch 215 is provided to AND gate 236 over line 237 to provide an output on line 238 which output is ANDed with a $T_1$ signal at AND gate 239 to reset latch 210 and ANDed with a $T_2$ signal at AND gate 240 to reset latch 215.

The line delete function permits the deletion of a row of text on the display screen by positioning the cursor in the row to be eliminated. With the line delete function (F10) depressed at $T_{p0}$ and the keyboard function strobe (KFSR) AND gate 238 provides an output to a second AND gate 239 which is enabled by the line delete latch F10L to provide a set pulse to latch 240 through AND gate 241 if there is no index signal. The output of latch 240 appears on line 242 which is one input to the three input AND gate 243, a second input being provided on line 244 from AND gate 245 during retrace with no flyback at MAC 3 with a row compare signal. Then at $T_5$ an output is provided from AND gate 243 over line 246 to C PIN 51. At $T_6$ AND gate 247 provides an output signal to reset latch 240.

With the depression of the justify function key (F13) an input is provided on line 249 to latch 250 which is clocked in with the keyboard function code (KFSR) to provide an output on line 251 (which output is designated AM or automatic margin) to AND gate 252. The keyboard function strobe signal from strobe latch 212 is also provided to a function latch 254 where upon concurrence of a compare (COMP) signal provides a function compare (F COMP) signal which is also provided to AND gates 252 input and at $T_6$ with no index signal present a signal is applied to C PIN 52. The index latch 255 is set by AND gate 256 during time slot $T_{p0}$ with a keyboard function strobe and a depression of index key (F3). The latch 255 is reset through OR gate 257 at either master reset (MSR) or depression of the next page key (F2).

With depression of the edit key (F14), a signal is applied to line 258 to AND gate 259 which AND gate provides an output signal at $T_1$ of MAC 1 with retrace and flyback if there is no index signal present, the output being applied to C PIN 51. Edit is a text manipulation function which causes all text on a line to the right of the cursor to drop to a newly created next line with all other information below that also dropping a line.

With the depression of the select text key (F15), a signal appears on line 260 to the input of latch 261 which is clocked in through AND gate 262 at MAC 0 and $T_{p1}$ of retrace to provide an output on line 263 and AND gate 264 which provides an output signal at $T_2$ of MAC 1 with retrace and flyback to C PIN 51. The output of latch 261 on line 263 provides a clock pulse to latch 207 which has its input preset to a logical one level. With the clock pulse present an end select signal is available at the output. Latch 207 is then cleared through OR gate 208 upon occurrence of either a universal C strobe signal or a MAC 2 and $T_3$ signal during retrace and flyback. Select text enables the operator to select a body of text for further action upon subsequent command such as insert.

Additional functions from the keyboard 14 are illustrated in FIG. 14. The outputs of each of the function keys erase (F17), character add (F18), character delete (F19), backspace and line insert (F11) are transmitted as the function keys are depressed to a decode logic circuit 265 on lines 266, 267, 268, 269 and 270, respectively. The keyboard function strobe (KFSR) is also transmitted on line 271 to the decode logic circuit as are the function compare (F COMP) on line 272, inhibit erase on line 273, index on line 274, display time (DISPT) on line 278, compare (COMP) on line 279, edit on line 280, one unit delete on line 281, character add (CA) signal from overstrike program counter on line 282, and master reset (MSR) on line 283. Four outputs are provided from the decoder logic circuit 265 to be transferred to other cards over the data bus (C PINS 1, 2, 3 and 5) during time slot $T_7$ (see FIG. 5), these signals being character add over line 284 through AND gate 285 on C PIN 1 during time slot $T_7$, character delete on line 286 through AND gate 287 to C PIN 2 during time slot $T_7$, character double delete on line 288 through AND gate 289 to C PIN 3 during time slot $T_7$ and line insert over lines 290 through AND gate 291 to C PIN 5 during time slot $T_7$. These signals are all transferred during display time over the data bus 24 and are processed by the memory sub-system (see FIG. 10) after the memory has been addressed by a prior output signal from decode logic circuit 265 over line 292 through AND gate 293 during the preceding $T_2$ time slot through address encoder 294 over C PINS 55, 56, 57 and 58 of the address bus 28. A character delete function key is depressed, the signal appearing from decode logic circuit 265 over line 295 to AND gate 296 whereupon during time slot $T_7$ an output signal is applied to C PIN 52 of the special control and indicator bus 26. Similarly, a character add indicator is generated with depression of the character add function key from keyboard 14 over line 297 through AND gate 298 with concurrence of the F COMP signal, the output of AND gate 298 appearing on line 299 through AND gate 300 whose output is applied during time slot $T_7$ to C PIN 51.

The decode logic circuit 265 also provides four output signals for utilization by other parts of the keyboard interface 16, the signals being increment column cursor (INC 3) on line 305, hold on line (HOL 2) on line 306, row add compare (RA COMP) on line 307 and erase indicator (EIND) on line 308. The increment column cursor signal occurs with the character delete signal; the row add compare signal occurs upon concurrence of the line insert signal, and compare signal; while the erase indicator signal occurs with the depression of the erase function key (F17). The character erase function key deletes the character while leaving the blank space, while the delete key deletes the character and moves characters to the right thereof one space to the left, thereby closing up the space. Depression of either of these keys sets a flip-flop, the outputs of which are provided on line 310 for the erase flip-flop and on line 311 for the character delete flip-flop. With the character delete flip-flop set and the halfspace key struck, AND gate 312 is enabled along line 311 with an inverted input from erase flip-flop on line 310, the output being applied to register 313 where it is clocked in through AND gate 314 upon concurrence of time slot $T_2$, a compare signal with no flyback to provide an output on line 314 representing a one unit delete signal to AND gate 315. AND gate 315 is outputed when a second input is enabled by a signal on line 316 from AND gate 317 at MAC 2 and $T_3$ of retrace and flyback, the output being applied to C PIN 45 of the special control and indicator bus 26. Similarly, if the character add function key is depressed, latch 304 is set with the keyboard function strobe to enable AND gate 298 to provide an output to AND gate 319. If the half-space key is struck along with character add AND gate 319 is enabled and the output is clocked into the register 313 and read out over line 320 to AND gate 321 to provide a one unit add signal to C PIN 46 at MAC 2 and $T_3$ with retrace and flyback. C PIN 49 transmits a universal C strobe signal through AND gate 322 when its corresponding flip-flop within register 313 is set upon concurrence of an F COMP signal or a read enable signal at OR gate 323 (indicating that a key has been struck).

With activation of the back space function key from keyboard 14, a signal appears on line 324 to set latch 325 to provide an output to AND gate 326 which is enabled with a F COMP signal to provide a decrement column cursor signal on line 327 to register 313 which, when set, provides a back space on line 328 through AND gate 329 at MAC 2 and $T_3$ of retrace and flyback to C PIN 50. The register 313 also receives as an input the space bit (KM8) on line 330 to generate a space bar signal through AND gate 331 to C PIN 51. Similarly, a character signal is generated from register 313 upon concurrence of a read/enable (RS) signal and no space bit at AND gate 332, the output appearing on line 334 to AND gate 335 to C PIN 52 at MAC 2 and $T_3$ with retrace and flyback.

KEYBOARD INTERFACE-CONTROLS AND INDICATORS

FIG. 15 generally illustrates some of the internal signals utilized by the keyboard interface from the special control and indicator bus 26. C PINS 36 and 37 are dedicated lines for row compare and column compare signals, respectively. The row compare signal occurs once for each row giving 60 such signals (60 lines of memory) per refresh cycle. Upon concurrence of the two signals AND gate 350 is enabled during non-display time when latch 351 which has its J input preset to a logical 1 level is enabled, the output providing a fourth input to AND gate 350 which then supplies its output signal to a second latch 352 which is clocked in during time slot $T_{\mu 0}$ with the output of latch 352 being applied to AND gate 353 which is enabled at $T_0$ to generate a compare (COMP) signal. Latch 351 is then cleared through AND gate 354 during display time if there is neither the overstrike flip-flop signal or character delete signal or the erase flip-flop signal.

The signals transmitted over the special control and indicator bus 26 are shown in tubular form in FIGS. *9a–9c.* The keyboard logic for receiving the signals from a transmitting sub-system is as follows in FIG. 15. A signal appearing on C PIN 41 at MAC 4 and $T_3$ with retrace and flyback is clocked into latch 354 to generate an inhibit from tape signal from the tape sub-system 48 which is also ANDed at AND gate 3–5 with an end select signal from the keyboard interface itself to provide an inhibit erase signal.

A signal appearing on C PIN 45 at MAC 2 and $T_{\mu 5}$ of retrace and flyback is clocked into latch 356 to provide an output signal (DDC) to display the decimal tab and inhibit the overstrike to the keyboard. This signal would be transmitted by the tab sub-system 42.

A signal appearing on C PIN 49 at $T_{\mu 1}$ of display time is clocked into latch 357 to provide a backspace (BS) indicator signal from the indicator sub-system 34.

A signal appearing on C PIN 50 at time slot $T_{\mu 0}$ of display time is clocked into latch 358 to provide a "state 5" signal from the justify sub-system 44 indicating that the right hand limit is at the end of the justify zone.

A signal appearing on C PIN 50 at MAC 0 of $T_{\mu 2}$ at flyback and retrace is clocked into latch 359 to provide an output on line 360 which provides one input to AND gate 361, the other input being received from the "not Q" output of latch 362. The output of AND gate 361 is provided to the input of latch 362 to provide a double carriage return (DCR) signal (from typewriter simulator 12) at the Q output thereof. Latch 362 is clocked by the carriage return clock (CR CLK) signal which is generated on line 181 of FIG. 12 to provide a control input to multiplexer 170.

If a signal appears on C PIN 50 on $T_{\mu 2}$ of display time, it is clocked into latch 363 to provide a character indicator signal (CHAR) from the indicator sub-system 34. Latch 363 is cleared when C PIN 40 is activated at the next $T_{\mu 1}$ time slot through latch 364 which is then cleared at the next $T_0$ time slot.

If a signal appears on C PIN 50 at $T_{\mu 5}$ of display time it is latched into latch 365 to provide an output to latch 366 at the next $T_0$ time slot to provide a right hand margin indicator (RHM). Both latches 365 and 366 are then cleared on a row compare signal.

If C PIN 51 is activated at $T_{\mu 6}$ of display time latch 367 is set to provide an inhibit keyboard signal.

If C PIN 52 is activated at $T_{\mu 1}$ of display time latch 368 is set to provide a NUL signal, and if it is activated at $T_{\mu 3}$ of display time latch 369 is set to provide a left hand margin (LHM) indicator. Latch 368 is cleared at $T_2$ while latch 369 is cleared with a row compare signal.

Figure 16A:
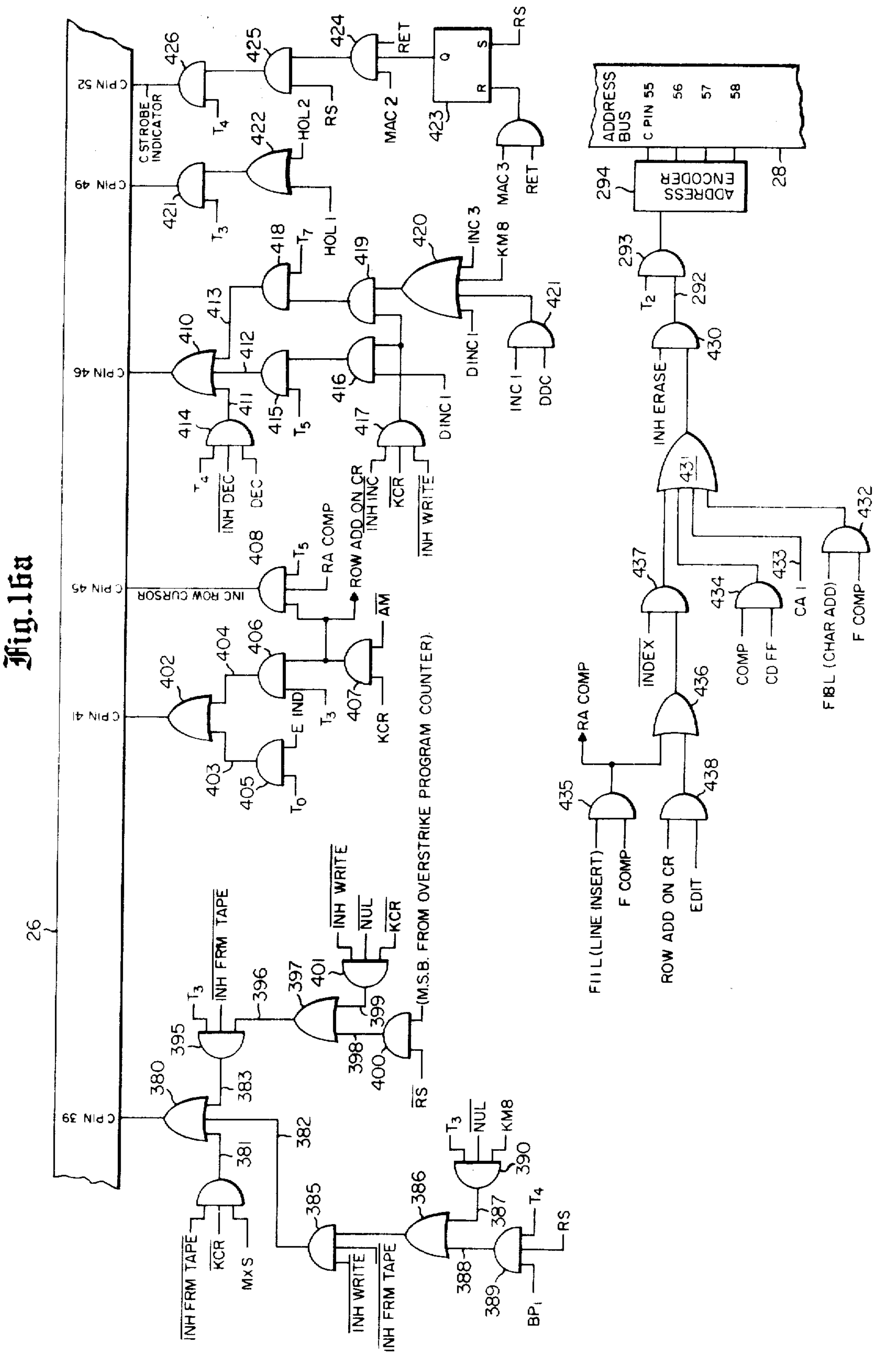
FIG. 16a is a block diagram showing signals generated by the keyboard sub-system for transfer over the special control and indicator bus.
Figure 16B:
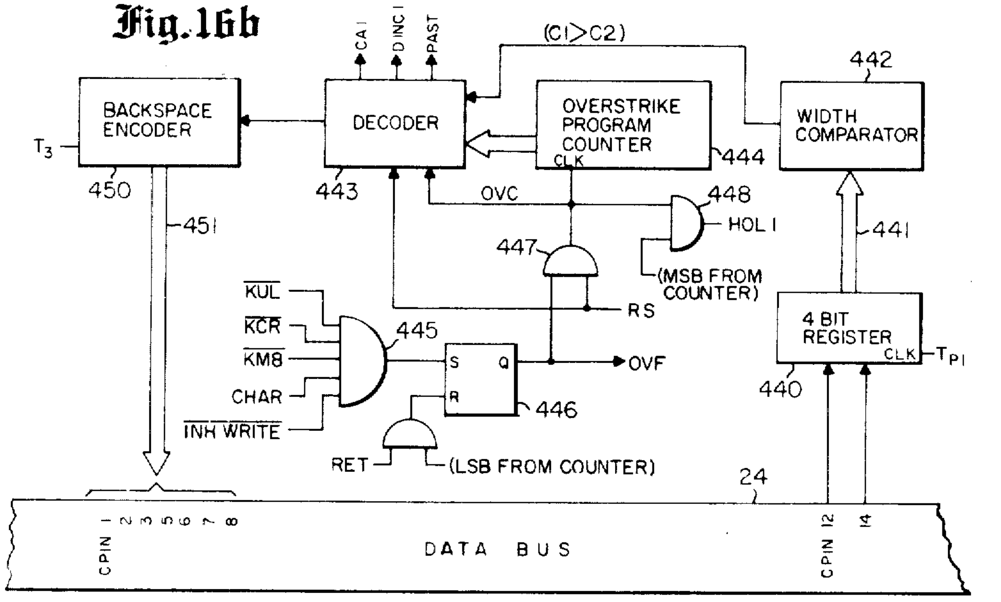
FIG. 16b is a detailed block diagram of the overstrike circuit of the keyboard sub-system.

FIGS. 16*a* and 16*b* illustrate the signals which are applied from the keyboard interface to the special control and indicator bus 26 and address bus 28. C PIN 39 of the special control and indicator bus 26 is generally utilized to issue write commands during time slot $T_4$ for writing into the previous memory location. The signals are applied through OR gate 380 from inputs 381, 382 or 383. Input 381 is enabled from the multiplexer set (MXS) signal at $T_3$ or $T_4$ (multiplexer 170, the $S_1$ control input shown in FIG. 12) if there is no keyboard character return signal or inhibit from tape signal. C PIN 39 is activated from line 382 through AND gate 385 if there is no inhibit write signal or inhibit from tape signal through OR gate 386. OR gate 386 receives inputs from either line 387 or line 388 at $T_3$ or $T_4$ respectively. Line 387 is enabled during time slot $T_3$ if there is no NUL indicator single (latch 368 of FIG. 15) with the existence of the space bit (KM8). Line 388 is enabled if there is an "active blank" indicator signal (BPI from decode logic circuit 265 of FIG. 14) at $T_4$ with a read enable signal (RS from line 197 of FIG. 12).

Line 383 is enabled to provide a write signal from AND gate 395 during time slot $T_3$ if there is no inhibit from tape signal and a signal appears on input 396 from OR gate 397 over either lines 398 or 399. Line 398 provides an input to OR gate 397 from AND gate 400 if there is no read enable (RS) signal and the most significant bit from the overstrike program counter is present. Line 399 provides an input to OR gate 397 from AND gate 401 if there is no inhibit write signal and no NUL indicator signal and no keyboard carriage return signal.

C PIN 41 receives control or indicator signals from OR gate 402 from either input line 403 or line 404. Line 403 is enabled through AND gate 405 at $T_6$ with the presence of an erase indicator (EIND) signal. This signal is generated by the decode logic circuit 265 on line 308 as shown in FIG. 14. Line 404 is enabled through AND gate 406 during time slot $T_5$ if an output signal appears at the second input of AND gate 406 from AND gate 407 which is enabled with the keyboard carriage return (KCR) signal and no justify or auto margin (AM) signal. The output signal from AND gate 407 is also labeled row add on carriage return to provide an input signal to the decode logic circuit 265 of FIG. 14. The output on line 404 issues a command to C PIN 41 during $T_5$ of display time to "load the column cursor".

The output of AND gate 407 is also supplied to AND gate 408 which during time slot $T_5$ with a row add compare (RA COMP) signal (from decode logic circuit 265) is enabled to provide an increment row cursor signal to C PIN 45.

C PIN 46 is used to issue commands to the display sub-system during display time to decrement the column cursor during time slot $T_4$ and to increment the column cursor during time slot $T_7$. These commands are issued through OR gate 410 from inputs 411, 412 or 413. The decrement column cursor signal from line 411 is caused by AND gate 414 during time slot $T_4$ if there is a decrement signal (DEC) with no inhibit signal. The increment column cursor signal on line 412 occurs through series AND gates 415 and 416 during time slot $T_5$ with an increment signal (DINC 1 from the overstrike program counter decoder) if there are no inhibit increment, keyboard carriage return, or inhibit write signals at AND gate 417. The increment cursor command is issued from line 413 from series AND gates 418 and 419 during time slot $T_7$ if OR gate 420 provides an output to AND gate 419 by either a space bit signal (KM8), a first increment signal (DINC 1), a second increment signal (INC 3), or a third increment signal (INC 1) ANDed with a display decimal tab and inhibit overstrike signal (DDC) at AND gate 421 (the latter signal being derived from latch 356 in FIG. 15).

C PIN 49 is utilized to issue commands to the memory through AND gate 421 during time slot $T_3$, the second input thereof being coupled to OR gate 422 to provide a first or second hold on line (HOL) signal. One of these signals (HOL 1) is derived from the overstrike program counter while the other is derived from the decode logic circuit 265 of FIG. 14, these signals being used to redirect the flow of information through the memory for further processing as will hereinafter be discussed.

C PIN 52 is used to transmit a C strobe indicator signal when a read enable (RS) signal sets latch 423, the output of which is ANDed with a MAC 2 and retrace signal at AND gate 424 to enable AND gate 425 with a read enable signal to provide a further output to AND gate 426 during time slot $T_4$ to provide the indicator signal. Latch 423 is then reset at MAC 3 of retrace.

The inputs to address bus 28 shown in FIG. 16*a* is an elaboration of the memory addressing from the decode logic circuit 265 of FIG. 14. As previously discussed, the memory is addressed through address encoder 294 which is gated by AND gate 293 over line 292 from AND gate 430. If there is no inhibit erase signal, one of several inputs is available to OR gate 431, the inputs being dependent upon the selection of one of certain functions by the operation such as line insert, edit, character delete, and character add. The character add (F18L) signal is ANDed with a function compare signal at AND gate 432 to provide one input to OR gate 431. A second character add (CA1) signal is derived from the overstrike program counter to provide a signal on line 433 to the OR gate 431. The character delete function occurs upon concurrence of a compare signal and the character delete flip-flop signal at AND gate 434 to provide an input to OR gate 431. The line insert (F11L) signal is ANDed with a function compare signal at AND gate 435, the output being transmitted through OR gate 436 through AND gate 437 if no index signal is present to OR gate 431 while the edit function signal is ANDed with a row add on carriage return signal at AND gate 438 through OR gate 436. Upon occurrence of any one of the aforementioned function signals, the memory is first addressed to enable it to accept additional commands regarding a particular function.

As shown and described in the previously mentioned patent application entitled "Electronic Text Display System Which Simulates A Typewriter" in addition to typing characters it is also possible to provide an overstrike, e.g., ¢). When it is desired to provide an overstrike, the cursor is placed under a character (c) by means of the space bar or backspace key and the second character (/) is typed over the first character to provide the overstrike. In order to accomplish this the memory must store in sequence the first character, a backspace code, and the second character, with the preference for storage being the widest character, backspace code, narrowest character. In order to accomplish this width data is transmitted from the data bus 24 (see FIG. 16b) over C PINS 12 and 14 and is clocked into a four bit register during time slot $T_{p1}$. During the next time slot $T_{p1}$, the additional two bits of width information relating to the second character are clocked into the register 440, with the output of register 440 being transmitted over cable 441 to a width comparator 442. The output signal of the width comparator 442 is transmitted to a decoder 443 which also receives inputs from overstrike program counter 444. The counter 444 is clocked as follows: if there is no keyboard underline (KUL) signal, no keyboard carriage return (KCR) signal, no space bit (KM8), no inhibit write signal and a character signal is present (indicating that the cursor is under a character) AND gate 445 is enabled to set latch 446 to provide an overstrike flip-flop (OVF) output which is ANDed at AND gate 447 with a read enable signal to clock counter 444. This clock signal is designated OVC and is also ANDed with the most significant bit from the counter 444 at AND gate 448 to provide a hold on line signal. Both the clock signal and the read enable signal are also provided to the decoder 443 to provide four output signals (CA1, DINC 1, and PAST and a fourth signal). The fourth signal is transmitted to a backspace encoder 450 which during time slot $T_3$ writes a backspace code over cable 451 onto C PINS 1, 2, 3, 5, 6, 7 and 8 of the data bus 24. As will hereinafter be discussed the character add signal opens up the space in memory for 1 character and the PAST signal indicates that operation is to take place in the character position previously on the data bus.

TYPEWRITER SIMULATOR CONTROLS

Figure 17:
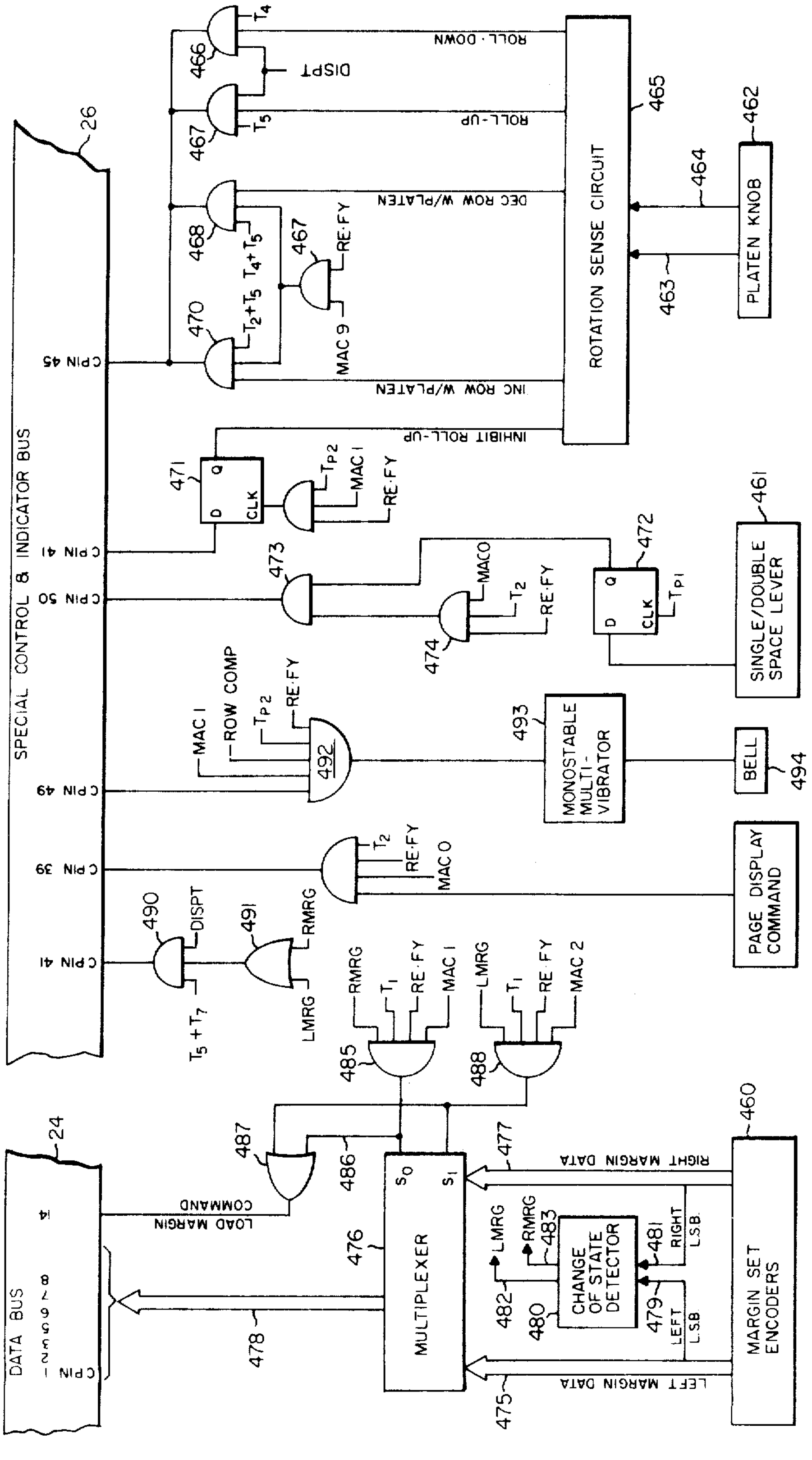
FIG. 17 is a block diagram of the typewriter simulator control.

The typewriter simulator controls sub-system 12 is fully shown and described in the aforementioned patent application entitled "Electronic Text Display System Which Simulates A Typewriter" and will hereinafter be described briefly in connection with FIG. 17. As discussed in the aforementioned patent application, the operator can format the margin positions by conventional typewriter levers for left and right margin, the position of the levers being suitably encoded in a margin set encoder 460. The operator can also control the spacing between lines by a single/double (or triple) space lever 461 which is shown in FIG. 17 and can be a simple on-off switch. The operator also has a set of platen knobs diagrammatically illustrated by the rectangle 462 for rolling the page up or down the display screen. The platen knobs 462 are generally rotary switches which provide signals on lines 463 and 464 to a rotation sense circuit 465 which sense the relative direction of rotation to provide either a roll down signal or a roll up signal during display time and time slot $T_4$ and AND gate 466 or at $T_5$ through AND gate 467 respectively to C PIN 45 of a special control and indicator bus 26. The rotation sense circuit 465 also Provides an output signal to decrement the row cursor with the platen knob during time slot $T_4$ or $T_5$ through AND gate 468 at MAC 9 of retrace and flyback (AND gate 469). Also generated during time slot $T_2$ or $T_5$ of MAC 9, retrace and flyback is an increment row cursor with platen knob signal through AND gate 470 this signal being applied to C PIN 45. If C PIN 41 is activated at MAC 1 at $T_{p2}$ of retrace and flyback time, latch 471 is set to provide an inhibit role up signal to the rotation sense circuit 465.

With respect to the spacing from spacing lever 461, if the switch is ON latch 472 is set at time slot $T_{p1}$ to provide an output to AND gate 473 which is enabled at its other input from AND gate 474 at MAC 0 and $T_2$ of retrace and flyback time to provide a signal on C PIN 50.

The margin set encoder 460 provides 6 bits of information for the left margin data over cable 475 to multiplexer 476 or a 7 bit code of right margin data over cable 477 to the multiplexer 476. This data is then selectively applied via cable 478 to C PINS 1, 2, 3, 5, 6, 7 and 8 of data bus 24. The least significant bit of the left margin data is also transmitted over line 479 to a change of state detector 480 which also receives the least significant bit of the right margin data over line 481. Any motion of a lever is detected by detecting the least significant bit inasmuch as the LSB signal changes with each position change. The change of state detector then issues a left margin (LMRG) signal over line 482 or a right margin (RMRG) signal over line 483, these signals being utilized to enable the control inputs of multiplexer 476. The right margin data is transmitted to the data bus 24 with a right margin signal at AND gate 485 during MAC 1 and $T_1$ of retrace and flyback to enable the $S_0$ control input of multiplexer 476. The output of AND gate 485 is also transmitted over line 486 through OR gate 487 to C PIN 14 of the data bus 24 to issue a load margin command. Similarly, the left margin data is transmitted to multiplexer 476 with a left margin signal at AND gate 488 during MAC 2 and $T_1$ of retrace and flyback with a corresponding load margin command issued to C PIN 14 through OR gate 487. A load column cursor signal is also issued over C PIN 31 during $T_7$ of display time through AND gate 490 if either the left margin or right margin signal is present at the inputs to OR gate 491.

With the right margin position set by the operator, a ring bell signal is generated a predetermined number of spaces prior to the right margin being reached, this signal being transmitted over C PIN 49 through AND gate 492 during MAC 1 and $T_{p2}$ of retrace and flyback with concurrence of a row compare signal. The output of AND gate 492 triggers a monostable multivibrator 493 which activates a bell 494.

POSITION INDICATOR SUB-SYSTEM

Figure 18A:
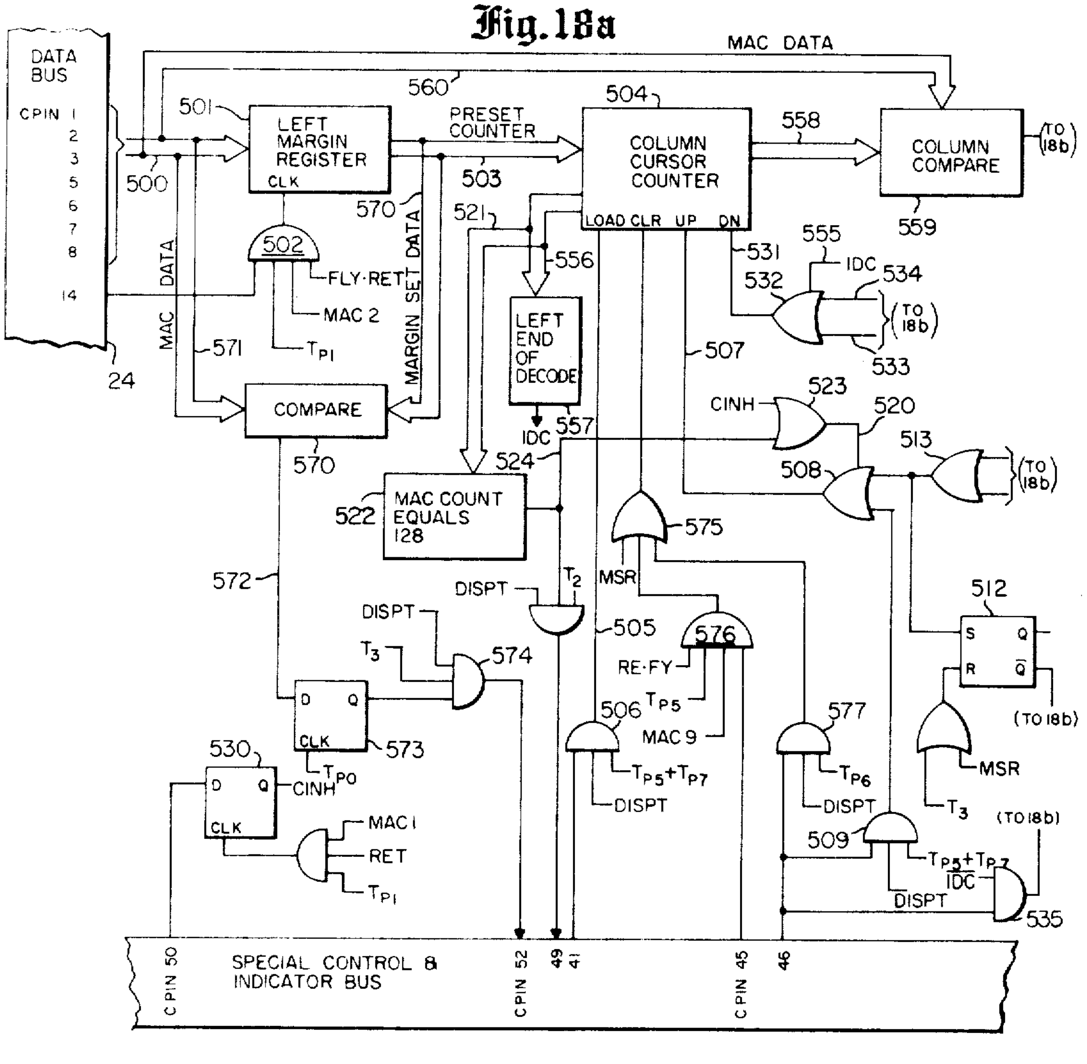
FIGS. 18a and 18b are a detailed block diagram of a portion of the position indicator sub-system.
Figure 18B:
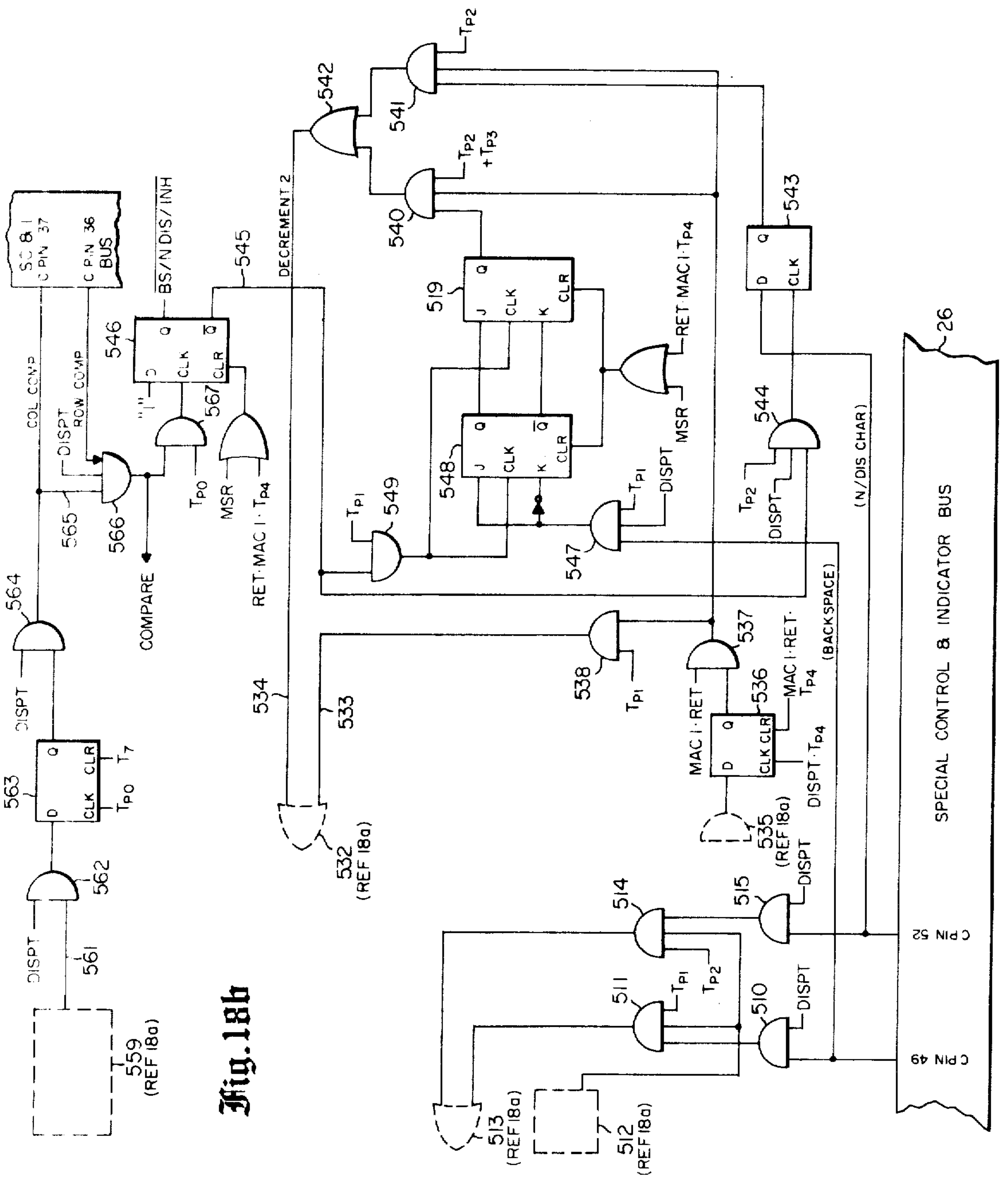

The position indicator or cursor sub-system is illustrated in FIGS. 18$a$, 18$b$ and 19. Referring specifically to FIGS. 18$a$ and 18$b$, the means of positioning the cursor on the display screen with respect to a particular column in memory line will be discussed. As previously mentioned a line of memory consists of 128 character locations or columns per line. The cursor on the display screen is generally under the control of the operator, but it is emphasized that after the operator has depressed the carriage return key the cursor returns to the previously set left margin position on the next line. The left margin data emanating from the multiplexer 478 of the typewriter simulator of FIG. 17 is transmitted over data bus 24 by cable 500 to a left margin register 501 and is clocked in with the load margin command appearing on C PIN 14 through AND gate 502 during MAC 2 and $T_{p1}$ of flyback and retrace time. This left margin data is then transferred from the register 501 over cable 503 to preset a column cursor counter 504 to the left margin position from whence the cursor is tracked. The column cursor counter 504 is loaded by an enabling pulse over line 505 from AND gate 506 during $T_{p5}$ or $T_{p7}$ of display time when C PIN 41 is activated. This load column cursor signal is received from the typewriter simulator AND gate 490. The counter 504 is then incremeneted by typing, spacing, etc. so that the cursor on the display screen is moved by operator action to the next location for operator action to occur. The incrment pulse occurs on line 505 through OR gate 506 upon initiation of certain signals during certain time slots over C PINS 46, 49 and 52. C PIN 46 provides an input signal through AND gate 507 during time slot $T_{p5}$ or $T_{p7}$ of display time to increment the column cursor (this signal is derived from OR gate 410 of the keyboard as shown in FIG. 16). C PINS 49 and 52 carry respectively the backspace and non-displayable characters indicators from the indicator sub-system which will hereinafter be discussed. Both backspace and non-displayable character indicators indicate the existence of coded information which is stored in a character location in memory and as such generate increment signals for the column cursor counter to track the memory although it is to be understood that the cursor on the display screen would not be similarly incremented. When C PIN 49 is activated during display time, a signal is generated through AND gate 510 to AND gate 511 which is enabled during time slot $T_{p1}$ if latch 512 is not set. The output of AND gate 511 is applied to OR gate 513 and then subsequently to OR gate 508 to increment the column cursor counter. The output of OR gate 513 also sets latch 512 to disable AND gates 511 and 514. Latch 512 is reset with either a master reset signal or during the next time slot $T_3$. If a signal appears on C PIN 52 during display time, an output is provided from AND gate 515 to AND gate 514 which provides an output signal during time slot $T_{p2}$ if latch 512 is not set. The output signal from AND gate 514 is utilized to increment the column cursor counter. The OR gate 508 has and inhibit input 520 to inhibit incrementing the column cursor counter upon one of two occurrences. When the column cursor counter output is transmitted over cable 521 to a decoder 522 and the column count equals 128, a first inhibit signal occurs on line 520 through OR gate 523 over line 524. Alternatively, C PIN 50 is activated at MAC 1 and $T_{p1}$ of retrace and latch 530 is enabled to provide a column inhibit (CINH) signal to provide a second input to OR gate 523.

The column cursor counter is similarly decremented over line 531 through OR gate 532, the signals appearing on either input line 533 or 534. The first decrement signal appearing on line 533 is activated by C PIN 46 through AND gate 535 if there is no inhibit decrement (IDC) signal (from decoder 557) to set latch 536 at $T_{p4}$ of display time. The output of latch 536 is read out through AND gate 537 at MAC 1 of retrace to provide an input to AND gate 538 during time slot $T_{p1}$ to provide the decrement signal on line 533. The output of AND gate 537 appearing on line 539 provides first inputs to AND gates 540 and 541 respectively each of which has its output coupled to the inputs of OR gate 542 to generate the decrement signal appearing on line 534. If C PIN 52 is activated at $T_{p2}$ of display time (non-displayable character indicator from indicator sub-system) latch 543 is set provided AND gate 544 is not disabled by input line 545 if flip-flip 546 is set. The output of latch 543 is coupled to the input of AND gate 541 where at MAC 1 and $T_{p2}$ of retrace AND gate 541 is enabled to provide a decrement signal. Alternatively if C PIN 49 is activated at $T_{p1}$ of display time, AND gate 547 is enabled (backspace indicator from indicator sub-system) to be clocked into JK flip-flop 548 if clock input AND gate 549 is not disabled by the setting of flip-flop 546. During the next time slot $T_{p1}$ the output of flip-flop 548 sets flip-flop 519 to enable AND gate 540 which provides an output at MAC 1 and retrace during time slot $T_{p2}$ or $T_{p3}$ to provide the second decrement signal on line 534. OR gate 532 has an inhibit input (IDC) on line 555 which inhibit is enabled if the column cursor count output on cable 556 to decoder 557 indicates that the left end of the display has been reached. The output of the column cursor counter 504 appearing on cable 558 is available to a column comparator 559 which at each $T_0$ receives MAC count data over cable 560 from the data bus 24. A column compare signal will be generated once for each line or row of text information to provide an output on line 561 to AND gate 562 which during display time provides an input to latch 563 which input is clocked in during time slot $T_{p0}$. The output of latch 563 is further ANDed at AND gate 564 with a display time pulse to provide a column compare signal to C PIN 37 of the special control and indicator bus. This signal lasts until the next time slot $T_7$ at which point in time latch 563 is cleared. The output of AND gate 564 provides an input on line 565 to AND gate 566 which is enabled during display time with a row compare signal received from C PIN 36 to provide a compare signal at the output thereof. When the compare signal occurs during time slot $T_{p0}$ AND gate 567 is enabled to clock latch 546 with a preset 1 signal to drive the not Q output to a logical zero level thereby disabling line 545. Latch 546 is cleared by either a master reset signal or during MAC 1 and $T_{p4}$ of retrace.

The margin set data from the left margin register 501 is transmitted by cable 570 to a margin comparator 571 which at each time slot $T_{p8}$ receives MAC count information from the data bus 24 over cable 571. When a compare signal is generated, this indicates that the memory address column is at the left margin set value to give an at left margin indicator output over line 572 to a retiming latch 573 which is clocked in at $T_{p0}$. The output of latch 573 is ANDed with a $T_3$ and display time signal at AND gate 574 to provide a at left margin indicator on C PIN 52. The column cursor counter 504 is cleared from OR gate 575 by either a master reset signal or from AND gate 576 during MAC 9 and $T_{p5}$ of retrace and flyback if C PIN 45 is activated or if AND gate 577 is enabled during time slot $T_{p6}$ of display time with C PIN 46 being activated.

Figure 19:
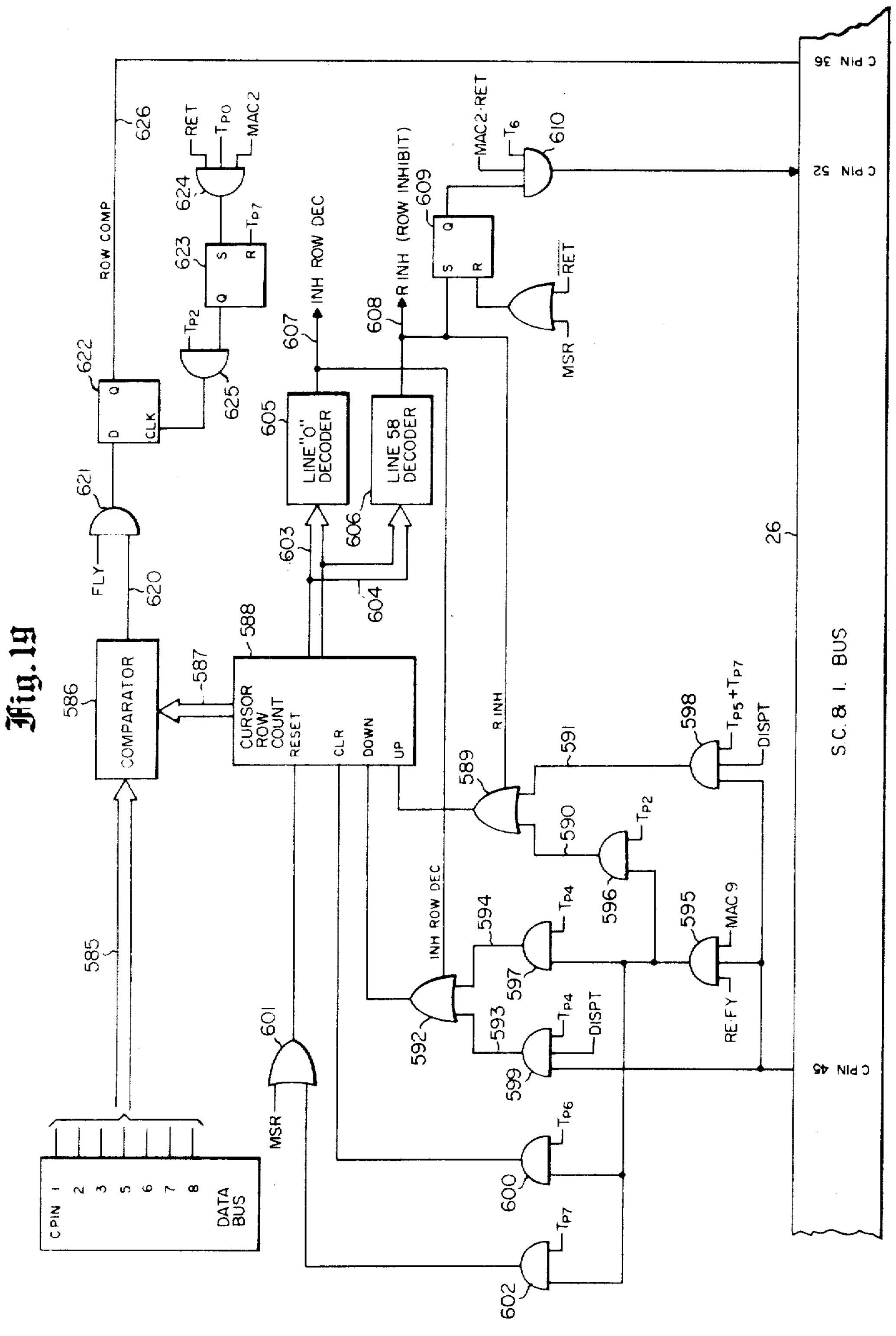
FIG. 19 is a detailed block diagram of the balance of the position indicator sub-system.

As previously discussed in connection with the data bus row count information is transferred over the data bus during MAC 2 and time slot $T_2$ of each retrace cycle. As shown in FIG. 19 this data appears on data bus 24 where it is transferred over cable 585 through comparator 586 which receives cursor row count information over cable 587 from a cursor row counter 588. The counter 588 is incremented or decremented by pulses received from the special control and indicator bus 26 over C PIN 45. The count is incremented through OR gate 589 from either input 590 or 591 while the row count is decremented through OR gate 592 from either input 593 or 594. The row count can be incremented or decremented by the platen knobs as discussed in connection with the typewriter simulator (FIG. 17) through AND gate 595 at retrace and flyback of MAC 9 with the row increment taking place at AND gate 596 during time slot $T_{p2}$ to input 590, and the row decrement taking place on line 594 through AND gate 597 during time slot $T_{p4}$. The increment signal appearing on line 591 receives its input signal through AND gate 598 from the roll up signal from the typewriter simulator during time slot $T_{p5}$ of display time. The decrement signal appearing on line 593 occurs through AND gate 599 from the roll down signal from the typewriter simulator during time slot $T_{p4}$ of display time. If C PIN 45 is activated during time slot $T_{p6}$ of retrace and flyback at MAC 9 the counter 588 is cleared through AND gate 600. The counter can be reset through OR gate 601 by a master reset signal or an output signal from AND gate 602 during time slot $T_{p7}$ of retrace and flyback time during MAC 9. The cursor count from counter 588 is transferred over cables 603 and 604 to decoders 605 and 606. Decoder 605 detects line 0 to provide an inhibit row decrement output on line 607 which is transmitted to an inhibit input to OR gate 592, while decoder 606 detects line 58 to generate a row inhibit output signal on line 608 which is transmitted to an inhibit input to OR gate 589. As previously discussed, line 59 does not contain character information and upon the occurrence of the row inhibit signal on line 608 a latch 609 is set, the outpur of which is transferred to C PIN 52 through AND gate 610 during time slot $T_6$ at MAC 2 and retrace. Latch 609 is then subsequently reset by either a master reset signal or no retrace signal. When the cursor row count signal on cable 587 is equal to the row count information from cable 585 to comparator 586 an output occurs on line 620 which enables AND gate 621 during flyback to set a latch 622 when a clock pulse is received. The clock pulse is generated by setting a latch 623 from AND gate 624 during $I_{p0}$ of MAC 2 of retrace, which output is then read out during time slot $T_{p2}$ through AND gate 625 to provide the clock pulse. When latch 622 is enabled, a row compare signal (see also FIG. 7*b*) appears at the output on line 626 to C PIN 36 of the special control and indicator bus 26. Latch 623 is then reset during time slot $T_{p7}$.

INDICATOR SUB-SYSTEM

Figure 20A:
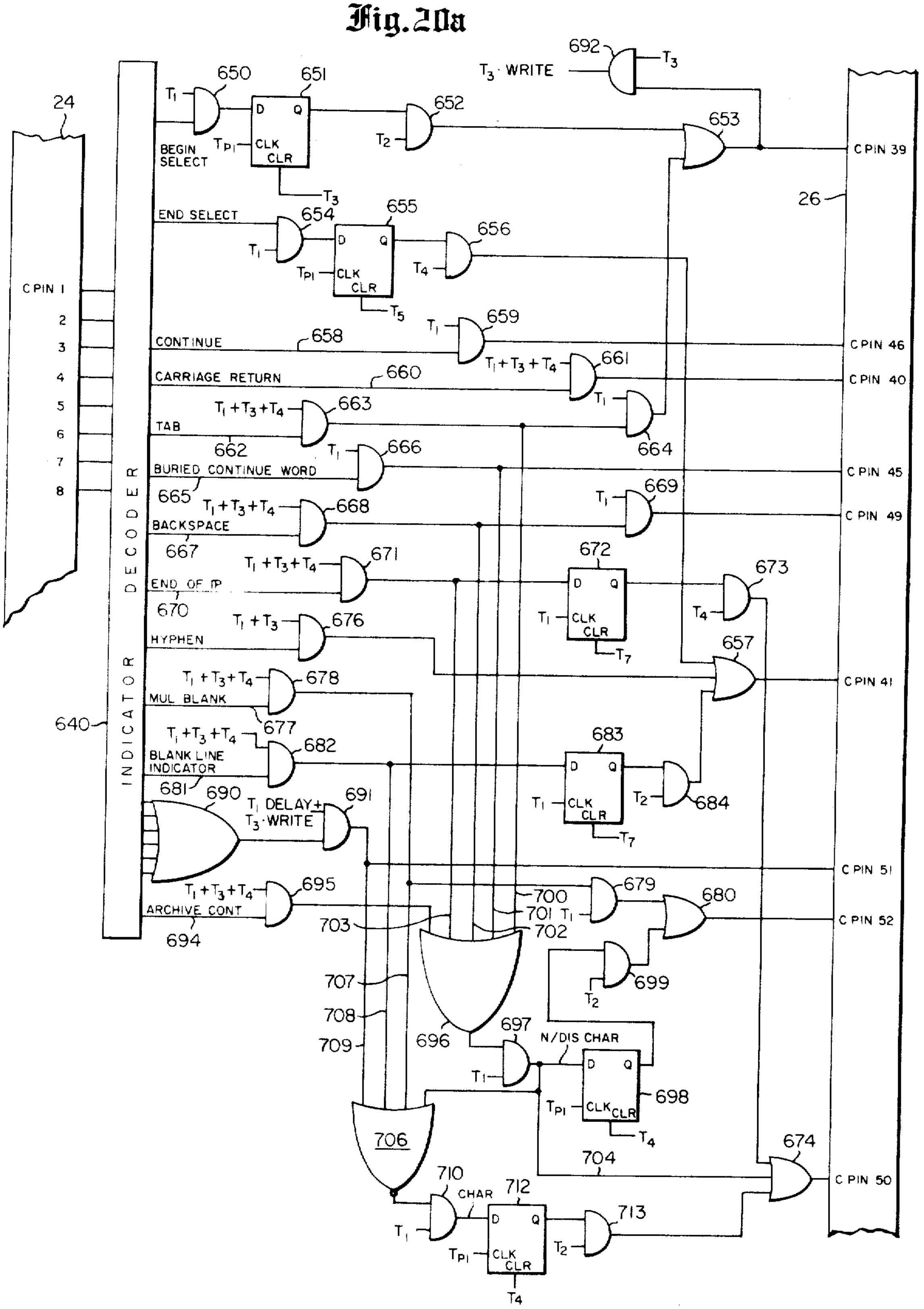
FIGS. 20a and 20b is a detailed block diagram of the indicator sub-system.

The indicator sub-system 34 (of FIG. 1) is schematically illustrated in FIG. 20*a*. In the operation of the system, certain 7 bit codes transmitted to the indicator sub-system 34 are generated by means of the keyboard such as carriage return and hyphen. Other codes are placed on the data bus as a consequence of certain operator action whereby code is subsequently placed on a line. For example, as previously discussed, certain operator sequences indicate the end of a paragraph, these sequences being monitored by the clean-up/hyphen sub-system 46 (of FIG. 1), the sub-system monitoring the displayable text at all times to provide an inhibit merge signal as required when the merge switch is activated and the operator sequences are detected. Alternatively, the sequences can give rise to an insertion of an end paragraph code. In either event, the beginning of the next line cannot be shifted up into the line where the operator sequences indicate a paragraph ending. The clean-up/hyphen sub-system 46 also places carriage return codes into the memory as required; removes carriage return codes buried between two words as the text is manipulated; removes end paragraph codes buried in text (if these codes are used in lieu of an inhibit merge signal); inserts and removes the line empty codes; and further makes certain only NUL blanks lie to the right of a valid carriage return. Furthermore, as previously discussed, the backspace code can be written in with an overstrike if desired. Additionally, when a line contains a hyphen which is detected as a continue word (meaning that the balance of the word followed by a hyphen was written on the next line) a continued code is written to indicate the occurrence. If the text is manipulated so that the hyphen appears between two characters on the same line, the clean-up/hyphen sub-system 46 converts the continued code and the hyphen into a buried continue code.

When the operator depresses the select function key of the keyboard a pulse is generated which is received by the edit/merge sub-system 36 which then places an appropriate 7 bit code on the data bus; and similarly, at the end of the select by the operator a pulse is generated which is also received and converted to a 7 bit code by the edit/merge sub-system 36. A tab function signal is likewise received by the tab sub-system 42 to generate a tab code.

Whenever a line of memory is blank, a blank line code is placed in the first character storage position.

As previously discussed, a space between letters is originally a two-unit preferred blank, this being designated an active blank code. The active blank encoder 196 (of FIG. 12) then converts this blank code, if necessary, depending on the relative heights of the two characters interposed by the blank space. The active blank code can be one of twelve codes indicating one, two, three or four unit, preferred, acceptable or non-decrementable blanks. During the justifying procedure, the justify sub-system 44 detects the codes and expands or contracts spaces on pre-established priority bases. In doing so, the justify sub-system 44 rewrites the active blank code to reflect the change by placing the new code on the data bus during time slot $T_4$ and issuing a write command over C PIN 39 to change the contents of the past character register (after the active blank indicator signal is received to indicate the blank code is present).

Figure 20B:
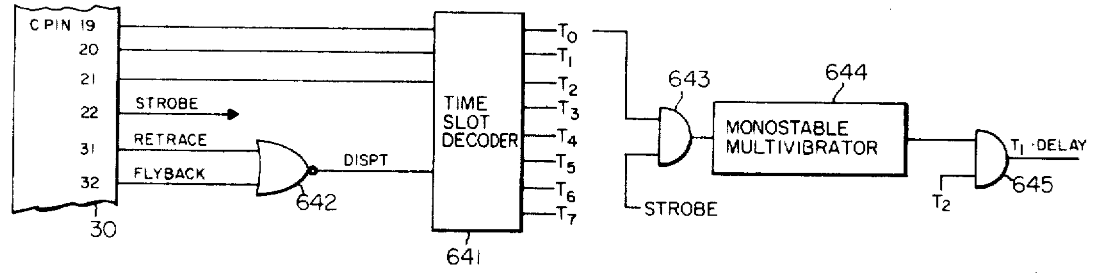

All the previously discussed codes are received over data bus 24 by an indicator decoder 640 which then provides indicator signals at the proper times to the special control and indicator bus 26. Timing signals (FIG. 20*b*) for the indicator sub-system 34 are received over timing bus 30 with C PINS 19, 20 and 21 providing time slot information to a time slot decoder 641 to provide the $T_0$–$T_7$ time slots. C PINS 31 and 32 provide retrace and flyback signals which are inputed to NOR gate 642 to provide a display time (DISPT) signal thereby enabling the time slot decoder 641 only during display time. Although the timing bus 30 and time slot decoder 641 has not been shown in the FIGURES relating to the previously discussed sub-systems, it is to be understood that a similar arrangement pertains to all other sub-systems to provide the necessary timing signals. Time slot $T_0$ from decoder 641 is ANDed with a strobe from C PIN 22 at AND gate 643 to provide an input to a monostable multivibrator 644, the output of which is ANDed with a $T_1$ time slot pulse to provide a $T_1$ delay signal.

When the indicator decoder 640 detects a begin select code a single pulse output is provided to AND gate 650 which is enabled at $T_1$ to set a flip-flop 651 which is read out at time slot $T_2$ through AND gate 652 through OR gate 653 to C PIN 39 of the special control and indicator bus 26. When the end select code is detected, a puls- appears at AND gate 654 which during time slot $T_1$ is clocked into flip-flop 655 and read out through AND gate 656 during time slot $T_4$ through OR gate 657 to be applied to C PIN 41. Latch 655 is then clearned during time slot $T_5$.

When a continue code is detected an output appears on line 658 which provides one input to AND gate 659 which is read during time slot $T_1$ to apply a signal to C PIN 46. The carriage return code when detected initiates a pulse on line 660 which enables AND gate 661 which is read out during time slot $T_1$ or $T_3$ or $T_4$ to apply a signal to C PIN 40. If a tab code is detected by indicator decoder 640 a signal appears on line 652 which enables AND gate 653 which during time slot $T_1$ is read out through AND gate 664 through OR gate 663 to C PIN 39. With the detection of a buried continue word code a signal appears on line 665 which is read out of AND gate 666 during time slot $T_1$ to apply signal to C PIN 45. The existence of a backspace code initiates a signal along line 667 which is read out through AND gates 668 and 669 during time slot $T_1$ to supply a backspace indicator to C PIN 49.

Similarly, a detection of end of paragraph code initiates a pulse output on line 670 which is outputted through AND gate 671 during time slot $T_1$ to provide an input to retiming flip-flop 672, the output thereof being read out through AND gate 673 during time slot $T_4$ to be applied through OR gate 674 to C PIN 50. The latch 672 is then cleared during time slot $T_7$. A hyphen code initiates a pulse on line 675 which can be read through AND gate 676 during time slot $T_1$ or $T_3$ through OR gate 657 to apply a hyphen indicator signal to C PIN 41. A "NUL blank" code provides a pulse output on line 677 which is then read out through series AND gates 678 and 679 during time period $T_1$ through OR gate 680 to be applied to C PIN 52.

If a blank line code is detected, a signal appears on line 681 which is clocked into latch 683 through AND gate 682 during time slot $T_1$ and read out through AND gate 684 during time slot $T_2$ through OR gate 657 to apply a signal to C PIN 41. The latch 683 is then cleared during time slot $T_7$.

As previously discussed, there are twelve active blank codes, the occurrence of any one passing a signal through OR gate 690 to one input of AND gate 691 which is enabled by a $T_1$ delay signal or a $T_3$ and write signal (the latter signal coming in over C PIN 39 during time slot $T_3$ to AND gate 692). The output of AND gate 691 is then transmitted to C PIN 51 to provide an active blank indicator signal.

The existence of an archive code initiates a pulse on line 694 which is read through AND gate 695 during time slot $T_1$ to provide an input to OR gate 696 and in series therewith AND gate 697 during the same time slot to give a non-displayable character indicator. The output of AND gate 697 provides an input to flip-flop 698 which is clocked in during the window time of $T_{p1}$, the output thereof being read through AND gate 699 during time slot $T_2$ through OR gate 680 to C PIN 52. AND gate 697 also provides non-displayable character indicators from the tab output on line 700 the buried continued output on line 701, the backspace signal from line 702, and the end of paragraph signal on line 703. The latch 698 is then subsequently cleared during time slot $T_4$. The non-displayable character signal appearing at the output of line 697 is also applied over line 704 through OR gate 674 to C PIN 50 during the time slot $T_1$.

The output of AND gate 697 (N/DIS CHAR) is also provided to a NOR gate 706, the other three inputs thereof being provided over line 707 (NUL blank), line 708 (blank line indicator) and line 709 (active blank) whereby the existance of none of the four inputs provides an output to AND gate 710 during time slot $T_1$ to give a character indicator signal which is latched into latch 712 during time slot $T_{p1}$. The output is then read out through AND gate 713 during time slot $T_2$ through OR gate 674 to be applied to C PIN 50. Latch 712 is then cleared during time slot $T_4$.

As can be seen, when a particular code appears on the data bus 24, a pulse is applied to the special control and indicator bus 26, the pulse being assigned a time slot and C PIN for the particular code. This pulse is then sensed by other sub-systems utilizing the code to enable gates therein for further action in response to the code.

DISPLAY SUB-SYSTEM

Figure 21:
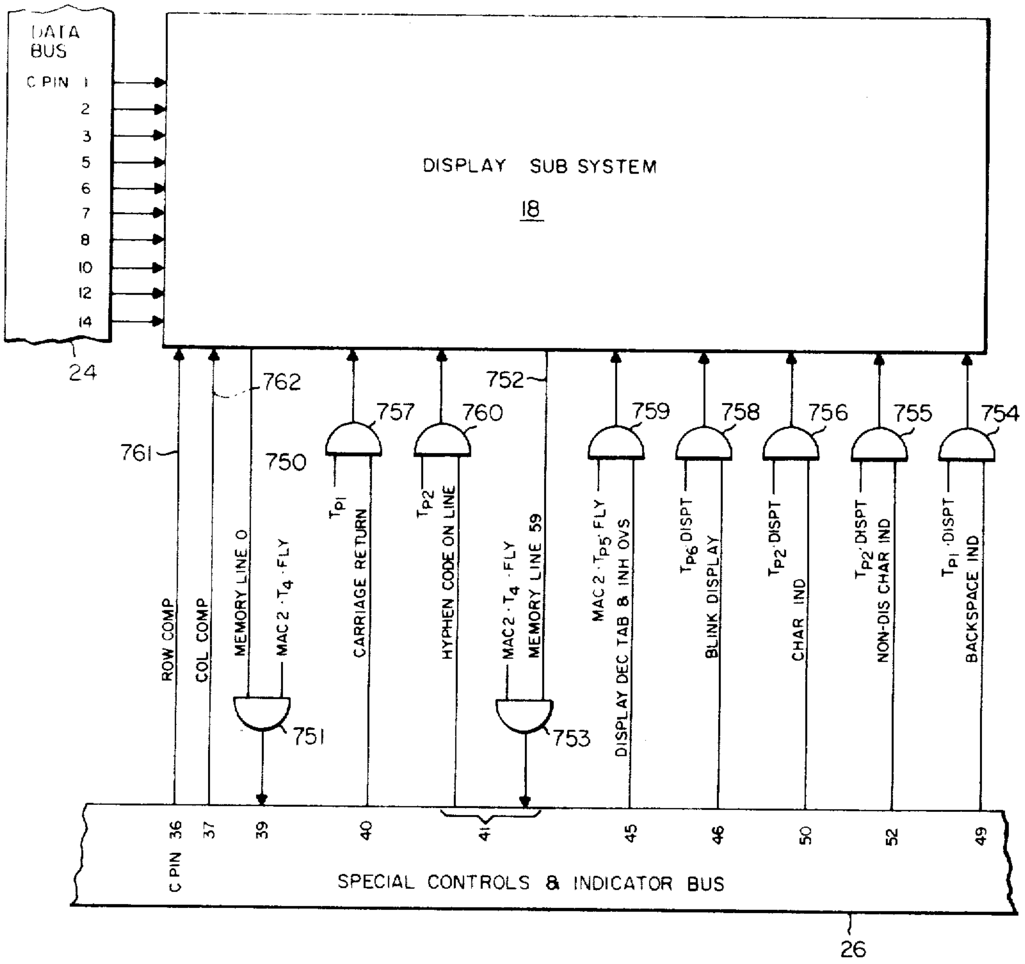
FIG. 21 is a block diagram of the display sub-system.

Referring now to FIG. 21 the display sub-system 18 receives character information from the data bus 24 as well as indicator signals from the special control and indicator bus 26. The display sub-system 18 also receives time slot information from the timing bus (not shown) as well as MAC count information from the data bus 24 to initiate two signals back to the special control and indicator bus 26, a first signal appearing on line 750 indicating memory line zero 0 which at MAC 2 and $T_4$ of flyback enables AND gate 751 to apply a signal to C PIN 39; the second signal being initiated by the display sub-system over line 752 to indicate memory line 59 which at MAC 2 and $T_4$ of flyback enables AND gate 753 to apply a signal to C PIN 41.

Input signals into the display sub-system 18 from the indicator sub-system include backspace indicator through AND gate 754 during $T_{p1}$ of display time; non-displayable character indicator through AND gate 755 during $T_{p2}$ of display time; character indicator through AND gate 756 during $T_{p2}$ of display time; and carriage return indicator of C PIN 40 through AND gate 757 during $T_{p1}$ of display time. A blink display signal emanates from C PIN 46 through AND gate 758 at $T_{p6}$ of display time from the keyboard to blink the textual information onto the display screen that has been selected by the operator for further text manipulation. C PIN 45 at MAC 2 and $T_{p5}$ of flyback time enables AND gate 759 to provide a display decimal tab and inhibit overstrike signal. When the hyphen code is on the line, C PIN 41 provides a signal to the display sub-system 18 during the time slot $T_{p2}$ through AND gate 760.

The row compare and column compare signals are supplied to the display sub-system 18 from C PINS 36 and 37 over lines 761 and 762 respectively.

The display sub-system and the actual generation of the characters is more fully shown and described in co-pending patent application entitled "Character Display System", Ser. No. 234,040, filed Mar. 13, 1972, by J. N. Puckett, et al and assigned to the assignee of the instant application. The display system therein described traces a succession of strokes on a display tube to generate each character. A particular character is traced during a particular MAC count time during which time the coded signal therefor appears on the data bus 24. The 7 bits of character information inputted into the display sub-system 18 is utilized to address a display read only memory, the output of which is processed to control the deflection of the electron beam as well as the Z axis of the beam. The input signals shown in FIG. 21 are display control signals to control, among other things, the Z axis and to indicate an overstrike to deflect the electron beam over a preceding character to generate the character desired.

CHARACTER BUFFER

Referring now to FIGS. **22*a* and 22*b* the details of the character buffer 127 (see FIG. 11) will be discussed in detail. Numbers corresponding to elements depicted in FIG. 11** are used herein again.

Character data (displayable or non-displayable) entered by the operator is transferred into the memory through the character buffer. Data previously entered into the system enters the character buffer serially from the line buffer along line 148 into the serial to parallel shift register 149. As previously discussed in connection with FIG. 12 the keyboard generates a 7 bit alphanumeric code plus an eighth bit which is then transferred through a multiplexer during time slot T or T to the data bus 24 while simultaneously a write command is issued from the keyboard during time slot T or T which command is transmitted over C PIN 39 (see FIG. 16). The issuance of a write command during time slot T enables the data to be written into the past character register 129. As shown in FIG. 22 the write command appears from C PIN 39 on line 800.

Assuming the entry of data into the system by the operator via the keyboard, the data appears on the data bus 24 during time slot T (for entry into the on-line register 128) and is transferred over cable 131 to the input of multiplexer 130. Upon concurrence of a write command signal on line 800 and time slot T AND gate 801 is enabled to apply a pulse to S control input of the multiplexer to allow the data to be transferred over cable 132 to on-line register where during time slot window T AND gate 802 provides an output through OR gate 803 to clock the information into register 128. As previously discussed in connection with FIG. 3*c*, time slot $T_{p3}$ is of smaller duration than time slot $T_3$ within time slot $T_3$, the rising edge of time slot $T_{p3}$ occurring at a later time to provide a window of time within a time slot to allow for propagation delays. The output of on-line register 128 is immediately available through cable 804 to the second multiplexer 134 which has its $S_0$ control input preset to a logical 1 level through inverter 805. During the next succeeding time slot $T_0$ with no "upper buffer stop" signal (U STOP) and a Delta 2 time bit present OR gate 806 is enabled to provide a clock pulse to past character register 129 to thereby load the data therein. During the next time slot $T_0$ the data from the past character register 129 is loaded into a parallel to serial shift register 137 through cable 136. As previously discussed, each time slot is divided into 8 Delta T time bits (curve 85 of FIG. 3*c*) with each time bit corresponding to the time for transferring one code bit. Consequently, at $T_0$ and Delta 2 with no upper buffer stop signal AND gate 807 is enabled to shift the first bit of information on line 808 to provide a first input to AND gate 809 which has its second input preset to logical 1 level through inverter 810 provided there is no "master reset" signal. Similarly, during the Delta 2 time bit of time slot $T_1$, $T_2$, etc. the remaining seven bits are shifted out on line 808 in serial fashion through AND gate 809 through OR gate 811 to output line 812. With a "normal" signal present (no character add signal) AND gate 813 is enabled to provide the serial bit data output through OR gate 814 on line 815 to AND gate 816 which has its second input preset to a logical 1 level through inverter 817 if there is no insert NUL blanks signal (character delete or character double delete). The serial bit data from AND gate 816 then passes through OR gate 818 back to memory.

If data appears on the data bus 24 during time slot $T_4$ and a write command signal is issued during time slot $T_4$ over C PIN 39, the data is transferred from the data bus 24 over cable 131 over cable 143 to the second input of the second multiplexer 134 where during time slot $T_4$ AND gate 819 is enabled to drive the $S_1$ control input positive to transfer the information over cable 135 where during the window of time $T_{p4}$ AND gate 820 is enabled to write a signal through OR gate 806 to clock the information into the past character register 129 thereby replacing the information previously present. The data is then transferred out as previously discussed.

After the data has been entered, character data is transferred serially from memory (specifically from the line buffer) along line 148 where it is loaded into serial to parallel shift register 149 which each bit being clocked in during successive time slots of a given MAC time. At the next succeeding $T_0$ time slot the parallel information is transferred on cable 150 to be clocked through multiplexer 130 (with its control input $S_0$ enabled at $T_0$) over cable 132 to on-line register 128.

During time slot T, this data is gated out over cable 133 through gate 821 over cable 822 back to the data bus 24. Simultaneously, the data on cable 133 is applied to a width read-only memory 823 where two bits of width data are read out and applied to the data bus C PINS 12 and 14 through AND gates 824 which are enabled during time slot T, of display time. In this manner proportional spacing (i.e., giving each character a space on the line of text proportional to its width) is accomplished.

Figure 22B:
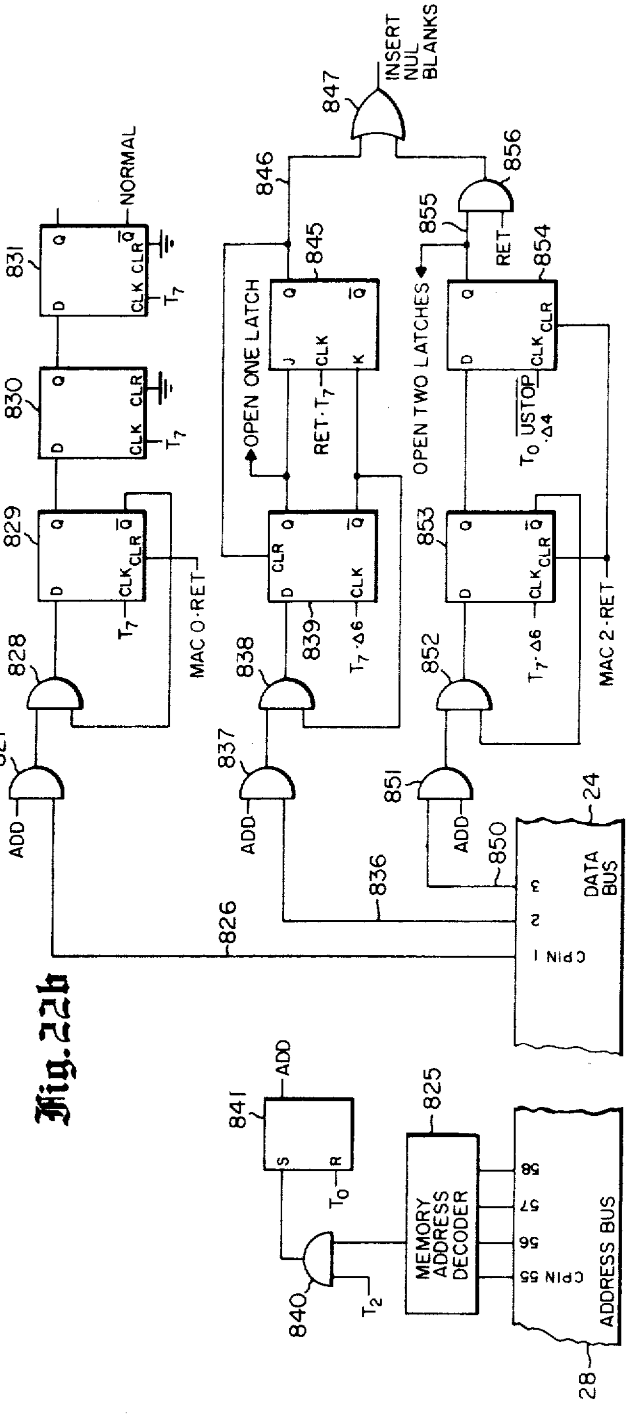
FIGS. 22a and 22b is a detailed block diagram of the character buffer of FIG. 11.

If it is desired to add a character, delete a character or delete two characters as shown in the table of FIG. 10, (Transfers I, II and III, respectively), the memory is first addressed as shown in FIG. 22*b* and the appropriate commands are issued over C PINS 1, 2 and 3, respectively, during time slot $T_7$ of display time (see also table of FIG. 5 time slot $T_7$). The timing for addressing the memory within a given line of text for these operations is determined by the location of the position indicator or cursor. The four bit code unique to the memory is transmitted over address bus 28 C PINS 55, 56, 57 and 58 to a memory address decoder 825 which provides an output to AND gate 840 which passes through during time slot T to set latch 841 and provide an address (ADD) output signal upon receipt of the appropriate code. Latch 841 is reset at the next succeeding time slot T. (See also address bus of FIG. 14 and FIG. 16).

If a character add signal is present, the operator desires to add a space for a character in memory at a location above the cursor and move the character in that location along with the balance of the line one character position to the right. This signal appears on C PIN 1 and is transmitted over line 826 to the first input of AND gate 827 where the occurrence of the address signal provides an output to AND gate 828 which has its second input tied to the not Q output of flip-flop 829. The output of AND gate 828 is clocked into latch 829 during time slot T to provide an output and disable AND gate 828. The output of latch 829 is then supplied sequentially to time delay flip-flops 830 and 831 to remove the normal signal. When the normal signal goes to a logical 0 level AND gate 813 (FIG. 22*a*) is disabled and AND gate 832 is enabled through the inverter 833. The serial in-serial out shift register 835 is then added to the memory loop to make it one character location longer; thereby adding a character space. The register is initially filled with a nul blank code. This code is then clocked out of register 835 during each Delta 7 time bit of each T—T time slot. At MAC 0 of Retrace latch 829 is cleared and two character times later the normal signal is reapplied thereby disabling AND gate 832. In this way, a space can be opened up in memory to add a character as desired.

If a character delete signal is initiated, the character above the cursor is deleted and all characters to the right thereof are moved left one character space. This signal appears on C PIN 2 during time slot T (FIG. 22*b*) the signal being transferred over line 836 to AND gate 837 where with concurrence of an address signal the output is transmitted to AND gate 838, the second input of which is coupled to the not Q output of latch 839. The output of AND gate 838 is then transmitted to the input of latch 839 where during Delta 6 time bit of time slot T it is clocked in to provide an output designated "open 1 latch". This signal is then transmitted to on-line register 128 (FIG. 22*a*) to provide a clock pulse through OR gate 840 and serially through OR gate 803. As soon as latch 839 has an output (shortly after T and Delta 6 time bit) on-line register 128 acts as a short circuit thereby passing data appearing on cable 132 at time slot T directly through to past character register 129 thereby effectively reducing the length of the line of text one character location. The open 1 latch signal exists for the balance of the line (until Retrace). The output of latch 839 is then clocked into latch 845 during time slot T as soon as a retrace pulse is initiated (beginning of MAC 1). This provides an output on line 846 which is then fed back to clear latch 839. The output on line 846 is transmitted through OR gate 847 to provide a first insert nul blanks signal which is provided to AND gate 848 thereby enabling it and disabling AND gate 816 to permit input pulses T or T to provide outputs through AND gate 848 and through OR gate 818 back to memory. This would effectively insert a nul blank into a space at the end of the line of text to account for the space previously occupied by the character deleted. The NUL blank signal would remain high for one MAC count inasmuch as at the next T time slot of retrace (beginning of MAC 2) no data is present at the J input of latch 845 thereby removing the signal on output line 846.

If a character double delete signal is present on C PIN 3 during time slot T, the information is transmitted over line 850 to AND gate 851 (FIG. 22*b*) where with the presence of an address signal an output is provided to one input of AND gate 852, the other input being coupled to a not Q output of latch 853. With AND gate 852 thus enabled an input is provided to latch 853 which is clocked in during time slot T and Delta 6 bit time to cause the output of latch 853 to go high. This output is then clocked into series latch 854 during Delta 4 time bit of time slot T if there is no upper buffer stop signal. The output of latch 854 provides a signal on line 855 which is designated "open two latches" which signal is transmitted to both the on-line register clock input (FIG. 22*a*) through OR gate 840 and series OR gate 803 and the past character register clock input through OR gate 806. With the two registers thus opened simultaneously data appearing on cable 132 would pass directly through to the parallel to serial shift register 137 thereby shortening the memory loop two character locations. This condition would exist for the balance of the line of text until retrace. Then the output of latch 854 available on line 855 at the beginning of retrace provides an output through AND gate 856 through OR gate 847 to provide a second insert NUL blanks signal. This signal lasts 2 MAC counts inasmuch as latch 854 is cleared at the beginning of MAC 2 and retrace. This thereby permits the insertion of NUL blanks at the end of the line to replace the two character positions deleted. NUL blanks can also be inserted through OR gate 811 from AND gate 857 if a master reset signal occurs thereby enabling AND gate 857 to receive NUL blank signals (time slot T or T). The master reset signal occurs shortly after power is applied and the use of the signal in this instance is to clean out the memory by inserting nul blanks prior to text entry.

LINE BUFFER

Figure 23A:
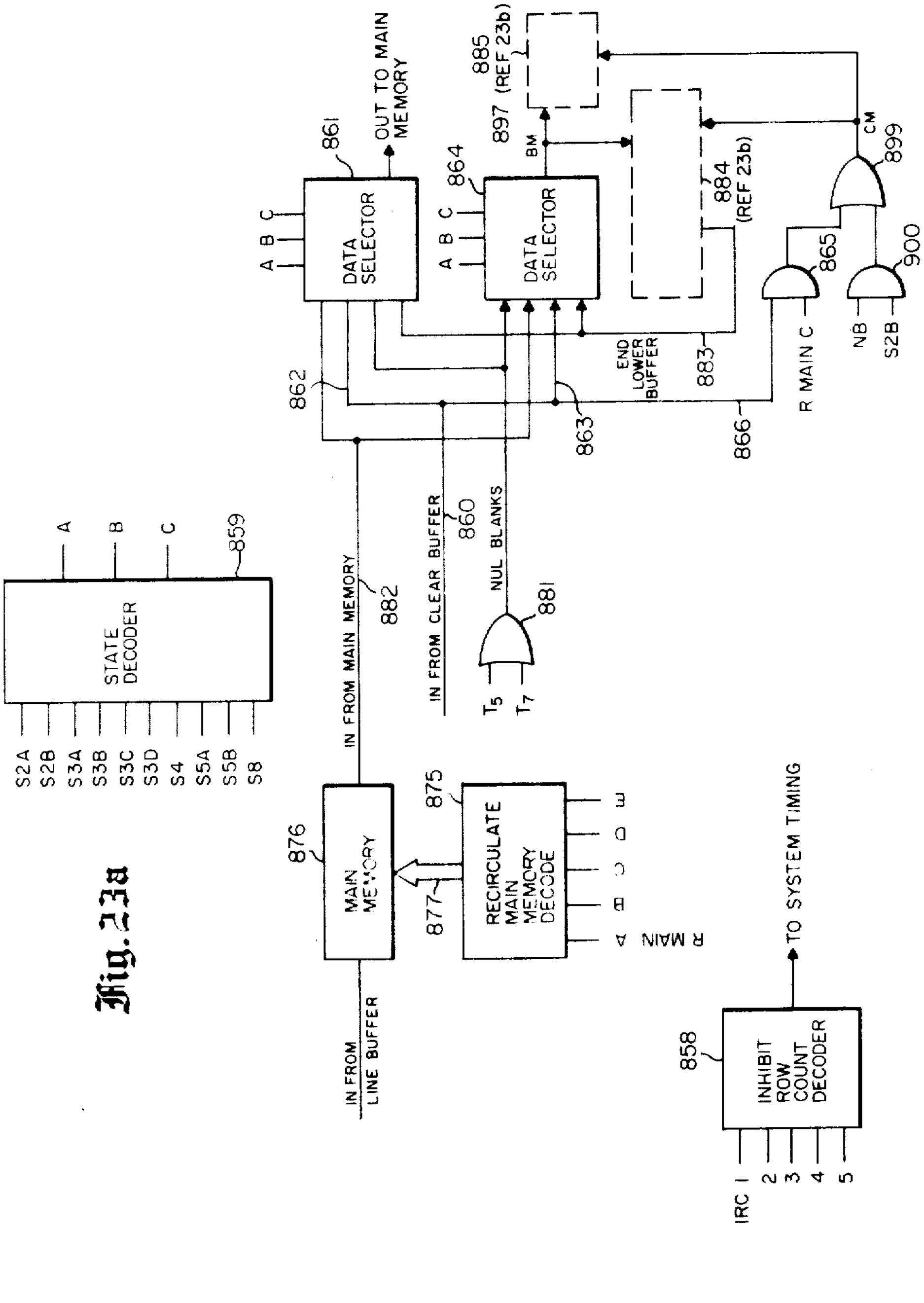
FIGS. 23a and 23b is a detailed block diagram of the line buffer and main memory of FIG. 11.
Figure 23B:
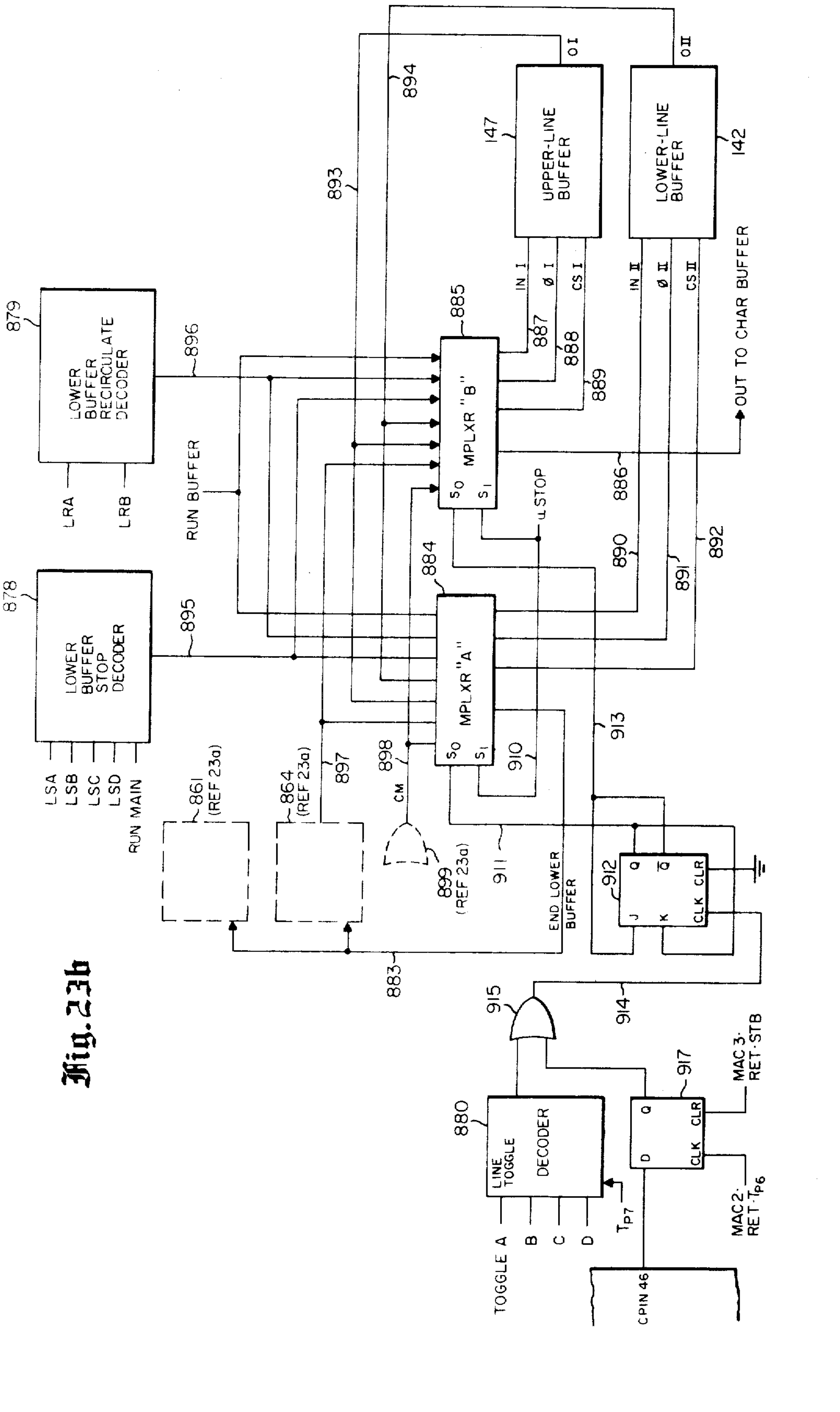

FIGS. 23*a* and 23*b* generally depict the line buffer 126 (FIG. 11). Referring now to FIGS. 23*a* and 23*b* there is shown an upper line buffer 147 and a lower line buffer 142 each of which contains sufficient storage for one line of textual information (128 character locations of 8 bits each). Data is transmitted into the line buffer from the character buffer on line 860 where it is simultaneously available for usage by data selector 861 over line 862, by data selector 864 over line 863 or by AND gate 865 by means of line 866. Each of the data selectors has three inputs designated A, B, and C. The particular energization of the select inputs to the data selectors is determined by a state decoder 866 which has inputs designated S2A, S2B, S3A, S3B, S3C, S3D, S4, S5A, S5B, and SB. Each of these designations represents a state of the memory which controls the flow of information through the main memory line buffers and character buffers. The particular states can be better understood with reference to FIGS. 24*a*–24*g*. FIG. 24*a* illustrates in flow diagram format the normal state of the memory with the elongated rectangular blocks 867 and 868 representing line *n* and line n+1 respectively of the main memory; elongated rectangular block 869 represents the upper line buffer; elongated rectangular block 870 immediately beneath represents the lower line buffer; and the shorter rectangular block 871 represents the character buffer containing both the on-line register as well as the past character register. As the textual information in memory is being displayed in a normal state, data is passing from the character buffer 871, (in which the on-line register communicates with the data bus) back to block 867 representing line n of the main memory while simultaneously being transmitted to lower line buffer 870 which effectively represents the line of data previously displayed. Simultaneously, upper line buffer 869 is being loaded up from block 868 (line *n*+1) of the main memory for displaying.

FIG. 24b illustrates State 4 (S4) of the memory with the flow of information being from the character buffer 871 to the lower line buffer 870 to be returned to block 867 (line *n*) of the main memory while data is being transferred from line *n*+1 or block 868 to the upper line buffer and then subsequently to character buffer 871.

FIG. 24*c* illustrates the flow of information when the memory is in State 2A (S2A) whereby the main memories block 867 (line *n*) and block 868 (*n*+1) are being recirculated while the information from character buffer 869 and lower buffer 870 with the upper line buffer 869 returning the information to character buffer 871.

FIG. 24*d* illustrates the memory in State 2B (S2B) wherein the main memory lines *n* and *n*+1 are recirculating while the upper line buffer 869 and character buffer 871 from a closed loop with nul blanks (NB) being inserted into the lower line buffer 870.

FIG. 24*e* illustrates the flow of information when the memory is in State 3 (S3A, S3B, S3C or S3D), with each of the four state signals performing the same function but having a different suffix letter to designate its origin. In State 3 nul blanks are inserted into block 867 representing line n of the memory to delete the information therein while line *n*+1 represented by block 868 is transferring its information to the upper line buffer 869 then through the character buffer 871 and into the lower line buffer 870.

FIG. 24*f* represents the flow of information through the memory in State 5 (S5A or S5B) whereby nul blanks are being inserted into the upper line buffer 869 and the data from upper line buffer 869 is being transferred through character buffer 871 and into the lower line buffer 870 with the main memory again recirculating.

Figures 24G, 25A, 25B, 25C, 25D:
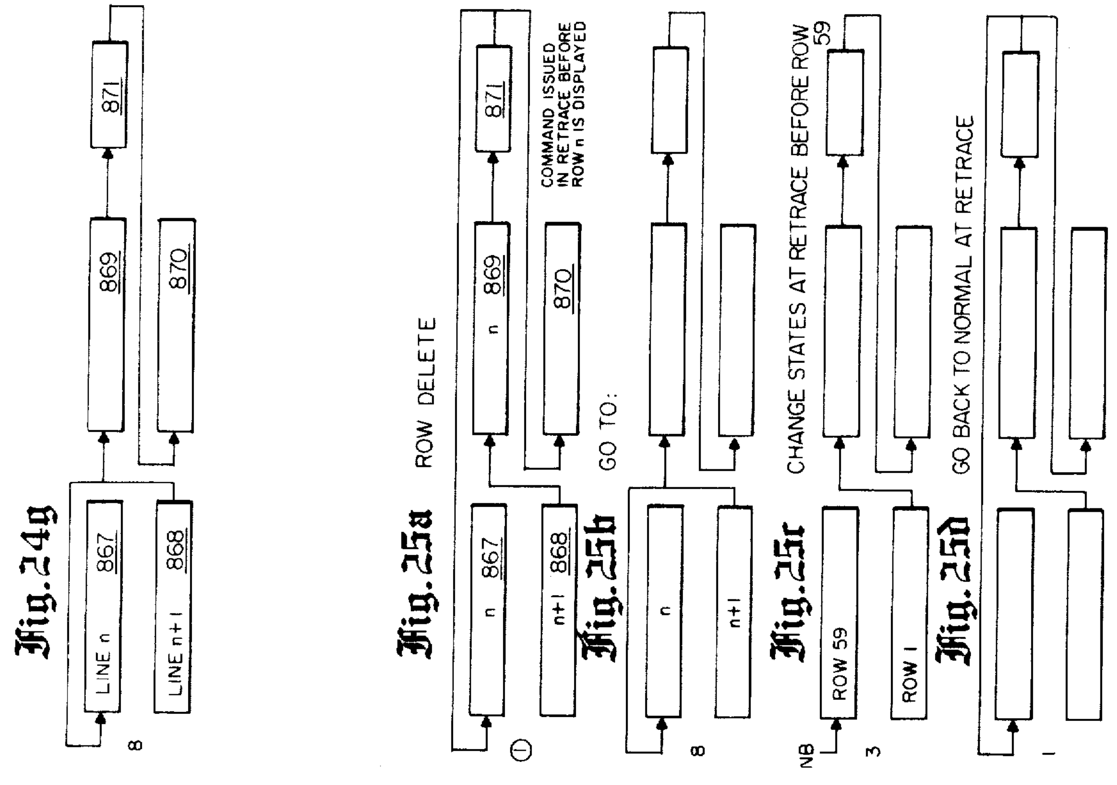
FIGS. 24a through 24g show in flow diagram form the configurations or states assumable by the memory shown in FIG. 11.
FIGS. 25a through 25d show in flow diagram form the sequential states assumed by the memory of FIG. 11 to effect a "row delete" operation.
Figures 24A, 24B, 24C, 24D, 24E, 24F:
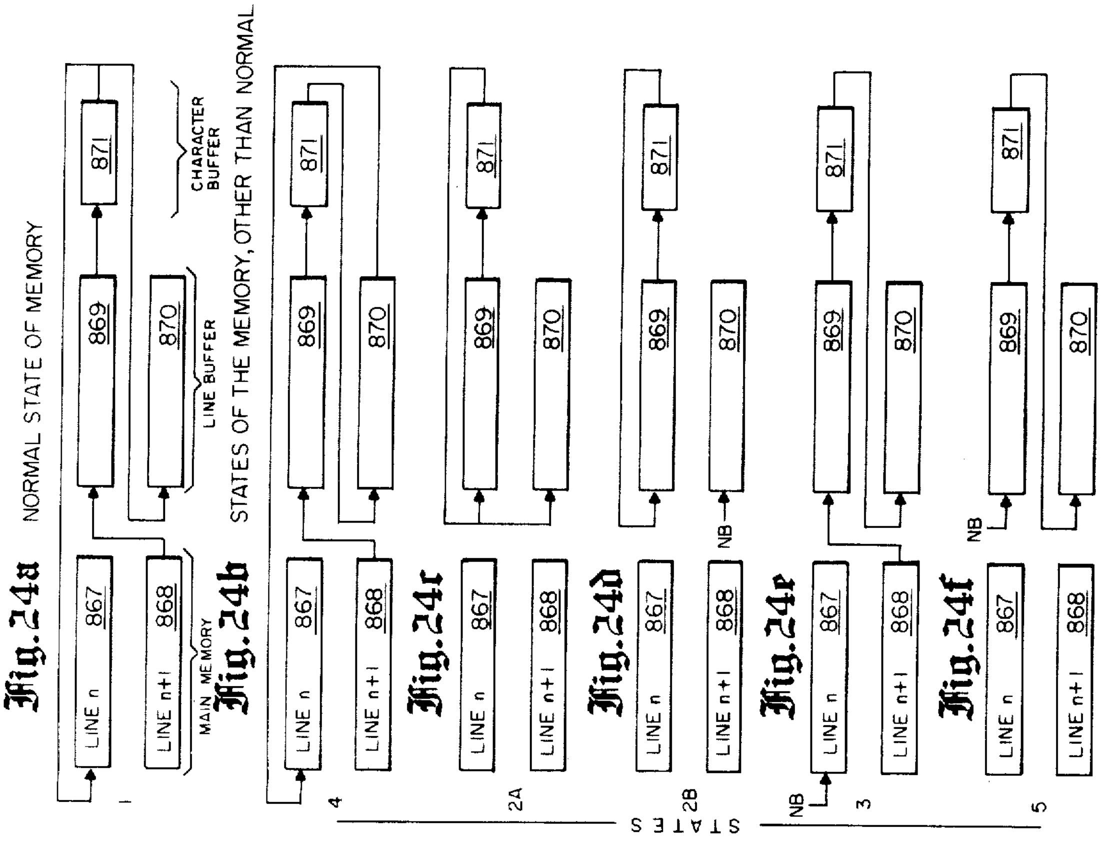

FIG. 24*g* shows the memory connections when the State 8 (S8) condition exists. Line *n*+1 (block 868) of the main memory is being simultaneously transferred to the upper line buffer 869 and to the preceding line of the main memory (block 868). The upper line buffer 869 then transfers information through character buffer 871 into lower line buffer 870.

While not shown, it is also possible to insert nul blanks simultaneously into the upper and lower line buffers as well as to connect the upper line buffer, character buffer and lower line buffer in closed loop fashion.

By providing the various states of the memory shown in FIGS. 24*a*–24*g*, it is possible to sequentially enable different states of the memory to accomplish certain text manipulation utilizing the keys on the keyboard of FIG. 2 such as line delete key 60; line insert key 60*h;* edit key 60*n;* and merge key 60*p* which initiate many functions such as row delete, row add, shift down, and shift up respectively as will hereinafter be discussed.

Referring again to FIG. 23, depending on the state inputs to the state decoder 866 as well as the sequence of application of the state inputs, the outputs A, B and C are selectively energized to appropriately enable the data selectors 861 and 864. Combinations of state inputs also generate other signals "recirculate main memory" (R MAIN A, R MAIN B, etc.) to selectively recirculate the main memory, signals to selectively stop the lower buffer (LSA, LSB, etc.), signals to selectively recirculate the lower buffer (LRA, LRB), and signals to toggle the upper and lower line buffers (TOGGLE A, TOGGLE B, etc.). There are five recirculate main memory (R MAIN A, etc.) signals the presence or absence which are detected by a recirculate main memory decoder 875 the output of which is transferred to a main memory 876 over cable 877. The buffer stop signals (LSA, etc.) are inputted to a lower buffer stop decoder 878. The "lower buffer recirculate" signals (LRA and LRB) signals are inputted to a lower buffer recirculate decoder 879 while the line toggle signals are transmitted to a line toggle decoder 880. Also generated are inhibit row count signals (IRC1, IRC2, etc.) which are applied to inhibit row count decoder 858, the output of which prevents the row count from advancing.

When the insertion of NUL blanks is directed, such as in States 2B and 5 of the memory, T or T time slot pulses (the NUL blank code having 1's in the sixth and eighth bit locations) are provided through OR gate 881 which simultaneously provides inputs to data selectors 861 and 864. Third inputs to the data selector come in from the main memory 876 on line 882 to be simultaneously available to both data selectors 861 and 864. The fourth input to the data selectors 861 and 864 is an end lower buffer signal which appears on line 883.

Two multiplexers (designated multiplexer A and multiplexer B) 884 and 885 are provided to selectively provide the transmission of character data to the upper line buffer 147 and/or the lower line buffer 142 as well as to transfer the information out to the character buffer on output line 886 and to provide the end lower buffer signal along line 883. The outputs from multiplexer 884 and 885 to the line buffers 142 and 147 respectively include the serial data transfer line 887 (IN I), the clock input line 888 (O I), and a chip select line 889 (CS I) as well as corresponding lines 890, 891 and 892 inputted to the lower line buffer 142. The output of upper line buffer 147 (OI) appears on line 893 and is simultaneously transferred to one input of the mulitplexes 884 and 885. Similarly, the output of lower line buffer 142 (O II) is transferred over line 894 to one input of each of the multiplexers 884 and 885. A third input to each of the multiplexers is a "run buffer" signal which occurs during time slot T of MAC 8 of retrace and flyback while fourth and fifth input signals to the multiplexer are transferred over lines 895 and 896 respectively of the lower buffer stop decoder 878 and lower buffer recirculate decoder 879. A sixth input to each of the multiplexers appears from data selector 864 over output line 897 (designated BM) while a seventh input is provided on line 898 (designated CM) from OR gate 899 if AND gate 865 is enabled with a R MAIN C signal. OR gate 899 can also receive data through AND gate 900 which data is effectively NUL blanks if a state 2 (S2B) is present.

The inputs to the multiplexers are divided into two sets, the first set being BM input (line 897), the O I input (line 893 from the upper line buffer 147), the run buffer signal, with the fourth input (not shown) being set to a logical 1. The second set of inputs is the CM input (line 898), the O II input (line 894 from lower line buffer 142), the output signal on line 895 from the lower buffer stop decoder 878 and the output on line 896 from the lower buffer recirculate decoder 879. The first set of inputs are gated through the multiplexers when the first control input S is enabled while the second set of inputs are gated through multiplexers 884 and 885 when the second control input S is enabled by an upper buffer stop (U STOP) signal appearing on line 910 the S control inputs of the two multiplexers being coupled together.

The first set of inputs are selectively gated through either multiplexer 884 or through multiplexer 885 inasmuch as the first control inputs S are mutually exclusive with the control input of multiplexer 884 being coupled over line 911 to the Q output of a toggle flip-flop 912 while the control input of multiplexer 885 is connected over line 913 to the not Q output of toggle flip-flop 912. The toggle flip-flop 912 is activated by a pulse appearing on line 914 through OR gate 915 with one of two inputs. The line toggle decoder 880 provides a first input to OR gate 915 while a second input signal is available when C PIN 46 is activated at MAC 2 and T of retrace to set latch 917 which latch is then cleared during MAC 3 of retrace with a strobe signal.

Consequently, as can be seen selective actuation of the data selectors 861 and 864, the multiplexers 884 and 885, and the AND gates 865 and 900 enables the memory to assume any one of the states previously discussed in connection with FIG. 24 to alter the flow of information as well as permit the insertion of NUL blanks as required.

In order to effect the reconfiguration of the memory to perform the desired text manipulation functions selected the variables are changed in proper time sequence, which time sequences are dependent upon such things as retrace, pulse occurrence, cursor position, carriage return indicator, blank code occurrence, row 59 occurrence (last row of memory), character indicator, and margin indicator.

Figures 26, 28:
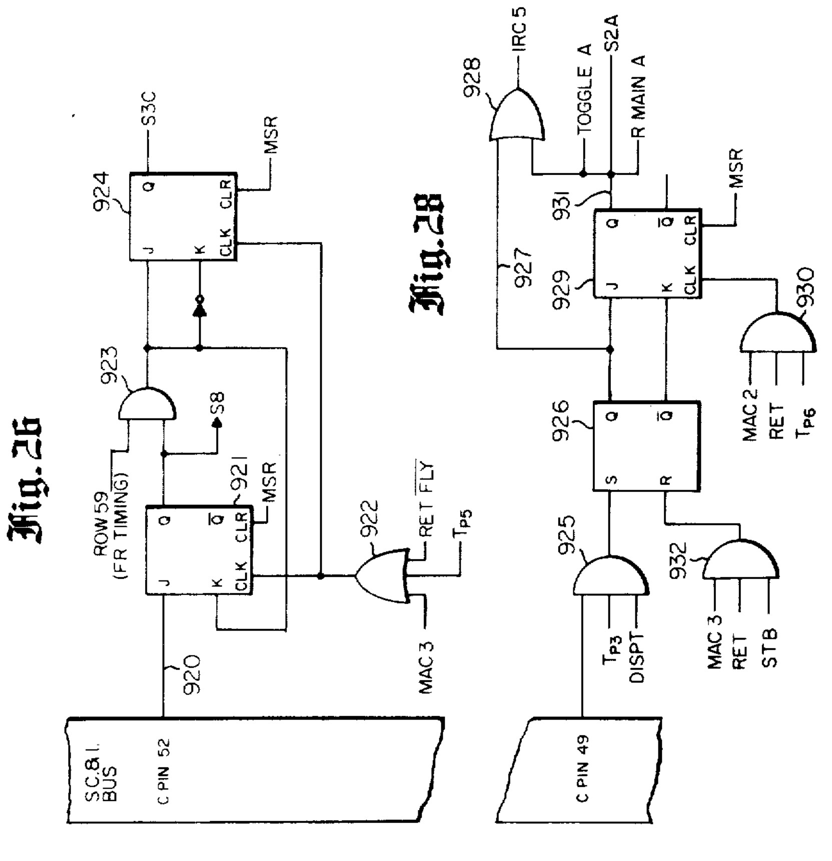
FIG. 26 is a detailed block diagram of the sequencing circuitry for configuring the memory to perform the row delete operation.
FIG. 28 is a detailed block diagram of the sequencing circuitry to configure the memory as shown in FIG. 27.

Referring now to FIGS. **25*a*–25*d*, the various states assumed by the memory to perform the row delete function are illustrated in flow diagram form with FIG. 25*a* showing the normal state of the memory. Correlating this sequence with FIG. 26 row delete signal appearing on the communications bus 26 over C PIN 52 is transferred over line 920 (this signal being generated by the keyboard in FIG. 13 with depression of the line delete function key) whereby latch 921 is set at MAC 3 and T of retrace with no flyback by means of an output through AND gate 922 to the clock input of latch 921. The latch 921 then generates at its output a state eight (S8) signal, the command being issued in retrace before the row is displayed. The memory then assumes the configuration shown in FIG. 25*b* which is the state 8 configuration (S8). This input is applied to state decoder 859 and the data select inputs of data selector 861 are enabled to transfer the data coming in from the main memory on line 882 through the data selector 861 back out to the main memory (preceding line), while data selector 864 is enabled to transfer the data in from the main memory 876 simultaneously to appear on line 897 while the mulitplexer 885 has it constrol inputs set to pass the data appearing on line 897 therethrough to the upper line buffer 147. As the data passes through upper line buffer 147 it appears on line 893 where it passes through multiplexer 885 out to the character buffer on line 886. The data then passes through the character buffer as previously described to return to the line buffer on line 860 where it is transferred over line 866 through AND gate 865 (previously enabled by the absence of an R MAIN C signal) through OR gate 899 to appear on line 898 passing through multiplexer 884 to the lower line buffer 142.**

Referring again to FIG. 26 when a row 59 signal is received AND gate 923 is enabled to transfer the output of latch 921 to latch 924 with concurrence of a clock pulse at MAC 3 and time slot $T_{p5}$ of retrace with no flyback to generate an output on latch 924 designated state 3C (S3C). This signal is then decoded by the state decoder 859 to configure the memory as shown in FIG. **25*c* wherein NUL blanks are being inserted into row 59 of the memory. The outputs of stated decoder 859 which are now applied to data selector 861 are enabled to pass the NUL blanks from OR gate 881 through data selector 861 out to the main memory; data selector 864 is enabled to pass the data in from the main memory on line 882 therethrough to appear on line 897 to pass through the multiplexer 885 as previously described while the data in from the character buffer on line 860** passes through AND gate 865 and OR gate 899 through multiplexer 884 to the lower line buffer 142 as previously described. At the next MAC 3 in time slot $T_{p5}$ of retrace the memory goes back to the normal configuration as shown in FIG. 25*d*.

In the foregoing operation it can be seen that if it is desired to delete a row, the cursor is positioned anywhere in the row to be deleted, the line delete function key is depressed (line n representing the line to be deleted) the row delete command is issued in retrace before row *n* is displayed; the memory assumes a state 8 (S8) configuration thereby inserting the contents of the next line (*n*+1) into the preceding line of the main memory to replace the contents thereof, and each succeeding line is likewise moved up a line; at retrace before row 49 the memory is configured to state 3 (S3) to thereby permit the insertion of NUL blanks into row 59; and at the next retrace the memroy is reconfigured to its normal state to permit the normal flow of information.

HOLD ON LINE

The hold on line configuration of the memory enables the system to hold a particular line of information under consideration on line during the performance of certain operations. For example two operations which utilize this configuration are character delete and overstrike. The overstrike capability is described in the aforementioned patent application to Goldman et al and briefly when an overstrike situation occurs the memory character locations sequentially contain first character code, back space code, overstrike character code. This effectively directs the display to generate the first character, reposition the electron beam for generating the overstrike, and then generate the overstrike character, without advancing the cursor. In a character delete situation as previously discussed the character directly above the position indicator is deleted while all characters to the right of the position indicator or cursor move left one character position and fill in the space previously occupied by the deleted character. This therefore, requires that all character positions in the line to the right of the cursor move left one character location in memory and during this sequence the particular line under consideration holding the character to be deleted is retained on line during the performance of the operation.

Figures 27A, 27B, 27C:
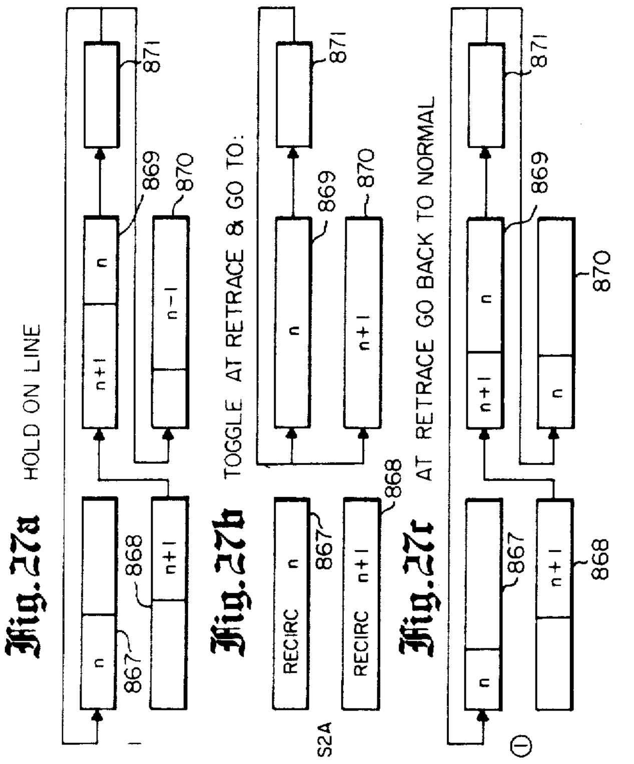
FIGS. 27a through 27c show in flow diagram form the sequential states assumed by the memory to perform a "hold on line" operation.

This is illustrated in FIGS. 27*a*–27*c* and FIG. 28. For example, during a character delete operation a character delete signal is transmitted to the decode logic circuit 265 (FIG. 14) to issue a hold on line signal HOL 2 on line 306 which is transmitted to the special control and indicator bus 26 through OR gate 422 and AND gate 421 during time slot $T_3$ of display time to C PIN 49 (see FIG. 16*a*). This signal is received (FIG. 28) over C PIN 49 by AND gate 925 whereupon during time slot $T_{p3}$ of display time AND gate 925 is enabled to set latch 926. The hold on line command is issued in line n (the line containing the cursor which would be the line under consideration). The Q output of latch 926 goes high to provide a signal on line 927 through OR gate 928 which signal is designated IRC 5 which is a signal to inhibit the row count. The outputs of latch 926 are coupled to the inputs of latch 929 where they are clocked in at MAC 2 and $T_{p6}$ of retrace through AND gate 930 to provide an output on line 931 of latch 929. The output of latch 929 appearing on line 931 provides a toggle A signal to the line toggle decoder 880 (FIG. 236), a state two A (S2A) signal to the state decoder 859 (FIG. 23*a*) and a "recirculate main memory" signal to decoder 875 (FIG. 23*a*) as well as the previously mentioned inhibit row count signal to the decoder 858. The signals are appropriately decoded to sequentially configure the memory as shown in FIG. 24*a*–27*c*. FIG. 27a line *n*+1 is shown being loaded from elongated block 868 of memory to the upper line buffer 869 with line *n* partially transferred out through character buffer 871 back to main memory line n 867 while simultaneously being transferred to lower line buffer 870 with line *n*−1 partially contained therein being dumped. When line *n* (line containing the cursor in which the character delete operation is to be performed) is fully contained within the lower line buffer 870 a toggle signal appears from line toggle decoder 880 to set toggle flip-flop 912 to completely interchange the upper and lower line buffers be redirecting the flow of information through the first and second multiplexers 884 and 885. This results in the memory configuration shown in FIG. 27*b* in which line n passes on line a second time from upper line buffer 869 (previously the lower line buffer) through the character buffer 871 while line *n*+1 (previously in the upper line buffer) is now located in the lower line buffer 870. Simultaneously, lines *n* and *n*+1 of the main memory are being recirculated by virtue of the recirculate main memory (R MAIN A) signal.

Figure 22A:
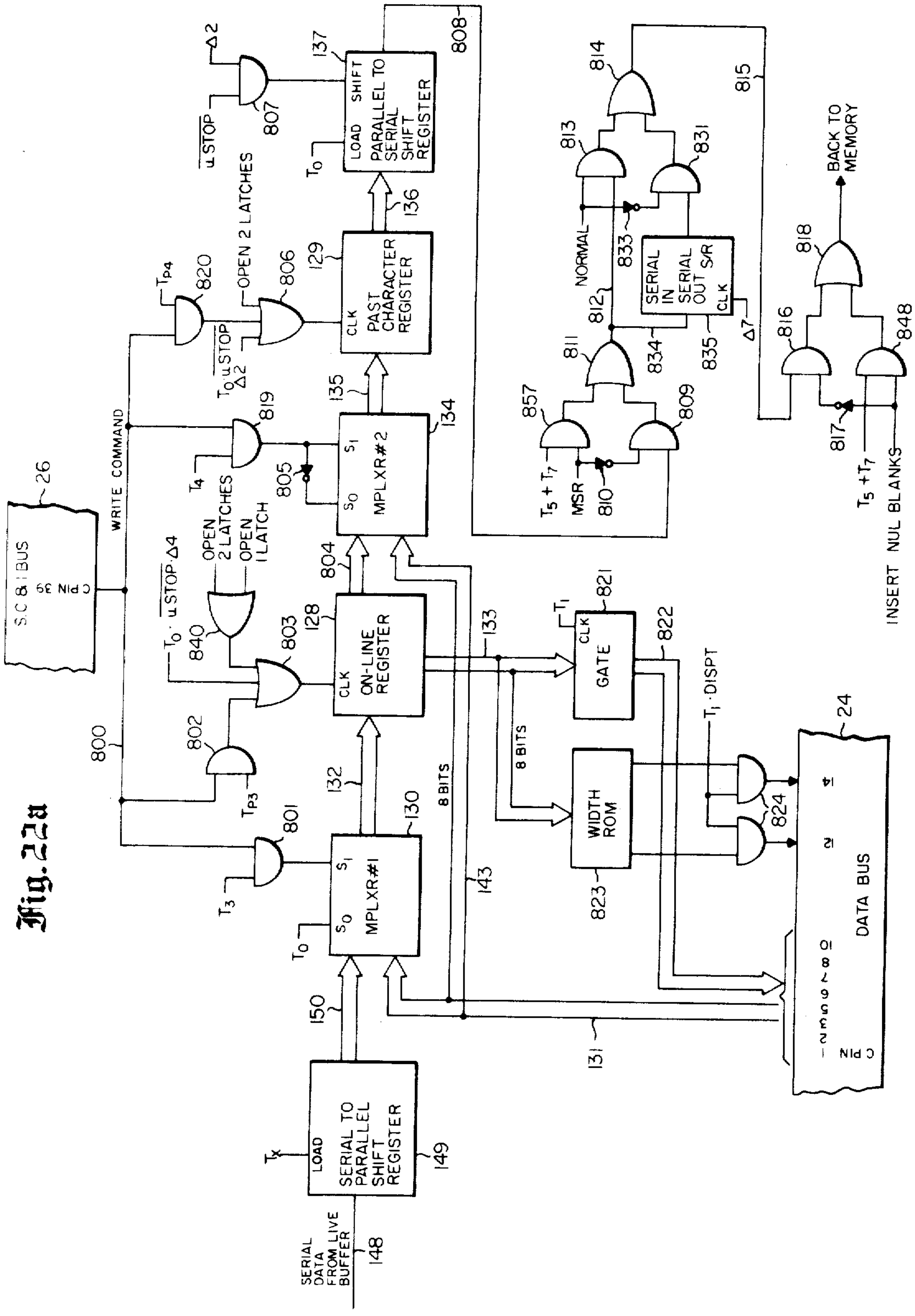

As previously discussed in the character delete operation in connection with the character buffer of FIGS. 22*a*–22*b* NUL blank codes are inserted at the end of the line to replace the number of deleted characters. In order to move each character to the right of the cursor one position to the left, the character delay 84 of FIG. 11 is enabled to redirect the flow of information from the character buffer 127 through channel 2 back to the main memory. The character delay 140 is initially filled with two character storage locations each containing a NUL blank code. As the end of line *n* passes out of the character buffer on line 138 the information through multiplexer 139 is routed to channel 2 through the character delay 140 to insert NUL blanks at the end of the line of textual information. As the line end passes out of the character buffer the second time on line 138 when the NUL blank codes are transmitted on line 138 the multiplexer 139 redirects the information from channel 1 to move up each succeeding character location in the line of text.

Referring again to FIG. 28 with latch 929 set at MAC 2 of retrace to configure the memory as shown in FIG. 276, at the next succeeding MAC 3 of retrace (one character time later) latch 926 is reset to reverse the inputs previously applied to latch 929. At the next succeeding MAC 2 of retrace during time slot $T_{p6}$ latch 929 is again clocked through AND gate 930 to thereby remove the outputs on line 931 thereby permitting the memory configuration to return to normal as shown in FIG. 27*c*. Consequently, the time that the memory retains the configuration shown in FIG. 276 corresponds to the time necessary to display one line of textual information.

The hold on line sequence previously described also occurs as an intermediate step in other text manipulation functions when it is generated in proper time sequence to accomplish the desired result.

ROW ADD

Figure 30:
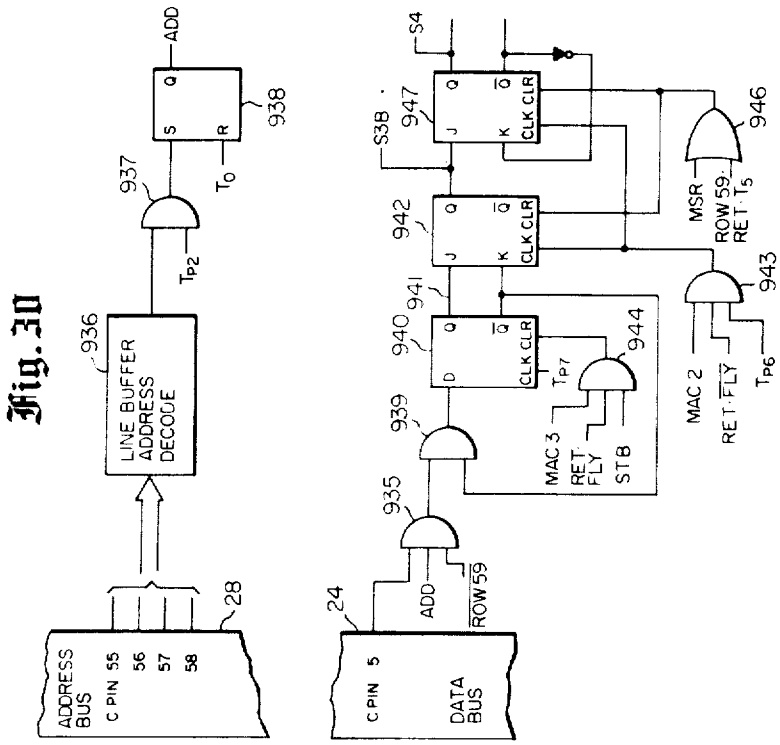
FIG. 30 is a detailed block diagram of the sequencing circuitry to configure the memory as shown in FIG. 29.

If it is desired to insert a line or perform a row add operation, the sequence of configurations assumed by the memory is shown in FIGS. 29a–29d and the means for directing the sequence of operations is shown in FIG. 30. To accomplish this, the operator depresses the line insert function key 60h (FIG. 2) on the keyboard with the cursor position anywhere in a line. Upon depression the line directly below the position indicator or cursor and all following lines will be moved down the page one line. A blank line will be created on the first line below the cursor and the last line on the page is essentially erased. The lines above the cursor are not affected by this operation.

Figures 29A, 29B, 29C, 29D:
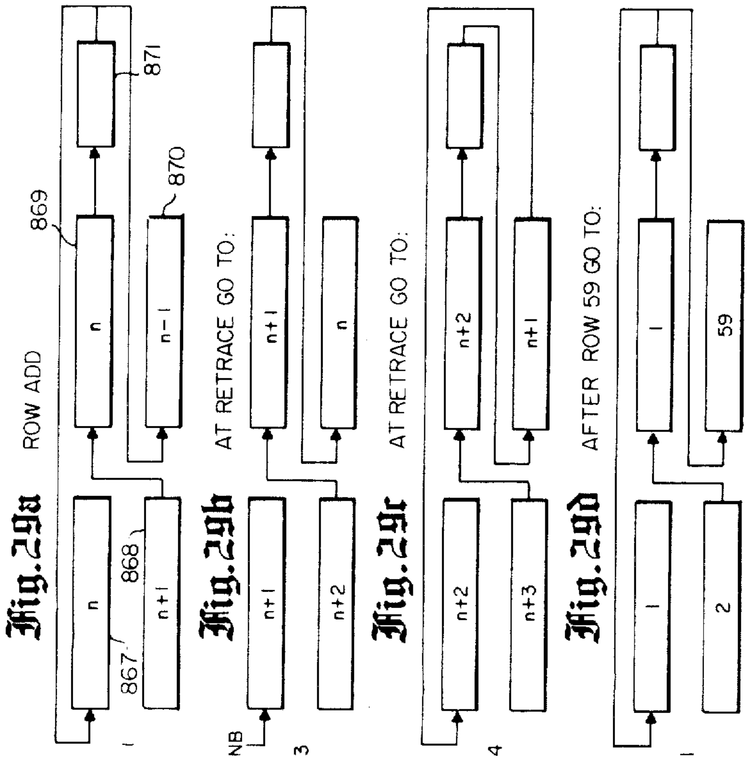
FIGS. 29a through 29d show in flow diagram form the sequential states assumed by the memory to effect a "row add" operation.

The operation is sequentially demonstrated in FIGS. 29a–29d, where as shown in FIG. 29a with the memory in its normal configuration line $n-1$ (the line previously displayed) is in the lower line buffer 870 while line n (the line currently being displayed) is transferring from the upper line buffer 860 through the character buffer 871 (from which it is displayed a character at a time) simultaneously back to the main memory line n (block 867) and to the lower line buffer 870 to displace the memory contents contained therein. Line $n+1$ from the main memory block 868 is being loaded into the upper line buffer 869.

Referring now to FIG. 30, the row add command is issued in line n over C PIN 5 of the data bus (see also FIG. 14 line insert function) during time slot $T_7$ of display line to enable AND gate 935 to provide an output if there is no row 59 signal and the line buffer had been addressed to provide an address (ADD) signal. The line buffer is addressed over the address bus 28 through a line buffer address decoder 936 which provides an output signal through AND gate 937 during time slot $T_{p2}$ to set latch 938 to provide the address signal. This signal is present from time slot $T_{p2}$ to the next $T_0$ time slot, at which time latch 938 is reset. When latch 938 is enabled, it provides an input to AND gate 935 which receives the row add signal at its second input from C PIN 5 of the data bus 24 and if there is no row 59 signal (line n is not row 59) AND gate 935 is enabled to provide an output to a first input of AND gate 939, the second input of which is tied to the not Q output of latch 940. The D input of latch 940 receives the output of AND gate 939 where it is clocked in during time slot $T_7$ to provide an output at its Q output on line 941. The not Q outputs of latch 940 then goes low to disable AND gate 939. At the next succeeding time slot $T_0$, as previously mentioned, latch 938 is reset to remove the address signal. The output on line 941 from latch 940 during the next retrace cycle is clocked into latch 942 by means of a clock pulse through AND gate 943 at MAC 2 and $T_{p6}$ time slot of retrace with "no flyback" to provide a state 3 (S3B) signal at the Q output of latch 942. When this signal occurs, line $n+1$ (the line immediately following the line containing the cursor) is contained in the upper line buffer 869 and the memory assumes the state 3 configuration as shown in FIG. 29b. When this occurs, NUL blanks are being inserted into the main memory line $n+1$ (block 867) since the state 3 signal applied to the state decoder 859 (FIG. 23a) enables the data select inputs to the data selector 861 to permit transfer therethrough of NUL blanks from OR gate 881 out to the main memory. Simultaneously, information coming in from the main memory on line 882 (line $n+2$ of the main memory) is being transmitted through data selector 864 to appear at its output on line 897 for transfer to the upper line buffer 147.

At the next MAC 2 and $T_{p6}$ time slot of retrace the output of latch 942 is closed into latch 945 to provide a signal at its Q output which is designated state 4 (S4). The time period from the setting of latch 942 to the setting of latch 945 is the time required for the display of one line.

When the state 4 signal occurs the memory assumes the configuration shown in FIG. 29c at the time lower line buffer 870 receives the contents of the line $n+1$. The contents of the lower line buffer 870 (line $n+1$) are then transferred to the next succeeding line in memory (line $n+2$) as shown in FIG. 29c. The memory then remains in the state 4 configuration so that each line of textual information being displayed is then returned to the next succeeding line of storage in main memory from the lower line buffer 870. After row 59 has been displayed, with the concurrence of a retrace and a time slot $T_5$ signal, latch 945 is cleared through OR gate 946 to remove the station 4 signal thereby permitting the memory to re-assume its normal configurations as shown in FIG. 29d. As previously mentioned, the contents of row 59 are eliminated by being serially dumped from the lower line buffer 870.

While the row add operation has been shown with respect to a line insert operation initiated by the operator by depression of the appropriate function key, the row add sequence of reconfigurations of the memory also occurs in proper time sequence with respect to other text manipulation functions such as edit.

SHIFT DOWN

When the operator depresses the edit function key 60n (shown on the keyboard of FIG. 2) with the cursor positioned at a predetermined location within a line, the character space immediately above the cursor and everything to the right of the cursor drops down to the next line on the display screen while all lines of text below that drop a line while maintaining the same organization of the text on the line. For example, if the operator desires to insert several words at a particular position within a line of text, she places the cursor under the first character of the first word following the insert position. She then depresses the edit function key and the balance of the line above and to the right of the cursor drops down to a newly created line immediately below with the margin of the edited portion of the line generally maintaining the same marginal organization as the line from which it was edited.

When the edit function key 60n is depressed a signal is transmitted over C PIN 51 (see FIG. 13), which signal is received by the Edit/Merge subsystem 36 (FIG. 1). The Edit/Merge sub-system receives a signal to set a flip-flop which remains set during the editing operation. Upon the setting of this flip-flop the Edit/Merge sub-system initiates an inhibit keyboard signal over C PIN 51 during time slot $T_6$ display time as shown in the table of FIG. 9a. Simultaneously, during the preceding $T_0$ time slot of display time, the subsystem initiates an Edit/Merge Busy signal over C PIN 51.

The Edit/Merge sub-system then performs the necessary processing to selectively and sequentially issue commands to perform the edit operation as directed by the operator. Briefly, the Edit/Merge sub-system 36 then scans the text entered into memory to determine the margin organization of lines of text above and below the line under consideration. If one or more lines above or below the line under consideration is a blank line, this information is also noted and the sub-system then monitors the next lines above and below which actually contain textual information. The sub-system also triggers signals as required to insert the proper predetermined number of spaces to the left of the first character of the part of the line shifted down to create the appropriate margin. When the operation is completed, the edit flip-flop is reset and the inhibit and/or busy signals are removed.

After the edit signal is received and the keyboard is inhibited, the Edit/Merge sub-system 36, after an appropriate time delay, during the time slot $T_2$ of display time issues a signal over C PIN 56 to address the memory which provides the ADD signal as previously described in FIG. 30. During the next time slot $T_7$ a command is issued by the Edit/Merge sub-system over C PIN 5 (as shown in the table of FIG. 10) for the memory to perform a row add operation as previously described. After the memory has been addressed, the Edit/Merge sub-system 36 issues a shift down command over C PIN 55 during time slot $T_5$ of display time to reconfigure the memory through the sequence of operation shown in flow diagram format in FIGS. 31*a*–31*e*.

Figures 31A, 31B, 31C, 31D, 31E:
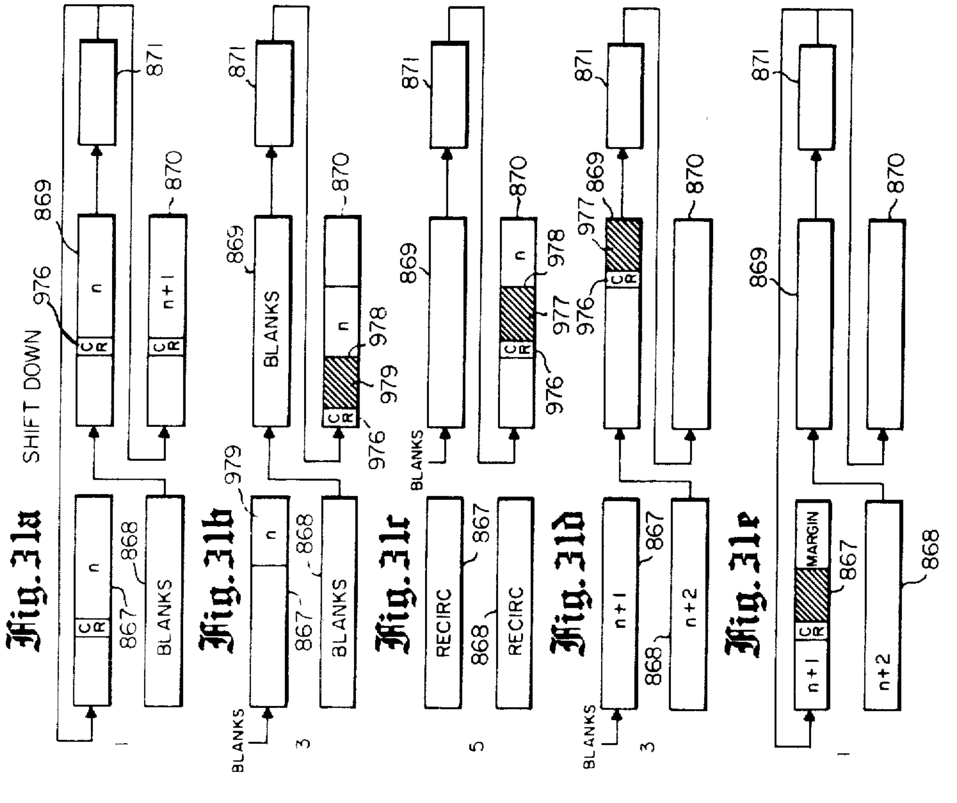
FIGS. 31a through 31e show in flow diagram form the sequential states assumed by the memory to effect a "shift down" operation.

The newly created line in memory which results from the row add operation is illustrated in elongated block 868 of FIG. 31*a*, the line being filled with NUL blanks. The line under consideration (line *n*) is contained in the upper line buffer 869 with the portion 976 designated CR (carriage return code) indicating the end of the textual information contained in the line with the textual information in coded format being to the right thereof. It is to be understood that each line of textual information with the possible exception of the last line will contain a carriage return code at the end thereof. This is also illustrated with respect to line *n*–1 in lower line buffer 870 as well as line n in the main memory 867.

With the memory in its normal configuration as shown in FIG. 31*a* the line of textual information from upper line buffer 869 is passing through character buffer 871 and on one route is being transferred back to the memory block 867. As soon as the particular character within a line of textual information under which the cursor is located (in most cases the first character of the portion of the line to be shifted down) reaches the on line register of character buffer 871, the portion of textual information which is to remain in line *n* will be returned to the main memory elongated block 867 two character times later. When the character with the cursor is detected after a two character time delay, the memory assumes the state shown in FIG. 31b which is the state 3 configuration. The portion of the line *n* which is to remain in line *n* of main memory block 867 is designated by the numeral 977 while the balance of the line of memory is filled with blanks. In the lower line buffer 870 the vertical line 978 generally indicates the location of the character having the cursor positioned thereunder, while the portion of the line of memory designated 979 generally indicates the part of the line shifted down along with the carriage return code CR.

Figure 32:
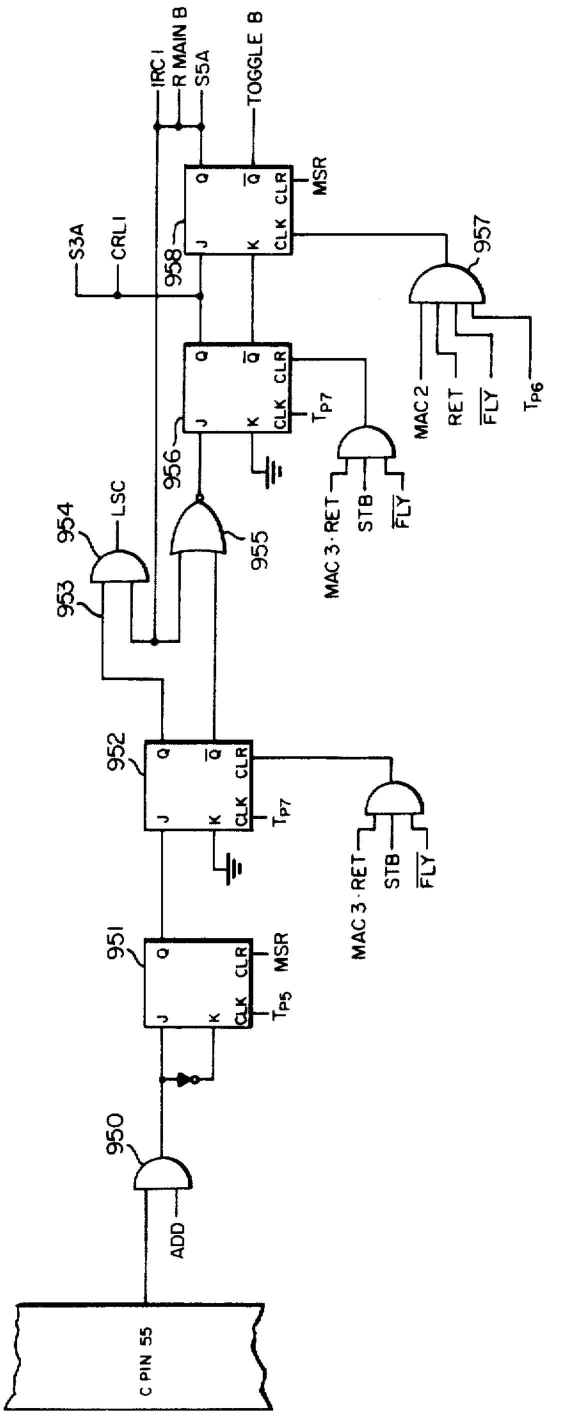
FIG. 32 is a detailed block diagram showing the sequencing circuitry to configure the memory as shown in FIG. 31.

The means for effecting the change of memory configuration is better illustrated in FIG. 32 in which the shift down signal appears over C PIN 55 of address bus 28 to provide a first input to AND gate 950, the second inputs thereof being enabled from an address (ADD) signal transmitted over the address bus 28 previously described (FIG. 30). The output of AND gate 950 is then applied to the first latch 951 where it is clocked in during time slot $T_{p5}$ of display time. During the next $T_7$ (two time slots later) the output of latch 951 is applied to a second latch 952 whereupon this Q output goes high to provide a logical 1 signal on line 953 thereby driving the not Q output of latch 952 low to provide a logical 0. The output on line 953 provides a first input to AND gate 954, the other input thereof being coupled to a downstream flip-flop 958 which has its Q output at a logical 0 level. The logical 0 level from the not Q output of latch 952 provides a first input to NOR gate 955, the other input thereof being coupled to a Q output of latch 958 which is also at a logical 0 level to provide an output from NOR gate 955 which is applied to an input of latch 956 to be clocked in during time slot $T_{p7}$ (two character times after the shift down signal from C PIN 55).

With latch 956 receiving this input the Q output thereof provides a state 3 (S3A) signal which is also designated CRL 1 (carriage return code in lower buffer). With the initiation of the state 3 signal the memory assumes the configuration shown in FIG. 31*b* just prior to the character above the cursor on the display screen passing out of the past character register of character buffer 871. In this configuration the protion 979 of line *n* (block 867) which is to remain in line *n* is being serially clocked into the main memory with the balance of the line thereafter receiving NUL blanks, while the complete line of textual information of line *n* is being serially clocked from the character register 871 to lower line buffer 870 until such time as the carriage return code 976 enters the lower line buffer 870.

Figures 33, 34:
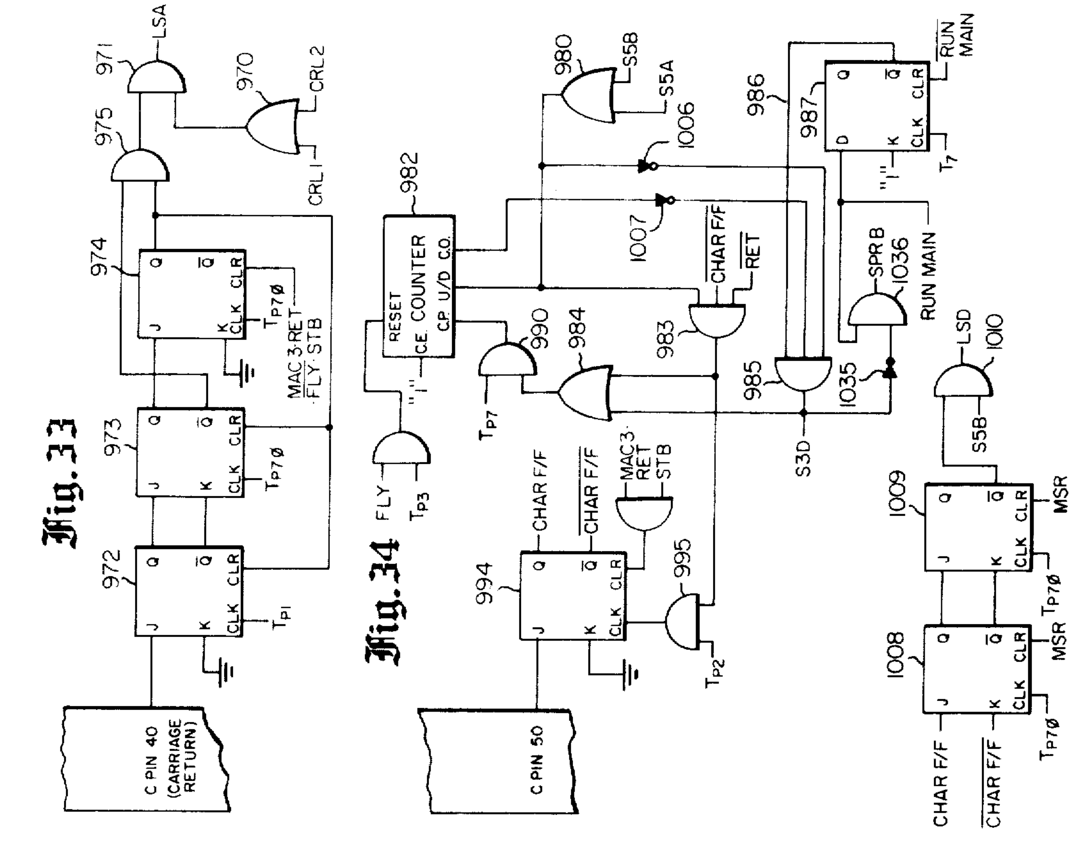
FIG. 33 is a detailed block diagram of the "carriage return code" detector used in conjunction with the circuitry of FIGS. 32 and 36.
FIG. 34 is a detailed block diagram of the circuitry used to restore the margin information after a shift down or "shift up" operation.

Referring now to FIG. 33, when the signal CRL 1 goes high, this passes through OR gate 970 to provide an enabling signal to AND gate 971. At this time, the second input of AND gate 971 is not set. When the carriage return code passes to the on line register of character buffer 871, a carriage return indicator (see FIG. 20*a*) is generated and transmitted over C PIN 40 to appear as an input to latch 972 which is clocked in during time slot $T_{p1}$ immediately following the appearance of the carriage return indicator. During time slot $T_{p7}$ of the same character time the output of latch 972 is clocked into latch 973 to drive its Q output high. During the next succeeding time slot $T_{p7}$(the next character time at which time the carriage return code is in the past character position of character buffer 871) this output is clocked into latch 974 to drive its Q output high to provide a first input to AND gate 975. The other input up AND gate 975 is tied to the not Q up of latch 973. Immediately, with the occurrence of a high output from latch 974, latches 972 and 973 coupled thereto are cleared whereupon the not Q output of latch 973 goes high thereby providing an output from AND gate 975 which is inputted to AND gate 971 to provide a lower buffer stop (LSA) signal. This signal is appropriately decoded by the lower buffer stop decoder 878 (FIG. 23*b*) to stop the lower buffer as soon as the carriage return code is in the lower buffer in the position illustrated in FIG. 31*b*. The memory then stays in the state 3 configuration until MAC 2 and time slot $T_{p6}$ of retrace when the output of latch 956 is clocked into latch 958 by means of AND gate 957 (FIG. 32) when the Q output of latch 958 goes high to provide a signal. The output of latch 958 generates a state 5 (S5A) input to state decoder 859 as well as a recirculate main memory (R MAIN B) signal to the decoder 875, and an inhibit row count (IRC 1) signal to the inhibit row count decoder 858. Simultaneously, the line toggle decoder signal (TOGGLE B) goes low so that the signal is processed by decoder 880 so that toggling occurs after state 5 is terminated. Also, when the output of latch 958 goes high during retrace, as shown in FIG. 33, during the same retrace latch 974 is cleared during MAC 3 to remove the lower buffer stop (LSA) signal thereby permitting the lower buffer to start shifting as soon as state 5 occurs.

When these events occur the data selectors 861 and 864 are appropriately enabled as well as the multiplexers 884 and 885 to configure the memory as shown in FIG. 31*c*, wherein the two lines of main memory 867 and 868 are being recirculated, and NUL blanks are being inserted into upper line buffer 869.

With the memory in the state 5 configuration, the lower buffer starts shifting the information contained therein so that the carriage return code 976 starts moving to the right as viewed in FIG. 31*c*. Simultaneously, with the initiation of the state 5 (S5A) signal, as shown in FIG. 34, this signal is applied through an OR gate 980 to the Up/Down input of a counter 982. The counter 982 is configured so that with the count enable (C.E. input) preset to a logical 1 level clock pulses (C.P.) are counted. With a logical 1 signal applied to the Up/Down input, the counter counts up, and with a logical 0 input the counter counts down. The Carry Out (C.O.) output of the counter 982 goes low as long as there is a count in the counter 982 less than the limit of the counter. The Carry Out (C.O.) output goes high when the counter returns to 0. In the method to be described, the counter 982 is operated so that the limit is not reached. It stores a count indicative of the desired margin under the control of the Edit/Merge sub-system 36, and subsequently upon command counts out the predetermined count to initiate a change of states.

With the state 5 (S5A) input through OR gate 980, counter 982 is enabled to count up, while simultaneously, the output of OR gate 980 is applied to a first input of AND gate 983 to provide an output due to the absence of the character flip-flop signal and the absence of a "retrace" signal. The output of OR gate 980 is also applied through inverter 1006 to disable AND gate 985. The output of AND gate 983 is transmitted through OR gate 984 to a first input of AND gate 990 which is enabled during each $T_{p7}$ time slot to provide clock pulses to insert a count into the counter 982. When the predetermined count desired is reached the Edit/Merge sub-system issues a false character indicator signal which is transmitted over C PIN 50 to be applied to the input of latch 994 wherein during time slot $T_{p2}$ AND gate 995 is enabled to provide a character flip-flop signal at its Q output to thereby disable AND gate 983 to stop the count.

With the memory still configured in state 5 as shown in FIG. 31*c*, and the desired margin count stored in counter 982, the Edit/Merge sub-system must then initiate a command at a predetermined point to stop the lower buffer from shifting its contents. This will now be described in connection with FIG. 32, and particularly the generation of the lower buffer stop (LSC) signal from AND gate 954. When latch 958 went high this signal was applied to one input of AND gate 954. However, as soon as latch 958 went high at MAC 2 of retrace during time slot $T_{p6}$ (through AND gate 957), simultaneously, latch 952 was cleared at the beginning of MAC 3 of retrace, consequently line 953 went low.

The Edit/Merge sub-system 36, in proper time sequence, initiates a signal over C PIN 55 after addressing the memory to provide the ADD signal to thereby enable AND gate 950, the output thereof being clocked into latch 951 and 952 during time slots $T_{p5}$ and $T_{p7}$ respectively, to provide a high signal on line 953. With this signal applied under control of the Edit/Merge sub-system, AND gate 954 is enabled during state 5 to provide a lower buffer stop (LSC) signal. The shifting of the lower buffer 870 is stopped, when as shown in FIG. 31*c*, the portion to the right of vertical line 978 (representing the cursor position) contains the desired margin space for the portion 977 of line n shifted down.

The memory remains configured in a state 5 until retrace when the state 5 (S5A) signal goes low by virtue of the outputs of latch 956 being applied to the outputs of latch 958. During the preceding retrace cycle, latch 958 went high at MAC 2 of retrace and immediately at MAC 3 of retrace latch 956 was cleared. Consequently, at the following retrace cycle the Q output of latch 956 was a logical 0 which then drove latch 958 low during MAC 2 of that retrace cycle. With the state 5 (S5A) signal removed, the TOGGLE B signal goes high. Simultaneously, the state 5 (S5A) signal is removed from the OR gate 980 of FIG. 34.

When this happens, the upper and lower line buffers are toggled so that the contents of upper line buffer 869 and lower line buffer 870 are interposed, and the memory immediately assumes the configuration shown in FIG. 31d, that is the state 3 configuration. This happens as follows: the TOGGLE B signal is applied to line toggle decoder 880 (FIG. 23b) to provide an output through OR gate 915 to set toggle flip-flop 912 which then reverses the states of the set (S) inputs of multiplexers A and B designated 884 and 885 respectively.

Referring again to FIG. 34 with the state 5 (S5A) signal removed, the output of OR gate 980 goes to 0 which is then inverted through inverter 1006 to enable AND gate 985. A second input of AND gate 985 is provided through inverter 1007 from Carry Out (C.O.) output of counter 982. With a count stored in counter 982, this output is low, thereby providing a high signal to the second input of AND gate 985. AND gate 985 has a third input on line 986 coupled to the not Q output of a latch 987, which during the shift down operation is not set, thereby providing an output from AND gate 985 which is designated state 3 (S3D). This output is applied through OR gate 984 to AND gate 990 to provide clock pulses to counter 982 during each $T_{p7}$ time slot. However, at this point in time the Up/Down (U/D) input to counter 982 is set at a 0 level by virtue of the absence of the state 5 (S5A) signal. This results in the counter 982 counting down. The memory remains configured in the state configuration shown in FIG. 31d until such time as the counter 982 has counted to 0 whereupon the Carry Out (C.O.) output goes high, this output being inverted through inverter 1007 to disable AND gate 985 to remove the state 3 (S3D) signal thereby terminating state 3. During state 3, the portion to the right of the vertical line 978 (as shown in lower line buffer 870 of FIG. 31c) contained textual information when the upper and lower line buffers were toggled. This textual information in state 3 is then transferred out through character buffer 871 into lower line buffer 870. The memory remains in state 3 effectively until such time as the right hand limit of upper line buffer 869 is at the cursor location, and two character times later (to accommodate the time delay through character buffer 871) the memory is configured to state 1 as shown in FIG. 31*e*. Effectively, this results in the portion of the line shifted down being returned to the main memory elongated block 867 to become line $n+1$ with a margin determined by the Edit/Merge sub-system.

In summary, the Edit/Merge sub-system 36 controls the Edit sequence upon depression of the edit key 60*n* in the following secquence. Upon receipt of a signal by the Edit/Merge sub-system 36 thaat the edit command is present, the sub-system first performs a row add operation to create a blank line immediately below the line containing the cursor. Then everything immediately above and to the right of the cursor is transferred to the newly created blank line with a left hand margin generally corresponding to the margin of the line from which the portion was shifted down. The transfer and the determination of the margin is accomplished by commands from the Edit/Merge sub-system 36 to the memory, which commands are sequentially issued to accomplish the desired result. The memory then assumes the configuration shown in FIGS. 31*a* –31*e*. Initially, as shown in FIG. 31*a*, the memory is in the state 1 configuration with line *n* (the line containing the cursor) in the upper line buffer 869, having the textual end thereof with a carriage return (CR) code designated 976. The newly created blank line is shown in the main memory elongated block 868 and is being transferred out to the upper line buffer 869 as the contents of the upper line buffer 869 are passing through character buffer 871 for simultaneous transfer back to the main memory line *n* (elongated block 867) and a lower line buffer 870.

As the line *n* of upper line buffer 869 is being transferred through character buffer 871, at the time that the Edit/Merge sub-system detects the character with the cursor immediately thereunder in the on-line register of character buffer 871, a shift down command is issued by the Edit/Merge sub-system, and two character time delays later a state 3 signal is generated to configure the memory as shown in FIG. 31*b*. The net effect of this reconfiguration is to return to line *n* of the main memory (elongated block 867) only that portion 979 of line n which is to the left of the cursor within the line, while all of line n is being transferred to the lower line buffer 870 by being serially shifted therein. At such time as the carriage return (CR) code is on the data bus, the carriage return on line detector (FIG. 33) initiates a signal so that two character time delays later (when the carriage return code enters the lower line buffer) a command is issued to stop the lower buffer from shifting its contents. The reconfiguration of the memory from state 1 to state 3 occurs during display time as does the stopping of the lower buffer when the carriage return code enters herein.

The memory remains in state 3 until retrace when the memory assumes the state 5 configuration as shown in FIG. 31*c*, while simultaneously the lower buffer stop signal is removed to permit the lower buffer to commence shifting. At this point, several things are happening: the row count is inhibited; the main memory (lines 867 and 868) is recirculating; and a counter is storing a count indicative of the desired margin for the portion of the line shifted down under control of the Edit/Merge sub-system. When the lower line buffer 870 of FIG. 31*c* has the textual information therein shifted to a location where the spacing to the right of the cursor position (generally indicated as a vertical line 978) is equal to the desired margin, the Edit/Merge subsystem issues a command to stop the lower buffer. This happens during display time, and as soon as retrace occurs, several things happen: the memory is toggled so that the contents of lower line buffer 870 of FIG. 31*c* become the contents of upper line buffer 869 of FIG. 31*d;* the memory assumes the state 3 configuration of FIG. 31*d;* the lower buffer stop signal is removed; the inhibit low count signal is removed; the recirculate main memory signal is removed; and the counter is enabled to commence counting down. The count stored in the counter generally is indicative of a time duration for the memory to remain in the state 3 configuration, which time duration is proportional to the time required for that portion of the textual information to the right of the vertical line 978 (representing the cursor position) as shown in block 870 of FIG. 31*c* to pass through the character buffer 871 of FIG. 31*d* into the lower line buffer 870. In the state 3 configuration as shown in FIG. 31*d*, line $n+1$ of the main memory (block 867) has blanks being inserted therein while the contents of upper line buffer 869 are passing through character buffer 871 into lower line buffer 870. At such time as the counter counts down to 0 the memory is reconfigured to the state 1 configuration (this occurring in display time) whereupon the blanks previously inserted into line $n+1$ occupy the desired margin for the newly created line $n+1$ (containing the shifted down portion of previous line *n*) and the balance of line *n* containing some textual information which was shifted into the lower line buffer 870 in the state 3 configuration is being serially dumped from lower line buffer 870 in the state 1 configuration.

SHIFT UP

In addition to the edit function which performs the shift down operations in memory, the Edit/Merge subsystem also controls the merge function which performs the shift up operations in memory. If the operator has on the display screen a line with space to the right thereof which can be filled with additional textual information, the operation known as merge can be performed on this particular line. This operation is initiated by the depression of the merge function key 60*p* (FIG. 2) with the cursor positioned within the line into which it is desired that the text be transferred. The cursor can be positioned anywhere within the line but the net effect of the operation is that textual information from the first line below which contains textual information, is transferred one word at a time up to the line containing the cursor until the right hand margin limit of the line is reached. For the purpose of this discussion, the line in which the cursor is located will be referred to as the "position line", and the line from which text is transferred will be referred to as the "transfer line". If one or more blank lines exist between the position line and the transfer line, the transfer line is moved up to a location immediately below the position line by one or more row delete operations being performed by commands issued by the Edit/Merge subsystem. Commencing with the first word on the transfer line the text is transferred to the position line a word at a time until the position line extends to the right margin. If the last word transferred to the position line extends beyond the right margin, the characters to the right of the margin will begin blinking and further merging will be inhibited until such time as the operator intervenes. The operator must then hyphenate the last word with the portion to the right of the hyphen being dropped down to the next line. When a transfer line is moved up by reason of blank lines intervening between it and the position line, all textual information below the transfer line moves up in the same spatial relation to the transfer line. If all words on the transfer line are absorbed by the position line the now blank transfer line is deleted resulting in the balance of the text moving up one line with the same organization.

If, at the end of the merging of words to the position line until the right margin is reached, some textual information still remains in the transfer line (in the example with blank lines intervening) a number of row add operations are performed to correspond with the number of row delete operations to return the balance of the transfer line to its original position.

As previously mentioned the operator commences the merge operations by depressing the merge function key 60*p* on the keyboard with the cursor positioned anywhere on a given line of text into which it is desired to move up text from following lines of text. As shown in FIG. 13 the depression of this key initiates a signal which is transmitted to C PIN 51 of the special control and indicator bus 26 through AND gate 234 during time slot $T_6$ of MAC 3 with retrace and flyback (see also FIG. 9*c*). This signal is received by Edit/Merge sub-system 36 and immediately sets an "edit flip-flop" which remains set until the merge operations are terminated. Immediately upon occurrence of display time the Edit/Merge sub-system initiates a first signal over C PIN 51 during time slot $T_0$ to indicate "edit/merge busy" and a second signal during time slot $T_6$ over C PIN 51 to inhibit the keyboard.

The Edit/Merge sub-system then commences scanning the text as it passes on the data bus to determine the organization of the lines in memory below the position line, as well as the margin organization and location of the lines containing text.

If one or more blank lines are interposed between the position line and the transfer line the Edit/Merge subsystem the issues row delete over C PIN 52 during time slot $T_5$ of MAC 3 of retrace with no flyback (see Table of FIG. 10). This signal is received by the circuitry shown and previously described in connection with FIG. 26 to perform the row delete operation previously discussed in connection with FIGS. 25*a*–25*d*, with the number of row delete operations being dependent upon the number of blank lines between the position line and transfer line.

Once the transfer line is immediately below the position line the Edit/Merge sub-system 36 initiates a shift up signal over C PIN 57 during time slot $T_5$ after addressing the memory (see Table of FIG. 10). The shift up command is issued on or before a carriage return code appearing on the data bus.

Figures 35A, 35B, 35C, 35D, 35E, 36:
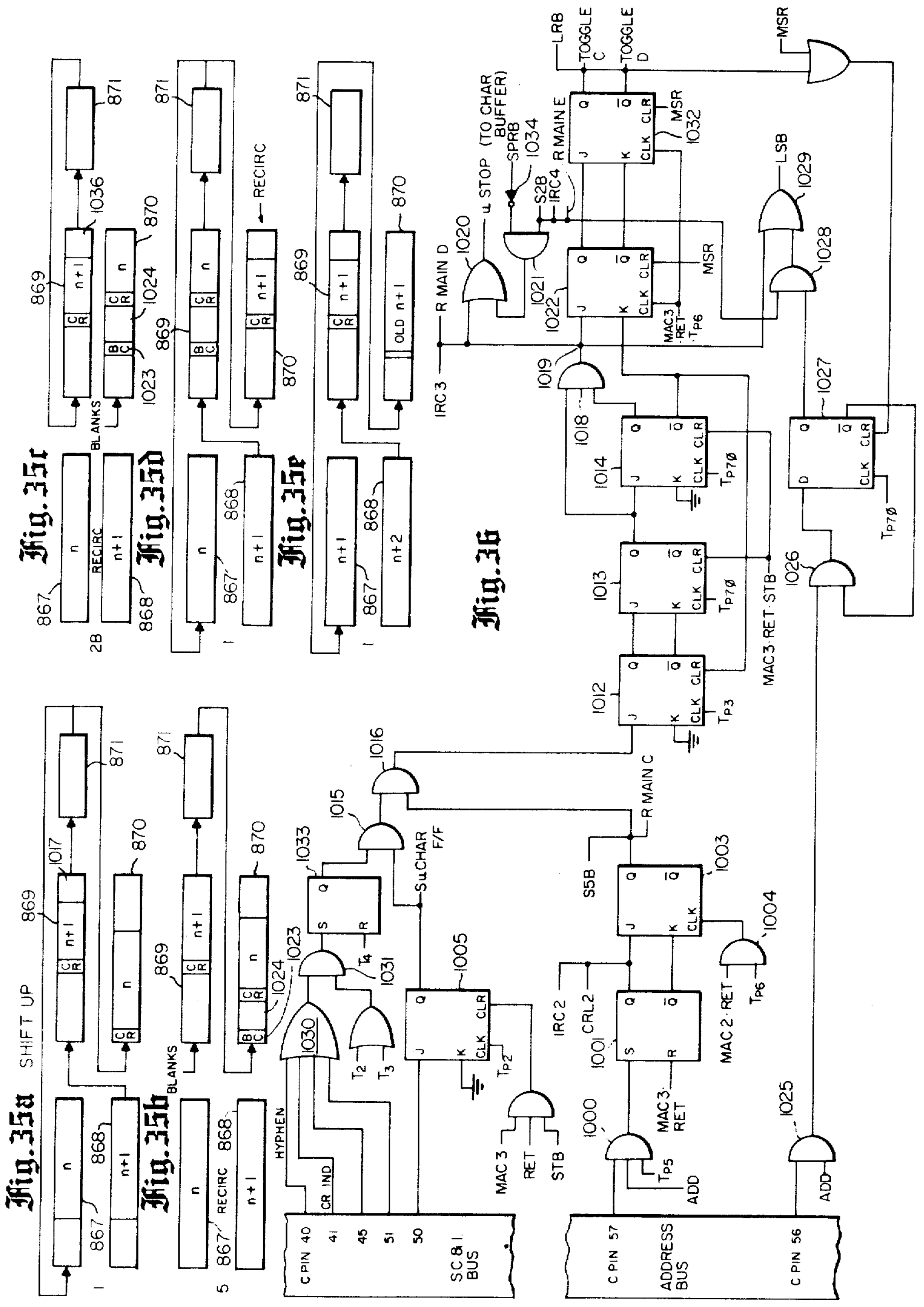
FIGS. 35a through 35e show in flow diagram form the sequential states assumed by the memory to effect a shift up operation.
FIG. 36 is a detailed block diagram showing the sequencing circuitry for configuring the memory as shown in FIG. 35.

Referring to FIG. 36 when a command appears on C PIN 57 during time slot $T_{\mu 5}$ after the address (ADD) signal is issued AND gate 1000 is enabled to apply its output to the set input of latch 1001 whereupon the Q output goes high. The output of latch 1001 initiates a carriage return in lower buffer (CRL 2) signal as well as an inhibit row count (IRC 2) signal. Consequently, the row count is inhibited, and as previously discussed in connection with FIG. 33 when the carriage return code indicator signal is applied to C PIN 40 a lower buffer stop (LSA) signal is initiated through AND gate 971 to stop the lower buffer 870 from shifting. This occurs with the memory in the state 1 configuration as shown in FIG. 35*a* wherein upper line buffer 869 contains the transfer line (line $n+1$) while the lower line buffer 870 contains the position line (line $n$) with the carriage return code occupying the last character entry position within the lower line buffer 870. The portion designated 1017 of upper line buffer 869 (line $n+1$) generally depicts the margin spacing of the transfer line which must be maintained as each word is shifted out of the transfer line to the position line.

Referring again to FIG. 36 during time slot $T_{\mu 6}$ of MAC 2 and retrace AND gate 1004 is applied to the clock input of latch 1003 to pass the output of latch 1001 therein to set the Q output of latch 1003 to a high level. Immediately thereafter at MAC 3 of retrace latch 1001 is reset. With latch 1001 being reset the inhibit row count signal is removed as well as the carriage return in lower buffer signal. With the removal of the latter signal, AND gate 971 (of FIG. 33) is disabled to remove the lower buffer stop signal. However, as will be discussed, the lower buffer 870 does not yet commence shifting.

When latch 1003 is set during retrace, the output thereof provides a state 5 (S5B) signal as well as a "ecirculate main memory" (R MAIN C) signal. The memory then assumes the state 5 configuration shown in FIG. 35*b* wherein line $n$ (elongated block 867) and line $n+1$ (block 868) of the main memory are being recirculated, while blanks are being inserted into upper line buffer 869 immediately behind line $n+1$. Line $n+1$ is being transferred through character buffer 871 to lower line buffer 870. At retrace, line $n+1$ is fully contained within the upper line buffer 869 as depicted in FIG. 35*a*, while lower line buffer contains line $n$ with the carriage return code in the last character position therein. When state 5 commences, the lower buffer 870 is still "stopped" with the information essentially as shown in FIG. 35*a* while the upper buffer 869 commences serially shifting to the right until the margin portion designated 1017 is used up. With the initiation of the state 5 (S5B) signal, referring to FIG. 34 the counter 982, as previously discussed, counts up to store the number of character spaces occupied by the margin portion 1017.

When state 5 is initiated latch 1001 was reset to thereby drop out the lower buffer stop (LSA) signal shown in FIG. 33. However, as shown in FIG. 34 another lower buffer stop (LSD) signal takes over with the initiation of state 5 through AND gate 1010 which has one input thereof coupled through the not Q output of latch 1009, and the other input thereof being coupled to the state 5 (S5B) signal. Accordingly, the lower buffer remains stopped while the margin portion 1017 is being shifted through the upper line buffer 869 of FIG. 35b in the state 5 configuration.

At such time as a character is detected in the character buffer 871 several events occur: a character indicator signal is transmitted over C PIN 50 which during time slot $T_{p2}$ is latched in to latch 994 (FIG. 34) to provide a character flip-flop signal; simultaneously, the signal is latched in to latch 1005 (FIG. 36) to provide a shift up character flip-flop signal to enable a first input of AND gate 1005; simultaneously with the setting of latch 994 the not character flip-flop output of latch 994 (FIG. 34) goes low to disable AND gate 983 thereby stopping the counter at a count indicative of the margin portion 1017 (FIG. 35*a*). This sequence of events indicates to the lower line buffer 870 that the first character of the first word of the upper buffer will be accepted by the lower buffer 870.

The setting of the character flip-flop latch 994 is transmitted two character time delays later through latches 1008 and 1009 to disable AND gate 1010 to remove the lower buffer stop (LSD) signal to thereby permit the lower buffer to start at such time as the first character of upper buffer 869 can be accepted immediately behind the carriage return code of lower line buffer 870. The lower line buffer 870 (FIG. 35b) then serially shifts to the right until such time as the first of one of a number of codes indicating the end of a word can enter the lower line buffer 870. In FIG. 35*b* the portion in lower line buffer 870 designated 1023 is indicated as being a "blank code" (BC) while the portion designated 1024 generally depicts the first word transferred to the position line from the transfer line.

Generally, one of four indicator signals are used to indicate the end of a word for shift up purposes. These are a hyphen code indicator (which is transmitted over C PIN 40), a carriage return indicator (which is transmitted over C PIN 41), a buried continued word code indicator (which is transmitted over C PIN 45 and indicates a hyphen that is not viewed on the display screen as previously discussed), and an active blank code indicator (which is transmitted over C PIN 51). These indicator signals are shown in FIG. 20*a* and the means for receiving them are shown in FIG. 36. As shown in FIG. 36 the existence of any one of these indicator signals is applied to OR gate 1030 where during time slot $T_2$ or $T_3$ AND gate 1031 is enabled to set latch 1033 which provides the second input to previously enabled AND gate 1005.

With the memory still in the state 5 configuration the output of AND gate 1015 passes through AND gate 1016, the other input thereof being coupled to the state 5 (S5B) signal to be transmitted through retiming latches 1012, 1013 and 1014 to provide a two character timing delay. During this two character time delay the lower line buffer 870 of FIG. 35*b* contains the information generally depicted therein with the blank code 1023 occupying the last character position. At this point, the upper and lower line buffers 869 and 870 respectively are stopped so that upper line buffer 869 contains the contents of line *n*+1 without the first word, while the contents of lower line buffer 870 contain the textual information of line n plus the first word of line *n*+1.

The stopping of the upper and lower line buffers is accomplished when latches 1013 and 1014 go high with the outputs thereof being coupled to the two inputs of AND gate 1018 to provide a high signal at the output thereof designated 1009. When line 1019 goes high the signal is applied through OR gate 1029 to provide a lower buffer stop (LSB) signal to stop the lower buffer with the blank code 1023 in the last character position of lower line buffer 870. The upper buffer is stopped by an upper buffer stop (U STOP) signal applied through OR gate 1020 from line 1019. With line 1019 high an inhibit row count (IRC 3) signal is initiated as well as a recirculate main memory (R MAIN D) signal.

At the next retrace cycle several events occur: at MAC 2 during time slot $T_{p6}$ of retrace the output of AND gate 1018 is clocked into latch 1022 to drive its Q output high; latch 1003 is cleared by transfer of the previously cleared outputs of latch 1001 therein to remove the state 5 (S5B) signal; latches 1013 and 1014 are cleared at MAC 3 of retrace thereby removing the lower buffer stop (LSB) and upper buffer stop (U STOP) signals; and the Q output of latch 1022 goes high to provide a state 2 (S2B) signal as well as an inhibit row count (IRC 4) and recirculate main memory (R MAIN E) signal. This output is also coupled to a first input of AND gate 1028 which has the other input thereof coupled to the output of latch 1027 (which at this point in time is 0.

The memory then assumes the state 2 configuration shown in FIG. 35*c* wherein lines *n* and *n*+1 (blocks 867 and 868 respectively) are recirculating. The upper line buffer 869 is transferring its information through character buffer 871 and back to upper line buffer 869 while blanks are being inserted into lower line buffer 870 immediately behind the blank code 1023.

Referring again to FIG. 34 when the state 5 (S5B) signal terminates the Up/Down input of counter 982 goes to 0 thereby permitting the counter 982 to count down. Although the output of AND gate 985 is designated state 3 (S3D) the state decoder 859 (FIG. 23*a*) is configured to provide a state 2 configuration when both state inputs S2D and S3D are present. At this point of time the upper buffer is stopped by reason of the state 2 (S2B) signal in FIG. 36 being applied to AND gate 1021, the other input thereof being designated "special run buffer" (SPRB) which is low and is applied through inverter 1034 to provide a second high signal to AND gate 1021, the output thereof being applied through OR gate 1020 to maintain the upper buffer in a stopped condition. At this point in time the upper buffer 869 has the balance of the contents of the transfer line (line *n*+1) therein with the exception of the first two characters of the now first word which are contained in the character buffer 871 (on-line register containing one character and the past character register containing the other character).

As soon as the memory assumes the state 2 configuration as shown in FIG. 34 the counter 982 commences counting down until the margin information contained therein is counted out. Prior to the counting out AND gate 985 is high, which signal upon inversion through inverter 1035 disables AND gate 1036, the output of which is designated special run buffer. When the count goes to 0 AND gate 985 is disabled thereby enabling AND gate 1036. Two character times later the run main signal is applied to the other input of AND gate 1036 permitting an output. As shown in FIG. 36 the special run buffer signal disables AND gate 1021 to permit the upper buffer to commence shifting at a point in time after the margin spacing and the length of the character buffer has been determined. The upper buffer then commences shifting as shown in the state 2 configuration of FIG. 35*c* until line *n*+1 (minus one word) is contained in the upper buffer 869 with the portion designated 1036 corresponding to the same margin 1017 (of FIG. 35*a*).

Simultaneously, during the same display cycle the lower buffer 870 of FIG. 35*c* is shifting to the right until a lower buffer stop (LSB) signal is initiated from the Edit/Merge sub-system. As shown in FIG. 36 this signal is applied over C PIN 56 after the memory has been addressed to enable AND gate 1025, the output of which is applied through AND gate 1026 to set latch 1027 during time slot $T_{p7}$. The Q output of latch 1027 is applied through AND gate 1028, previously enabled by a state 2 (S2B) signal, with the output thereof being passed through OR gate 1029 to provide the lower buffer stop signal. The lower buffer is stopped as soon as all of line *n* plus the one word from the transfer line is at the right hand edge of lower line buffer 870, while the upper buffer is run until the remainder of the transfer line plus the new margin is located therein just prior to retrace. At retrace, referring to FIG. 36, the output of latch 1022 is clocked into latch 1032 to set its Q output high, while latch 1022 has its Q output low. When this occurs, the upper and lower line buffers toggle by virtue of the toggle (TOGGLE C) signal at the Q output of latch 1032 and the memory goes to the state 1 configuration shown in FIG. 35*d*. The output of latch 1032 is also designated lower buffer recirculate (LRB). While the upper buffer 869 containing the position line with the additional one word is being transferred through character buffer 871 back to new line n of the main memory (elongated block 867), the lower buffer 870 containing the transfer line with the new margin is being recirculated to prevent destruction of the contents therein. At the next MAC 2 of retrace, latch 1032 is reset with its not Q output being designated TOGGLE D. The upper and lower line buffers 869 and 870 respectively, are then again toggled in the state 1 configurjation as shown in FIG. 35*e* so that the transfer line is not contained in the upper line buffer 869 to be returned to line *n*+1 of the main memory (elongated block 867).

The Edit/Merge sub-system 36 initiates the performance of one shift up operation each refresh cycle until such time as it has been determined that either the position line can no longer accommodate additional words or the transfer line has been completely transferred to the position line or the last word transferred to the position line extends beyond the right margin thereof at which time the merge operation terminates. The Edit/Merge sub-system also determines that if all the contents of the transfer line have been consummed resulting in an emplty line, the Edit/Merge sub-system initiates a row delete operation to do away with the now blank line. Also, if the last word enetered into the position line extends to the right margin, and row delete operations had been previously performed, the Edit/Merge sub-system initiates a like number of row add operations to restore the transfer line to its original position on the display screen.

EDIT SUB-SYSTEM

Although the Edit/Merge sub-system 36 (FIG. 1) is shown as a single sub-system, functionally it comprises two sub-systems on one printed circuit card. The Edit operations which had been discussed generally heretofore will now be discussed in detail with reference to FIGS. 37–39.

As previously discussed when the Edit key 60*n* (FIG. 2) is depressed, a signal is transmitted over C PIN 51 during MAC 1 and $T_1$ during retrace and flyback (as shown in FIG. 9*c*), this signal appearing on special control and indicator bus 26 where it is applied to the input of latch 1050 to be clocked in during window of time $T_{p1}$ to provide an output which provides a clock pulse to a second latch 1051 having the input thereof set to a logical 1 level thereby providing an output designating "Edit Flip-flop" on line 1052. A second signal indicating memory line 59 is transmitted over with the Special Control and Indicator Bus 26 where it is received by AND gate 1053 which has an output during retrace and time slot $T_{p4}$, the output being applied to a subsequent AND gate 1054 which is enabled during MAC 1 to provide a signal on line 1055 designated "Line 59 End". This latter signal is applied to one input of an AND gate 1056, the other input thereof being coupled to the Edit Flip-flop signal appearing on line 1052. The output of AND gate 1056 provides a clock pulse to an "Edit Counter" 1057, the counter output being transmitted over cable 1058 to an Edit Program Counter 1059 which is essentially a decoder.

The Edit Program Counter 1059 is basically an Edit Program Sequencer which provides 20 mutually exclusive outputs designated ECCO, ECCA, ECCB, ECCC, ECCD, as well as ECCL through 15. Each of the outputs of the Edit Program Counter 1059 is an enabling pulse to permit the performance of the required specified steps in the Edit operation in proper time sequence, with the Edit Program Counter 1059 advancing to the next output each time the memory is scanned. The Program count advances until such time as the Edit Flip-Flop 1051 is cleared by means of the "Clear Edit" signal on line 1060 which occurs on one of two conditions through OR gate 1061. One input to OR gate 1061 is designated "Terminate 2" which occurs during program count ECC2 during MAC 1 of retrace at time slot $T_{p1}$ with a row compare signal. This Terminate 2 signal terminates the program count if the Edit command is issued in an empty line. The other input to OR gate 1061 is designated "Reset Edit" which signal is applied from AND gate 1062 with the concurrence of a compare COMP signal during time slot $T_{p0}$ during program count ECC15 (the last count from Edit Program Counter 1059).

As soon as the Edit Flip-flop 1051 is set, the output thereof appearing on line 1052 is applied to the first input of AND gate 1063 which is enabled during display time to provide three commands to the Special Control and Indicator Bus 26 for usage by the other sub-systems. These commands are, respectively, the "Edit Busy" command which is applied to C PIN 52 during time slot $T_0$ through AND gate 1066 during time slot $T_5$ through OR gate 1065; and, the Inhibit Keyboard signal which is applied to C PIN 51 through AND gate 1067 during time slot $T_6$.

As previously discussed in connection with the Shift Down operation, the Edit/Merge Sub-system 36 scans the text entered into memory to determine the margin organization of lines of text above and below the line under consideration. As previously discussed, each line in memory contains 128 character storage locations. Accordingly, the margin location of a particular line under consideration as displayed on the display screen will be the equivalent to the corresponding first character code within the line of memory. For this purpose, the character indicator signals are provided so that in a given line of memory the first such character indicator would determine the first storage location containing textual information (i.e., a character code to be displayed on the screen). This would correspond to a given MAC count since during display time there are 128 MAC counts, one for each storage location.

Consequently, as the Edit Program Counter advances through its 20 program counts certain information is derived and certain action takes place preparatory to the next program count during which other action takes place predicated upon the pre-existing conditions determined during the scanning process. In addition to the enabling signal provided by the program count, other enabling signals are generated depending upon whether the line under consideration is the row compare line, that is the line in which the cursor is located or whether the line currently being displayed is prior to or subsequent to the Row Compare line. It must also be ascertained whether the line before or after the Row Compare line contains textual information.

When the Row Compare signal is transferred over C PIN 36 of the Special Control and Indicator Bus 26, a Row Compare Flip-Flop 1070 is set during MAC 9 of retrace during time slot $T_{p3}$ to provide an output on line 1071. During the next retrace cycle during MAC 9 and time slot $T_{p2}$, the output on line 1071 is clocked into latch 1072 to provide a "Row Compare +1 Signal" at the output on line 1073. During the next immediate succeeding time slot, that is $T_{p3}$, latch 1071 is cleared. The setting of latch 1070 provides an enabling signal for operation occurring relating to the line in which the cursor is located, while the setting of latch 1072 provides an enabling signal for operations required during an analysis of the information contained in the next succeeding line of text. In conjunction with these enabling signals, there is further provided a "Before Row Compare Flip-Flop" 1074 and an "After Row Compare Flip-Flop" 1075. The setting of flip-flop 1074 occurred during MAC 2 in time slot $T_{p4}$ of retrace when a signal is transmitted over C PIN 39 (which as can be seen in the table of FIG. 9*b* indicates memory line 0). Latch 1074 is subsequently cleared with a Row Compare signal. Similarly, latch 1075 is set through AND gate 1076 on the first character of the After Row Compare line during time slot $T_{p3}$ and the latch is reset when the Before Row Compare Flip-Flop is set.

The first character is detected to set the "First Character" flip-flop 1077. This is accomplished by the transmission over C PIN 40 of a carriage return indicator which sets the carriage return flip-flop 1078 and inhibits setting of the first character flip-flop during time slot $T_{p1}$. The output of latch 1078 is fed to a first input of AND gate 1079 which has the second input thereof coupled to C PIN 50 which during time slot $T_{p2}$ of display time provides a Character Indicator (see FIG. 9*a*). The output of AND gate 1079 is clocked into flip-flop 1077 through AND gate 1080 during display time and time slot $T_{p2}$ if the Character Flip-Flop 1081 is not set. The output of flip-flop 1077 appearing on line 1082 is designated First Character Flip-Flop which as previously mentioned sets the After Row Compare flip-flop 1075. The output of AND gate 1079 is also applied to flip-flop 1081 to provide the Character Flip-Flop signal.

If after occurrence of a Carriage Return signal setting carriage return flip-flop 1078, no characters are indicated during display time of one entire line of memory, character flip-flop 1081 will not be set, consequently, its Not Q output will be high. This output is coupled to a "previous line blank" flip-flop 1086 as well as a "next line blank" flip-flop 1087 which are set under certain conditions. The NOT Q output of character flip-flop is clocked into previous line blank flip-flop 1086 during MAC 9 and time slot $T_{p1}$ of retrace with the program count at ECC1 and a row compare signal. Briefly referring to FIG. 7b, it can be seen that the row compare signal goes high during retrace prior to the line containing the cursor. Consequently, the output of latch 1086 would designate the non-existence of textual information in the line immediately preceding the row compare line. If the previous line is blank, latch 1086 will remain high until it is cleared through OR gate 1088 with either a Reset Edit signal (indicating the end of the program count) or a "Master Reset Signal". Similarly, the next line blank flip-flop 1087 goes high if no characters are detected subsequent to the carriage return indicator, with the signal being clocked in during MAC 9 and time slot $T_{p1}$ of retrace with the Row Compare +1 signal during program count ECC2, and remains high until it is cleared by either a reset edit signal or a master reset signal. It is to be noted that the non-existence of text in the line preceding and the line subsequent to the line containing the cursor are determined early in the program counting cycle, that is, during ECC1 program count for the previous line and during ECC2 program count for the next line. The setting of these flip-flops would indicate that double spacing is being employed in the text under consideration. The information so stored is subsequently utilized by the outputs of both flip-flops 1086 and 1087 being applied through AND gate 1089 to provide a first input to AND gate 1090 which is subsequently enabled with concurrence of a compare signal during program count ECC11 to provide a first input to OR gate 1091, the output of which is transferred during time slot $T_2$ through AND gate 1092 to a memory address encoder 1093 to address the memory over C PINS 55, 56, 57 and 58 of the Special Control and Indicator Bus during the next time slot $T_7$ the output of OR gate 1091 is transmitted through AND gate 1093 to C PIN 5 to provide a command to the memory to perform a Row Add function (see FIG. 10).

The second input to OR gate 1091 which likewise accomplishes the row add function is coupled to the output of AND gate 1096 which is designated Edit Row Add. This AND gate is enabled as follows. When a carriage return signal is transmitted over C PIN 40, this signal is transmitted over line 1097 to clear latch 1098 which has its D input coupled to a logical 1 level. At the first retrace after the carriage return signal latch 1098 is set with the output thereof being coupled to AND gate 1099 which is enabled during time slot $T_{p1}$ to provide a first input to AND gate 1100 which upon occurrence of a compare signal is clocked into latch 1101 during time slot $T_1$ to provide an output at its Q output line 1102 which is designated Edit Compare. This signal during program count ECC3 enables AND gate 1096 to initiate a row add function which opens a line in memory to permit the Shift Down operation as previously discussed. Simultaneously, the ouput appearing on line 1102 during program count ECC4 enables AND gate 1103 to provide a first signal on line 1104 through AND gate 1105 during time slot $T_5$ through OR gate 1106 to C PIN 55 to provide an Initiate Shift Down signal (see FIG. 10). Simultaneously, the output of AND gate 1103 is applied to set latch 1107 which is the Shift Down flip-flop. Latch 1107 is reset with a Reset Shift signal (see FIG. 39). The output of the shift down flip-flop 1107 is applied through AND gate 1108 during time slot $T_5$ when a "Text At End" signal is received with the occurrence of MAC 127 of display time (indicating the last storage location in the line of memory). The output of latch 1108 is fed through OR gate 1106 to C PIN 55 to provide a Stop Shift Down signal.

Figure 37:
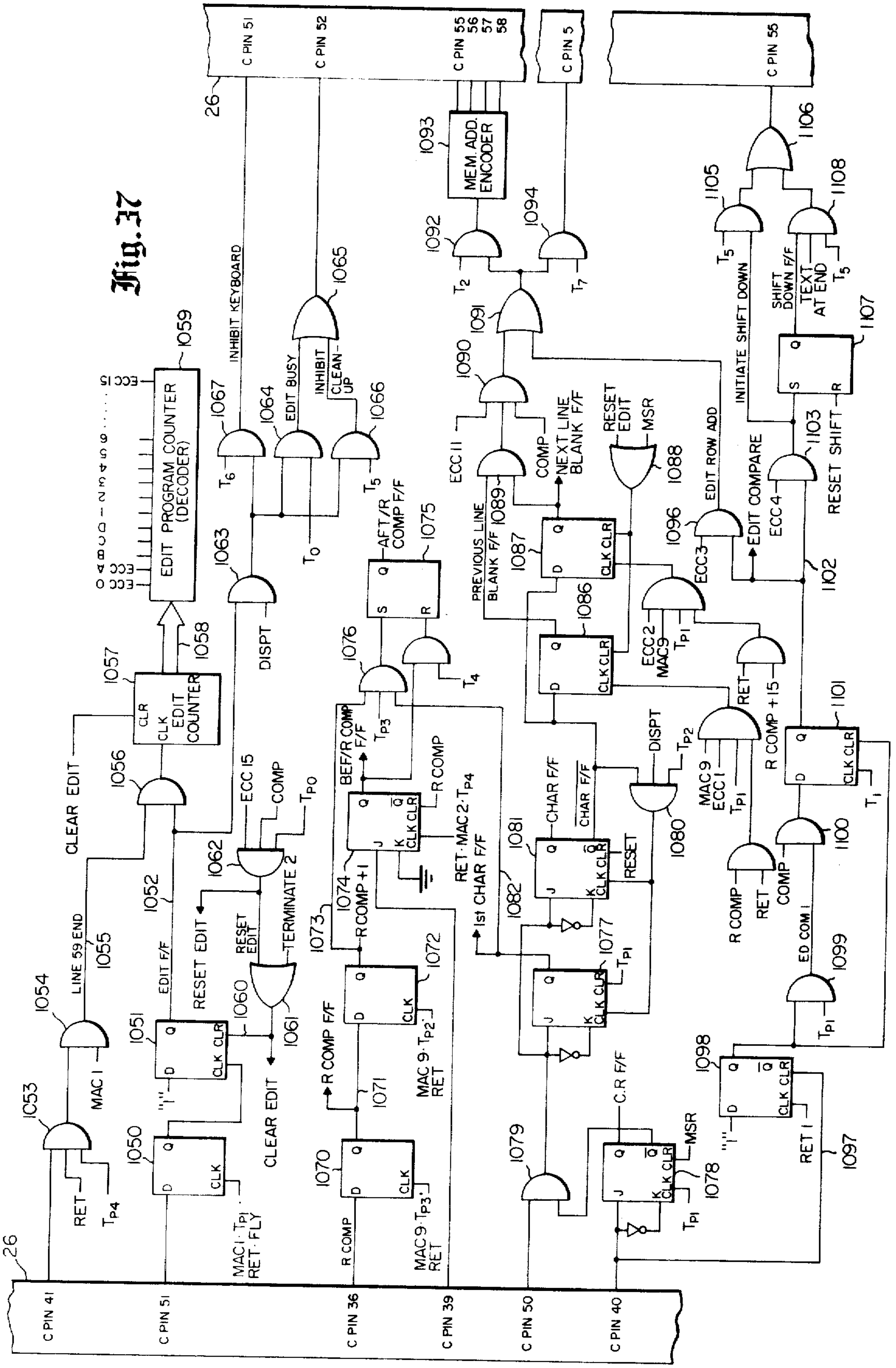
FIGS. 37–40 show a detailed block diagram of the Edit portion of the Edit/Merge Sub-system.
Figure 38:
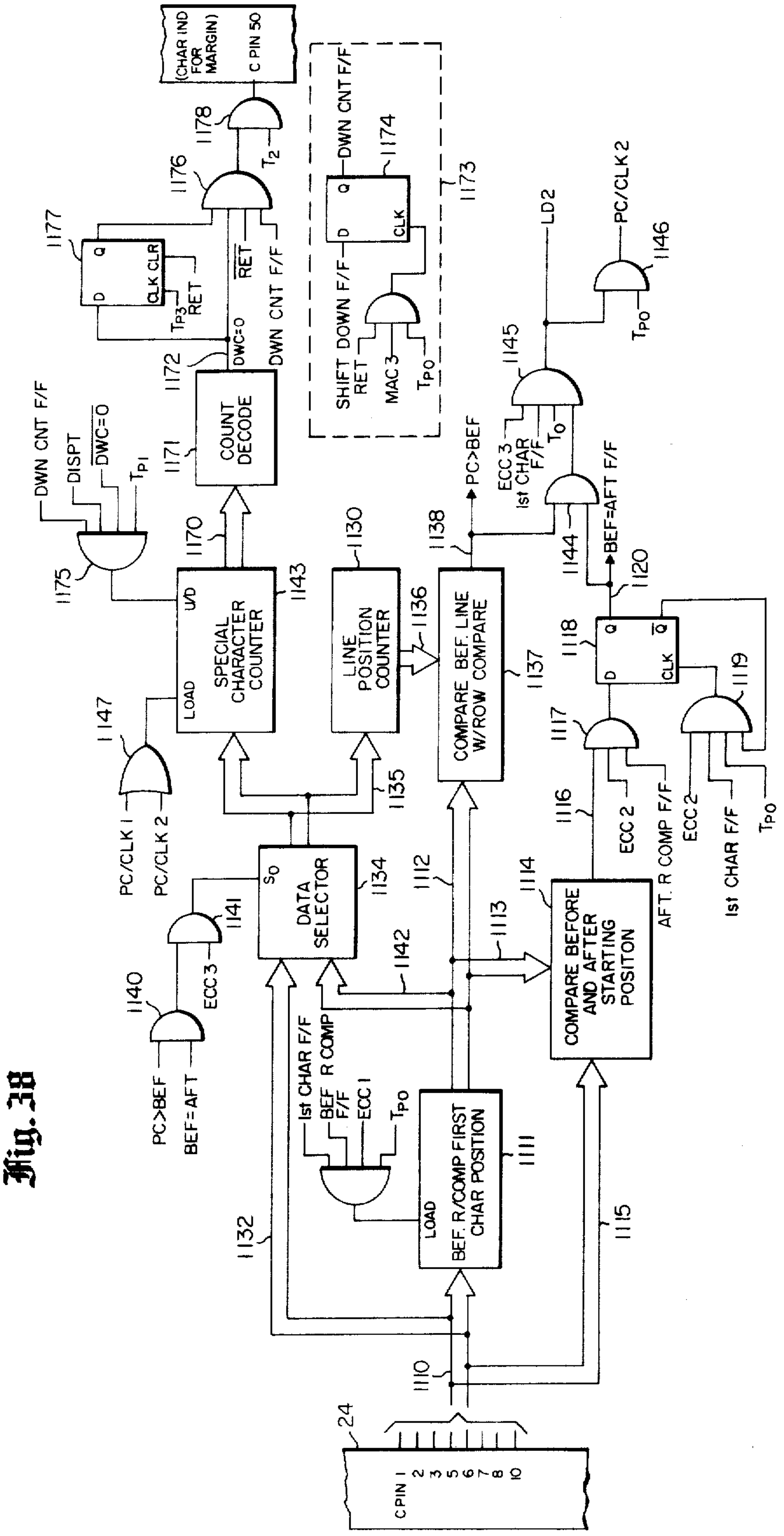

Briefly, it should be noted that the above description with regard to FIG. 37 is a functional description of the logic circuitry and not necessarily a sequential description, it being understood that the sequence of signals applied to the Special Control and Indicator Bus for utilization by the other sub-systems is dependent upon the order of program count which provides the enabling signal for the control or indicator signal to the bus. Referring now to FIG. 38, the means for determining the margin for the lines of text above and below the line under consideration will be discussed. Briefly, this entails determining the first character position in each of the three lines of text, the character position being indicated by the MAC count which is transmitted over C PINS 1, 2, 3, 5, 6, 7, 8 and 10 of data bus 24. This information is transferred over cable 1110 to a first storage means 1111 designated "Before Row Compare First Character Position" where the MAC count is loaded in during program count ECC1 during time slot $T_{p0}$ provided the first character flip-flop and the before row compare flip-flop are set. The output of storage means 1111 is transferred over cable 1112, over cable 1113 to a first set of inputs of a comparator 1114 designated "Compare Before and After Starting Position". The second set of inputs of comparator 1114 are provided from cable 1110 over cable 1115. The comparator 1114 is such that it provides an output on line 1116 when both sets of inputs are equal. This output, however, is sampled at a particular point in time during the next succeeding program count ECC2. The output on line 1116 provides a first input to AND gate 1117 with a second and third inputs thereof being coupled to program count ECC2 and the after row compare flip-flop to provide an input to latch 1118 which is clocked in during time slot $T_{p0}$ of program count ECC2 if the first character flip-flop signal has been applied to AND gate 1119, the output of which provides the clock pulse. In this manner latch 1118 is set only if the first character flip-flop when set, is at a position whose MAC count corresponds to the MAC count stored in storage means 1111. If latch 1118 is set, this indicates that the MAC count of the first storage location containing a displayable character in the line preceding the row compare line is the same as that in the line following the row compare line and thus a "Before Equals After" signal will be provided at the output line 1120 of flip-flop 1118.

Similarly, the line of text preceding the row compare line is compared to determine the relative orientation of the text in memory. This is accomplished by means of line position counter 1130 which loads the MAC count of the first character of the row compare line under usual conditions. The MAC count loaded in line position counter 1130 comes from the data bus 24 over cable 1110, over cable 1132 through data selector 1134 through output cable 1135 to the inputs of line position counter 1130. This occurs as long as the set $S_0$ input of data selector 1134 is not energized. The output of line position counter 1130 is then applied over cable 1136 to a first set of inputs of comparator 1137 which receives at its second inputs the first character position of the line preceding row compare from storage means 1111 over cable 1112. If the information is stored in storage means 1111 is identical to the information in the line position counter 1130, the output line 1138 remains at a low logic level. If, on the other hand, the count in line position counter 1130 is greater than the inputs appearing on cable 1112, the output on line 1138 goes high to indicate that the position count of the row compare lines is greater than the count of the preceding line (PC is greater than before line) which would indicate that the line under consideration is an indented line.

The purpose of determining the relative orientation of the first character position on each of the three lines of text is to generate the margin information for the part of the line which is shifted down during the edit operation so that the restored margin is consistent with the text entered in memory. Two general conditions exist. In the first condition, if the position count is the same as the first character position of the line of text immediately above, the part shifted down will have the same first character position. In the second condition, if the line above and below had equal first character positions, and the row compare lines is greater than the before line (indicating the row compare line is indented) then the margin of the part shifted down is set to correspond with the first character position of the before line. When the latter condition exists, the output of latch 1118 goes high to provide an output on line 1120 while the output comparator 1137 appearing on line 1138 goes high with both of these inputs being applied to AND gate 1140 to provide an output to a first input of AND gate 1141 which is enabled during program count ECC3 to drive the set input ($S_0$) of data selector 1134 high to thereby transfer the output of storage means 1111 over cable 1112, over cable 1142 through data selector 1134 over cable 1135 to insert into the line position counter 1130 the MAC count of the before line. It is to be noted that the output on cable 1135 is simultaneously applied to a special character counter 1143 for purposes which will hereinafter be discussed.

The outputs of comparator 1137 appearing on line 1138 and the output of latch 1118 appearing on line 1120 when both are high enable AND gate 1144 to provide a first input to AND gate 1145. AND gate 1145 is enabled during time slot $T_0$ of program count ECC3 if the first character flip-flop is set. The output of AND gate 1145 is designated "Load 2" (LD2) and this signal is further applied to AND gate 1146 to provide a clock signal during time slot $T_{p0}$ (a window of time within time slot $T_0$) which clock signal is designated PC/CLK2 (position counter clock signal). This clock signal permits the loading of the special character counter 1143 through OR gate 1147 to permit loading into the special character counter 1143 of the contents of the storage means 1111 only if the conditions indicate an indented line.

Figures 39, 40, 42:
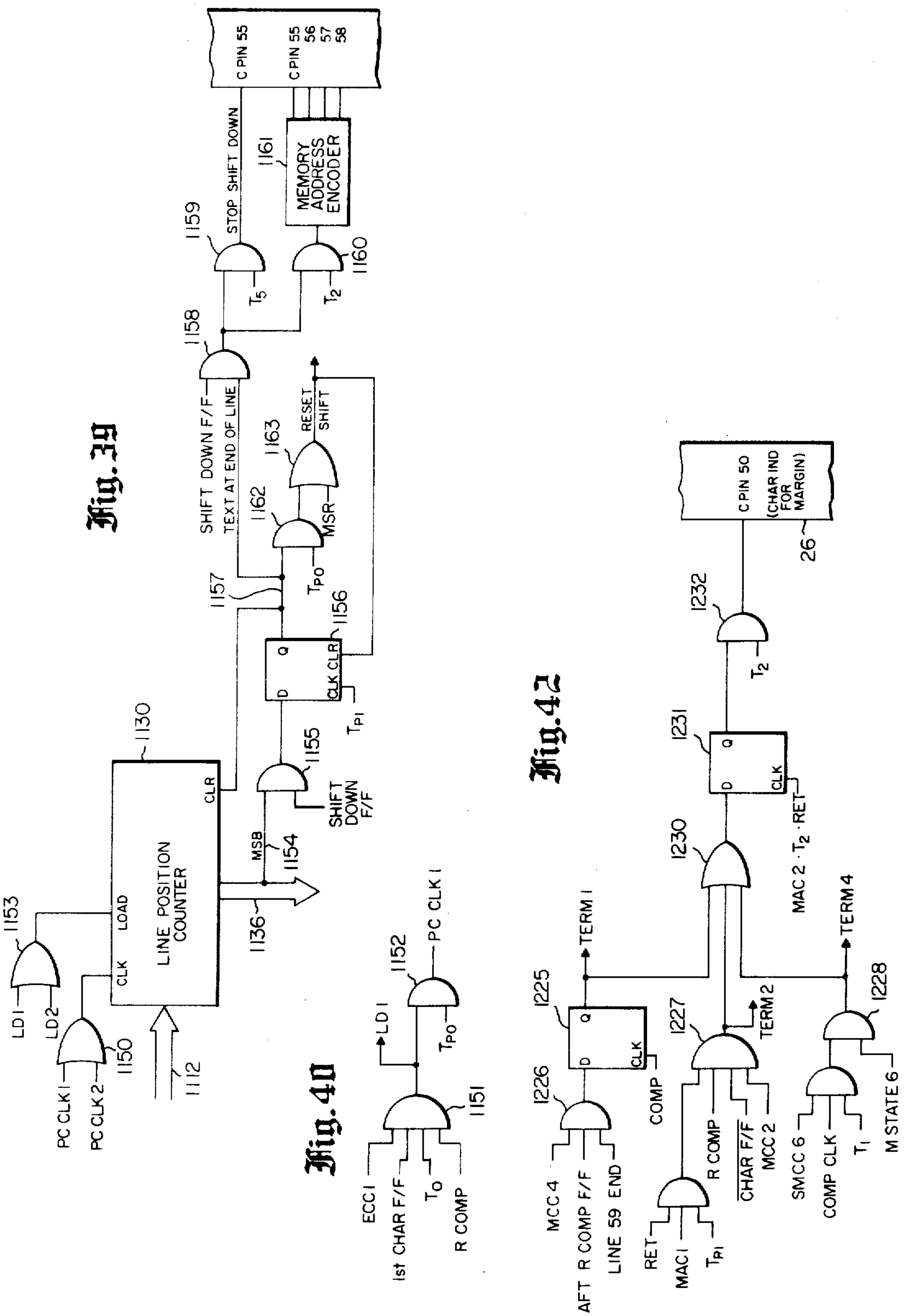
FIGS. 41–46 show a detailed block diagram of the Merge portion of the Edit/Merge Sub-system.

Referring now to FIG. 39 further details pertaining to the line position counter 1130 are shown. The line position counter 1130 is clocked through OR gate 1150 from either position counter clock signal (PC/CLK2) or a first position counter clock signal derived as shown in FIG. 40. As shown in FIG. 40 with a program count of ECC1 during row compare with the first character flip-flop set during time slot $T_0$ AND gate 1151 provides an output designated "Load 1" (LD1) which is utilized to provide the first clock signal during the window time slot $T_{p0}$ through AND gate 1152. The first and second load signals with the corresponding clock signals are applied during the proper program count to enable loading of line position counter 1130 with the proper count. The load signals are applied through OR gate 1153 to the load input of line position counter 1130. It is to be emphasized that the first load signal and first position counter clock signal occurred during program count ECC1 while the second equivalent signals are generated during program count ECC3 with the latter signals being utilized to replace the count in the line position counter only if an indented line situation exists. The output of line position counter 1130 appearing on cable 1136 is also monitored for the most significant bit which appears on line 1154. When the most significant bit goes high this would indicate the 128 character position to indicate the last storage location in the row compare line of memory. When line 1154 goes high with the shift down flip-flop 1107 (see FIG. 37), AND gate 1155 is enabled to provide an input to latch 1156 which is clocked in during time slot $T_{p1}$ to provide an output at its Q output on line 1157 designated "Text at End of Line". This output then clears the line position counter 1130. As previously discussed in connection with FIG. 37 and in particularly in connection with the output of shift down flip-flop 1107, the output appearing on line 1157 is ANDed with the shift down flip-flop applied to C PIN 55 during time slot $T_5$ through series AND gates (FIG. 39) 1158 and 1159 to provide a Stop Shift Down signal after the memory has been addressed with the output of line 1158 through AND gate 1160 during time slot $T_2$ to memory address encoder 1161.

The Text At End Of Line signal appearing on line 1157 is also applied through AND gate 1162 during time slot $T_{p0}$ through OR gate 1163 to provide a Reset Shift signal which clears latch 1156. The Reset Shift signal also resets latch 1107 (FIG. 37).

Referring again to FIG. 38, as previously discussed the contents of line position counter 1130 correspond to the contents of special character counter 1143 inasmuch as the same clock signals are utilized depending upon conditions to store the proper count. Although the line position counter 1130 is cleared when the text is at the end of the line, the special character counter status 1143 is counted down with the output being applied through cable 1170 to a count decoder 1171 which has a signal line output 1172 which goes high when the down count is equal to 0 (DC=0). Referring to the dotted line rectangle 1173 of FIG. 38, during MAC 1 and time slot $T_{p0}$ a clock signal is applied to latch 1174 to permit the input from the shift down flip-flop to set latch 1174 to provide an output signal designated "Down Count Flip-Flop" (DWN CNT). This down count flip-flop signal is applied to the up/down input of character counter 1143 through AND gate 1175 during each $T_{p1}$ of display time if the down count is not equal to zero. At such time as the contents of the special character counter 1143 go to zero the output of count decoder 1171 goes high to thereby stop the down count. The output on line 1172 is also applied to the first input of AND gate 1176. The output is also applied through a down count delay flip-flop 1177 where it is clocked in during time slot $T_{p3}$ to provide an output which is coupled to a second input of AND gate 1176. AND gate 1176 then has an output provided the down count flip-flop 1174 is set and it is "not retrace", the output being applied through AND gate 1178 during time slot $T_2$ to C PIN 50 of the Special Control and Indicator Bus 26 to provide a character indicator for margin restoration purposes (see FIG. 34 and the discussion thereof for utilization of this signal).

The sequential and functional operation of the circuitry shown in FIGS. 37 through 40 will now be described with respect to the operations occurring for giving program counts.

ECC1: Latch in the MAC count of the before row compare line into storage means 1111.

Latch in the MAC count of the row compare line into line position counter 1130.

Determine if the previous line is blank to thereby set latch 1086.

Compare the before line with the row compare line in comparator 1137.

ECC2: Compare the before and after starting positions in comparator 1114 to set latch 1118 if applicable.

Set next line blank flip-flop 1087 if applicable.

ECC3: Transfer the before row compare first character position storage means 1111 into line position counter 1130 and special character counter 1143 if the position count is greater than the before row compare count and if the before count is equal to the after count.

Perform a Edit Row Add function through AND gate 1096 to open a line in memory for the shift down operation.

ECC4: Initiate shift down through AND gate 1103 through AND gate 1105.

ECC5–9: Shift down control is in progress.

ECC11: If both the previous line blank flip-flop 1086 and the next line blank flip-flop 1087 are set, do a row add (this operation is necessary inasmuch as when both flip-flops are set, this would indicate double spacing and the edit operation takes place with the part shifted down to the next succeeding line in memory and therefore the row add would provide the double space between the part of the line retained and the part of the line shifted down).

ECC15: Reset edit (this clears the edit flip-flop 1051 as well as the previous line blank flip-flop 1086 and the next line blank flip-flop 1087); the edit program counter resets itself.

MERGE SUB-SYSTEM

Referring now to FIGS. 41 through 46, the details pertaining to the Merge Sub-system will be discussed. The Merge Sub-system initiates the Shift Up operations for reconfiguring the memory as previously described, but briefly when the Merge operation is initiated in a given line, the contents of the next succeeding line containing text are shifted up one word at a time until the text in the position line (the line in which the cursor is located) is in the vicinity of the right hand margin limit. In the meantime, the transfer line (the line from which text is transferred) is shifting to the left as each word is transferred. In general, the transfer line is the next succeeding line in memory; consequently, if the next succeeding line in memory after the position line does not contain text, will delete operations performed until the line in memory immediately below the position line contains text therein. Then the Shift Up operation commences. The Merge Sub-system then keeps track of the number of lines deleted so that upon completion of the Merge operation, the number of empty lines can be restored. However, it should be noted that this restoration does not take place if the textual contents of the transfer line are transferred in their entirety to the position line. Also, as previously discussed, it should be remembered that as the contents of the transfer line are transferred one word at a time to the position line, the balance of the transfer line maintains its left margin position.

Figure 41:
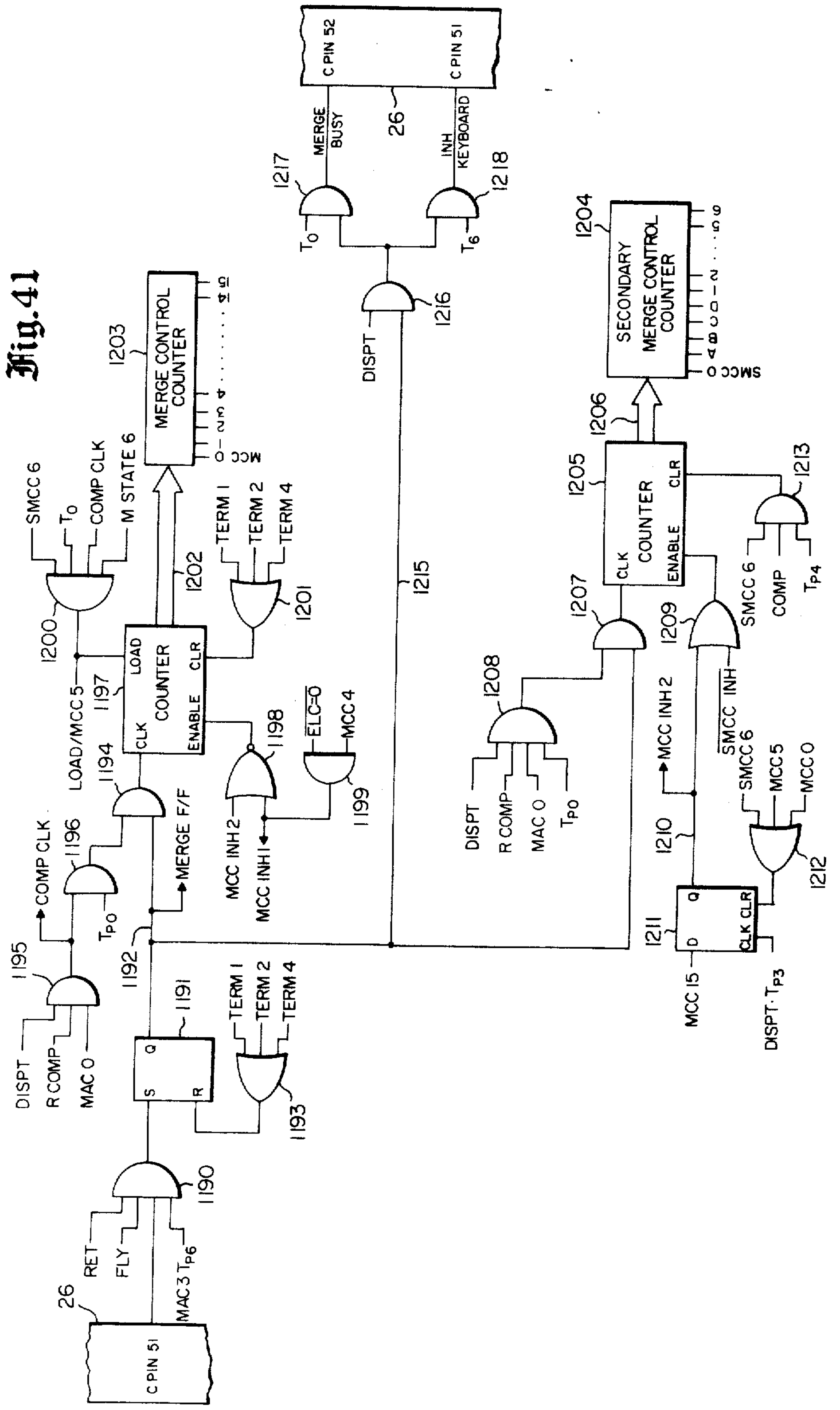

Referring now to FIG. 41 when the Merge Key 60*p* (FIG. 2) is depressed, a signal is transmitted from the keyboard to C PIN 51 (see FIG. 13) to be transmitted over the special control and indicator bus 26 during retrace and flyback of MAC 3 and time slot $T_{p6}$ (see Table of FIG. 9*c*). This signal is received by the Merge Sub-system to provide an output to AND gate 1190 with such latch 1191 to provide a Merge Flip-Flop signal at its output on line 1192. This flip-flop 1191 remains set until a "terminate" signal is received through OR gate 1193, these signals being designated TRM 1, TRM 2 and TRM 4. With the occurrence of any of these signals the Merge operation is terminated. The output on line 1192 provides a first input to AND gate 1194 which has the other output thereof coupled to series AND gates 1195 and 1196. AND gate 1195 has its output high during MAC 0 of Row Compare during display time, the output being designated COMP CLK, this latter output being transmitted through AND gate 1196 during time slot $T_{p0}$ to enable AND gate 1194 to provide a clock input to a counter 1197. The counter 1197 is basically a 4 bit counter with clock pulses providing the count so long as the enable input is high. The enable input remains high provided NOR gate 1198 has no inhibit signals at the inputs thereof, these signals being designated MCC INH 1 and MCC INH 2. The inhibit signal MCC INH 1 goes high through AND gate 1199 during program count MCC 4 provided the empty line counter does not equal 0 (ELC ≠ 0). The counter 1197 also has an auxiliary set of inputs which enable the loading of a pre-set count desired. The "load" input is enabled to pre-set the counter to an MCC 5 condition through AND gate 1200 during time slot $T_0$ with a COMP CLK signal (from AND gate 1195) during program count SMCC 6 with an M STATE 6 condition occurring. The counter 1197 is cleared through OR gate 1201 with any of the previously mentioned terminate signals. The 4 bit output of counter 1197 is transmitted through cable 1202 to a merge control program counter 1203 which provides 16 enabling pulses designated MCC MCC 0, MCC 1, MCC 2 through MCC 15. Each of these program counts provides an enabling pulse which begins at MAC 0 and $T_{p0}$ of row compare during display time (the row compare line corresponding to the position line) and last, until the next MAC 0 and $T_{p0}$ of the row compare line during display time. Consequently, the merge program counting is referenced with respect to the row compare line. To provide additional program counts, a secondary merge control program counter 1204 is provided with the outputs thereof being designated SMCC 0, SMCC A, SMCC B, SMCC C, SMCC D, SMCC 1 through SMCC 6. The secondary merge control counter 1204 is enabled from a counter 1205 with the output thereof being transferred over cable 1206. The counter 1205 is the same as counter 1197 with clock pulses providing the count through AND gates 1207 and 1208 which is essentially the same clock pulses as received by counter 1197. However, counter 1205 is enabled through OR gate 1209 if there is no secondary merge control counter inhibit input or, if the second inhibit input (MCC INH 2) goes high (which would disable counter 1197 thereby enabling counter 1205). As can be seen, counter 1205 commences counting after counter 1197 ceases counting. The signal designated MCC INH 2 on line 1210 is transmitted from the output of latch 1211 which is set at program count MCC 15 during time slot $T_{p3}$ of display time. Latch 1211 is cleared through OR gate 1212 with the occurrence of any of the program counts MCC 0, MCC 5 and SMCC 6. Counter 1205 is cleared during the last program count SMCC 6 through AND gate 1213 during time slot $T_{p4}$ of compare.

With the setting of the merge flip-flop 1191, the output appearing on line 1192 is transmitted over line 1215 to a first input of AND gate 1216 which is enabled during display time to provide a first input to AND gate 1217 which during time slot $T_0$ has the output thereof applied to C PIN 52 of special control and indicator bus 26 to indicate Merge Busy. The output of AND gate 1216 is likewise applied to a first input of AND gate 1218 which is enabled during time slot $T_6$ to provide an output to C PIN 51 to inhibit the keyboard.

The origination of the three terminate signals previously discussed are illustrated in FIG. 42 wherein the first terminate signal (TERM 1) is provided from the output of latch 1225 which is set through AND gate 1226 during program count MCC 4 if the after row compare flip-flop is set and a line 59 end signal is received, the output of AND gate 1226 being clocked into latch 1225 with a compare pulse. This first terminate signal effectively signifies that there is no more text on the page to merge.

The second terminate signal (TERM 2) originates from the output of AND gate 1227 which is enabled during program count MCC 2 during MAC 1 and time slot $T_{p1}$ of retrace with concurrence of a row compare signal and a no character flip-flop signal present. The absence of the character flip-flop signal in the row compare line would indicate that the merge command had been issued in any empty line.

The third terminate signal (TERM 4) is received from the output of AND gate 1228 during program count SMCC 6 during time slot $T_1$ with a compare clock if the text is not in M STATE 6. The various signals which will hereinafter be designated M STATE 1, etc. indicate the condition of the text in the position line as well as the transfer line. These states are defined herein as follows:

M STATE 1 — Text in the position line is in the justify zone and the transfer line was deleted.

M STATE 2 — Text in position line extends beyond right hand margin zone (or justify zone) and transfer line was deleted.

M STATE 3 — Text in the position line is in the justify zone and the transfer line was not deleted.

M STATE 4 — Text in position line extends beyond right hand margin limit and the transfer line was not deleted.

M STATE 6 — Text on position line is not yet in right hand margin limit zone and transfer line was not deleted.

Briefly, with M STATES 1 or 3, the merge operation for the row compare line is completed and the row cursor is automatically incremented to the next line so that the merge operation could be performed on that line by the operator if desired. With the occurrence of M STATES 2 or 4 (the position line being too long), the cursor remains in the position line and a portion of the last word of text to the right of the right hand margin limit begins blinking to indicate to the operator that operator action is necessary. This usually requires that the operator move the position cursor to a location where a hyphenation is grammatically correct, she then depresses the Edit key to drop the balance of the word to the next line and inserts a hyphen. When the M STATE 6 condition exists, this signifies that the position line is capable of receiving additional words from the transfer line and further that the transfer line still contains text. If this condition exists, it should be noted that the TERM 4 signal does not occur and at the last program count of the secondary merge control counter 1204 AND gate 1200 is enabled to pre-load into counter 1197 a count equivalent to program count MCC 5.

Briefly, what happens is as follows. Each program count from the merge control program counter 1203 and the secondary merge control program counter 1204 is equivalent to one complete scanning of the contents of the display memory from a row compare pulse to the next row compare pulse. The program counts MCC 0–MCC 4 provide enabling pulses for certain preparatory events. From program count MCC 5 to the last program count SMCC 6 the necessary textual operations are performed to thereby configure the memory as previously described in connection with FIGS. 35*a*–35*e* to shift up one word of text. The "word" of text that is shifted up may not be necessarily a complete word since the word end as sensed by the logic is an active blank indicator, a NUL blank indicator or a buried continue word code. This latter code would indicate a word that was previously hyphenated which during a previous edit or merge operation had the visible hyphen removed and a buried continue word code signal inserted in its place. After the word is shifted up into the position line a carriage return code is inserted automatically in the memory storage location immediately following the last character in the word.

If after the merging of one word M STATE 6 still exists, the program counters 1203 and 1204 are successively again incremented commencing with program count MCC 5 to merge one more word and thereby reconfigure the memory through a shift up operation as previously discussed. This action will repeat itself until one of the four other M STATES exists.

Referring again to FIG. 42 it can be seen that any one of the Terminate signals is transferred through OR gate 1230 to the set input of latch 1231 where it is clocked in during MAC 2 and time slot $T_2$ of retrace. The output of latch 1231 is subsequently transferred through AND gate 1232 during time slot $T_2$ to be supplied to C PIN 50 of special control and indicator bus 26 to provide a character indicator for margin restoration purposes to be utilized by the circuitry of FIG. 34. As previously discussed, this restores the margin of the transfer line.

Figures 43, 44:
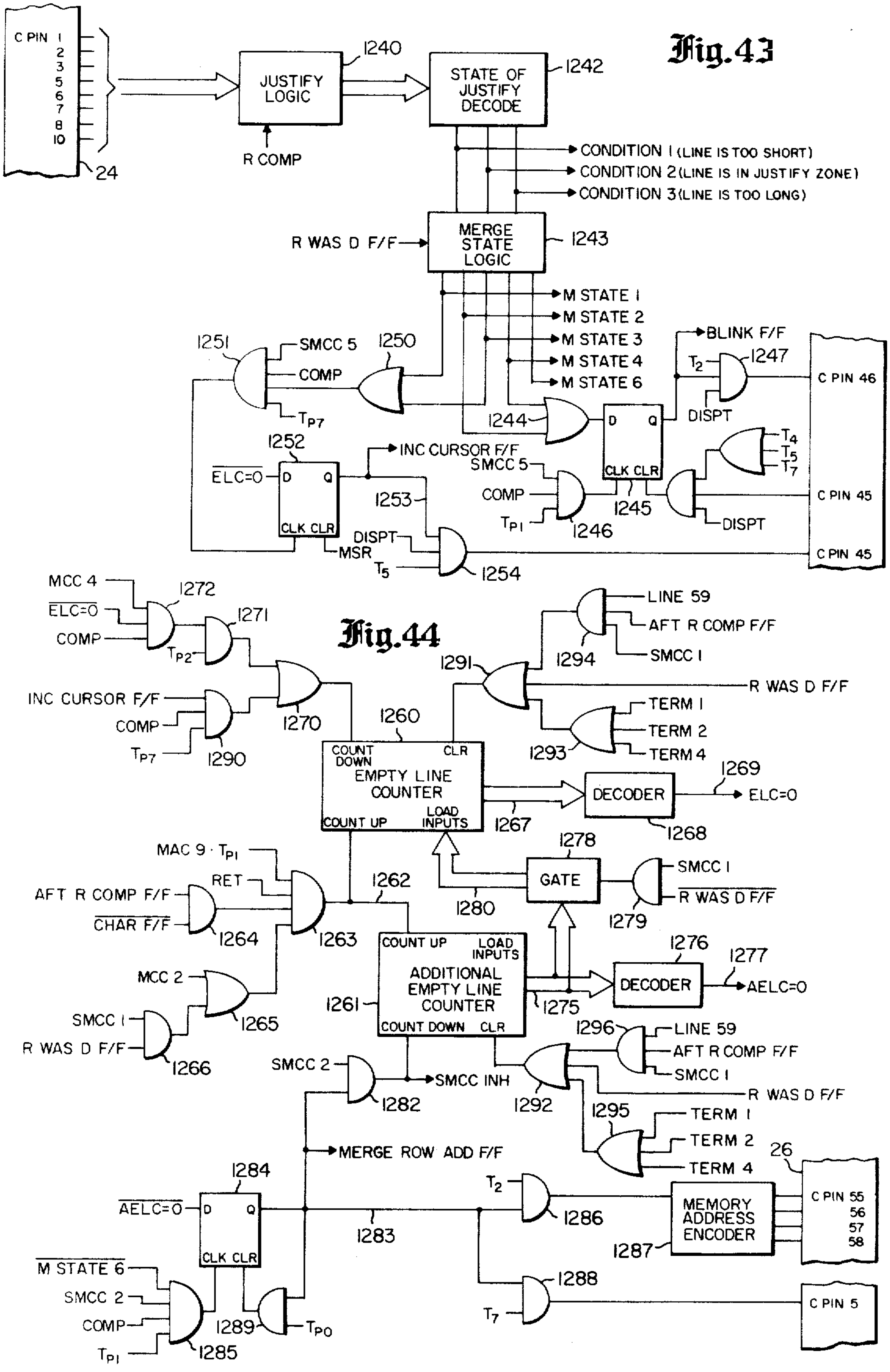

Referring now to FIG. 43 the drivation of the various M STATES signals will be discussed. A justify logic sub-system 1240 receives MAC count data from the data bus 24 to provide indications of storage location position within the row compare line (the position line). Also transferred over the data bus 24 to the justify logic 1240 is the right hand margin information which is transferred during MAC 1 and time slot $T_1$ of retrace and flyback (see FIG. 6). The justify logic 1240 senses the MAC count of the carriage return code and if this count is within a zone of several units of either side of the right hand margin set limit, the information is appropriately decoded by decoder 1242 to provide one of three outputs designated condition 1 (indicating that the text in the position line is short of the established zone), condition 2 (the end of the text in the position line is within the zone) or condition 3 (the end of the text in the position line extends beyond the zone). It should be noted that the justify logic 1240 is only looking at the condition of the text within the position line. These three condition signals are transmitted to the merge state logic 1243 which receives one additional bit of information relating to the next line of text, and that is, whether or not the "row was deleted", which bit of information is derived from a flip-flop, the output of which is designated "R WAS D F/F". The output of the merge state logic 1243 is one of five M STATES signals designated 1 through 4 and 6, which have been previously discussed. If M STATES 2 or 4 exist, this information is transmitted through OR gate 1244 to the input of latch 1245 where it is clocked in with a clock pulse from AND gate 1246 during program count SMCC 5 with the occurrence of a compare signal during time slot $T_{p1}$. Either of these states indicate that the text on the line is beyond the zone to thereby set the "blink flip-flop" 1245. This output is transferred through AND gate 1247 during time slot $T_2$ of display time to be applied to C PIN 46 to command the display to bring that portion of the word extending beyond the zone. The blink flip-flop 1245 is cleared when a signal is received over C PIN 45 during display time and time slot $T_4$, $T_5$ or $T_7$. C PIN 45 is activated during any of these time slots when the position cursor is moved out of the position line (see time slot allocation for C PIN 45 and FIG. 9*a*).

If either of M STATES 1 or 3 exists (indicating that the position line is in the justify zone) this information is transmitted through OR gate 1250 to a first input of AND gate 1251 which is enabled during program count SMCC 5 during time slot $T_{p7}$ of a compare pulse. The output of AND gate 1251 provides a clock pulse to latch 1252 which has an input designated "empty line counter is not equal to 0" (ELC ≠ 0). The output of latch 1252 is designated "increment cursor flip-flop" appearing on line 1253, this signal being transferred to C PIN 45 during time slot $T_5$ of the display time through AND gate 1254. This effectively increments the row cursor to the next line.

Referring now to FIG. 44 details pertaining to the "tracking" of empty lines between the position line and the next line in memory containing text will be discussed. The tracking is accomplished by means of an "empty line counter" 1260 and an "additional empty line counter" 1261. The initial condition that exists is that the position or merge line (the row compare line) has intervening empty lines in memory between it and the next line in memory containing textual information. A number of row delete operations will be performed corresponding to the number of intervening empty lines until the next line in memory containing text is located in a next succeeding line in memory after the row compare line. The number of empty lines are simultaneously counted by counters 1260 and 1261 which have pulses applied to the count up inputs to thereby increment the counter simultaneously. The count up inputs are tied together at line 1262 which is the output of AND gate 1263 a first pair of inputs to AND gate 1263 go high at MAC 9 of retrace during time slot $T_{p1}$, while a third input receives its output from AND gate 1264 with the occurrence of the after row compare flip-flop signal and the absence of the character flip-flop signal. The fourth input of AND gate goes high when an output is provided from OR gate 1265 with the occurrence of program count MCC 2 or when AND gate 1266 has an output during program count SMCC 1 with the setting of the row was deleted flip-flop. Initially, at the program count of MCC 2, the empty line counter 1260 and the additional empty line counter 1261 both count up to store the number of empty lines which is evidenced by the absence of a character in each line of text after the setting of the after row compare flip-flop. This is detected at MAC 9 during time slot $T_{p1}$ of retrace and as soon as the character flip-flop goes high the count is stopped indicating a line containing text. The output of empty line counter 1260 is transmitted over cables 1267 to a decoder 1268, the output of which on line 1269 goes high when the count is equal to 0 (ELC=0).

With the empty line counter 1260 now containing the count equal to the number of empty lines at program count MCC 4 row delete operations are being performed and the counter 1260 is decremented once for each row delete operation until the empty line counter equals 0 which is detected by decoder 1268 with the output appearing on line 1269. The count down input of counter 1260 is enabled through OR gate 1270 from series AND gates 1271 and 1272 during program count MCC 4 if the empty line counter is not equal to 0 during time slot $T_{p2}$ of a compare pulse. The counter 1260 is also counted down with each setting of the increment cursor flip-flop during time slot $T_{p7}$ of a compare pulse. In either event the stored count of the additional empty line counter 1261 remains untouched. The output of this counter 1261 is transmitted over cable 1275 to a decoder 1276 which has an output line designated 1277 which goes high when the additional empty line count equals 0. The output appearing on cable 1275 is also transmitted to a gate 1278 which is enabled from AND gate 1279 during program count SMCC 1 if the row was deleted flip-flop is not set. Empty line counter 1260 is provided with an auxiliary set of load inputs which enables the insertion of a pre-set count of command. The output of gate 1278 is transferred over cables 1280 to this set of inputs. As a result, the contents of the additional empty line counter 1261 are transferred to the empty line counter during program count SMCC 1.

During the next program count SMCC 2 the additional empty line counter 1261 is counted down through AND gate 1282 with concurrence of a merge row add flip-flop signal. This signal appears on line 1283 which is the output of a latch 1284 which has the input thereof high as long as the additional empty line count is not equal to 0. This high input is clocked in during program count SMCC 2 through AND gate 1285 during time slot $T_{p1}$ of the compare pulse provided the text is not in M STATE 6. When the output on line 1283 goes high this signal is transmitted through AND gate 1286 to enable the gate during time slot $T_2$ to thereby enable memory address encoder 1287 to transmit the address code over special control and indicator bus 26 over C PINS 55–58. During the next time slot $T_7$ the output of latch 1284 is transmitted through AND gate 1288 to be applied to C PIN 5 to issue a row add command. During the next time slot $T_{p0}$ latch 1284 is cleared through AND gate 1289.

When the additional empty line counter 1261 goes to 0, the output of decoder 1276 appearing on line 1277 goes high thereby disabling the input to latch 1284 to terminate the row add operations. At this point in time, the number of empty lines between lines of text on the display screen has been restored and this count is still contained within the empty line counter 1260. The cursor is then incremented to the next line of text after the merge operation is completed on the position line by indicating M STATES 1 or 3 (position line is in the justify zone). The number of rows which the row cursor must be incremented is equal to the number now stored in the empty line counter 1260. During program count SMCC 5 (see FIG. 43) AND gate 1251 is enabled to set latch 1252 to increment the cursor, this latch remaining set until the input goes low when the empty line counter is equal to 0. The empty line counter 1260 is counted down through the alternate path through OR gate 1270 by means of AND gate 1290 with each $T_{p7}$ time slot of the compare pulse until the count goes to 0 (FIG. 44) when the increment cursor flip-flop signal is disabled.

Figures 45, 46:
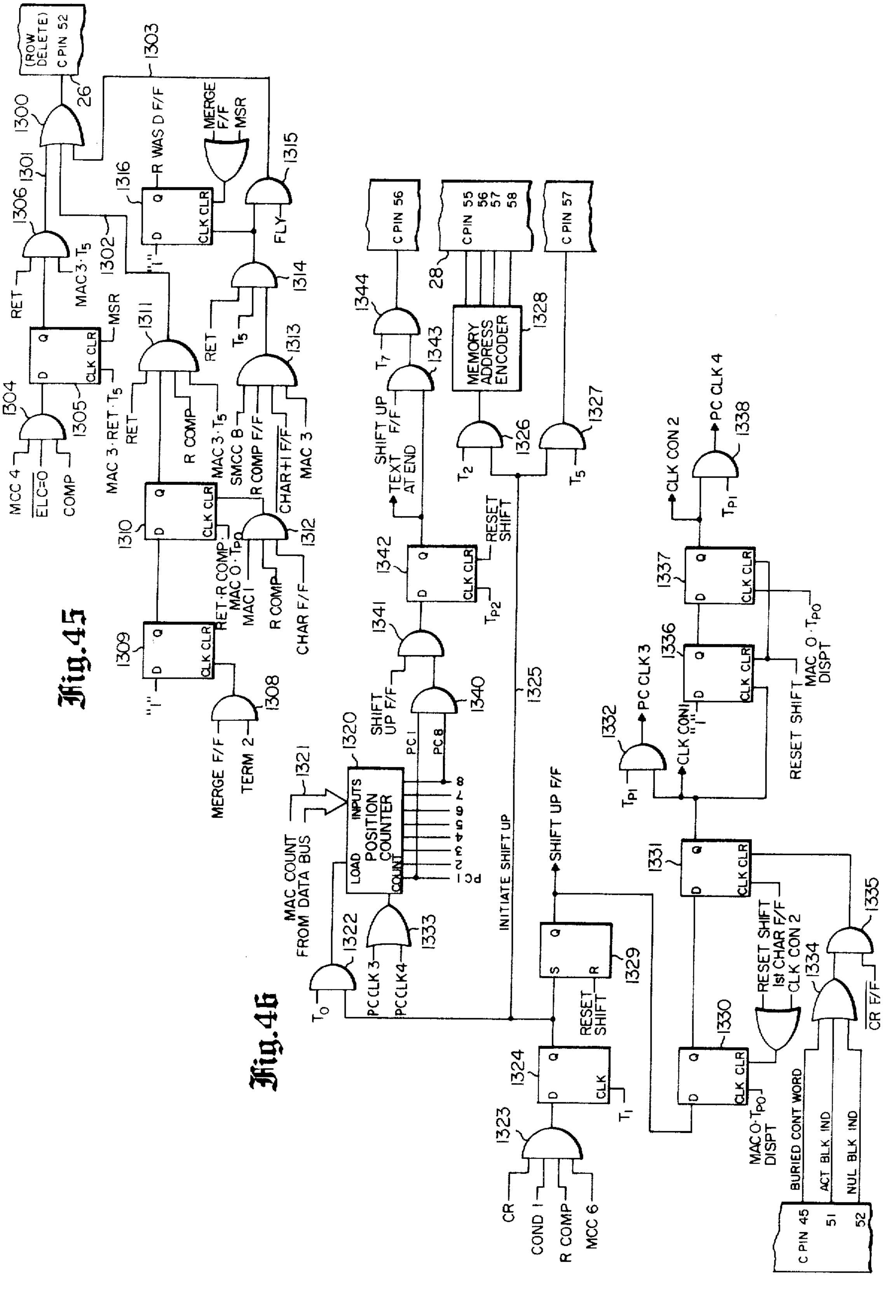

Referring now to FIG. 45 the issuance of the row delete commands by the merge sub-system will be discussed. The row delete commands are issued over C PIN 52 of the special control and indicator bus 26 through OR gate 1300 over one of three inputs designated 1301, 1302 and 1303. The output appearing on line 1301 is the series of row delete commands occurring during program count MCC 4 used to count down the empty line counter 1260 as previously discussed in connection with FIG. 44. During program count MCC 4 as long as the empty line counter is not equal to 0, during a compare pulse AND gate 1304 is enabled to provide an input to latch 1305 which is clocked in during MAC 3 and time slot $T_5$ of retrace. The output of latch 1305 is applied to a first input of AND gate 1306 which provides the output on line 1301 during MAC 3 and time slot $T_5$ of retrace. The row delete command that sequentially configures the memory as discussed in connection with FIGS. **25*a*–25*d*.**

If the merge command is issued with the cursor positioned in an empty line, as previously mentioned a terminate (TERM 2) signal is generated. The occurrence of this terminate signal and the merge flip-flop output is applied to AND gate 1308 which applies a clock pulse to latch 1309 which has its input set to a logical 1 level. This output is then latched into latch 1310 during MAC 0 and time slot $T_{p0}$ of retrace with a row compare pulse. The output of latch 1310 is transferred through AND gate 1311 to be outputted on line 1302 during MAC 3 and time slot $T_5$ of retrace with a row compare signal to issue a row delete command. Rows are deleted until such time as the row compare line or position line contains text. This event is detected by the clearing of latch 1310 by an output from AND gate 1312 which occurs at MAC 1 of the row compare line if the character flip-flop is set.

If the transfer line, or the row that was being shifted up is empty an output appears on line 1303. This output appears during program count SMCC B which is applied to AND gate 1313 which is enabled during MAC 3 if the row compare flip-flop is set and the character +1 flip-flop is not set, the output being transmitted during time slot $T_5$ of retrace through AND gate 1314 and through AND gate 1315 during flyback. The output of AND gate 1314 is also utilized as a clock pulse to latch 1316 which has its input pre-set to a logical 1 level. Latch 1316 is designated the row was deleted flip-flop which also provides the input merge state logic 1243 (FIG. 43) to designate the condition of the line following the row compare line. As a net result, when the transfer line has all the contents thereof transferred to the position line, the row is automatically deleted with all text appearing thereafter maintaining its position on the display screen. Consequently, row add operations are not performed when this situation occurs. Referring again to FIG. 44, when the row was deleted flip-flop signal occurs, this clears counters 1260 and 1261 by means of OR gates 1291 and 1292 respectively. Empty line counter 1260 is also cleared through OR gate 1293 with the occurrence of any terminate program signal. Counter 1260 is also cleared from AND gate output 1294 during program time SMCC 1 with the after row compare flip-flop set on occurrence of a line 59 signal. Additional empty line counter 1261 is cleared at the same time through OR gate 1295 or AND gate 1296 respectively.

As previously discussed in connection with the reconfiguration of the memory during the shift up operation as shown in FIGS. 35*a*–35*e*, due to the starting and stopping of the line buffer, when the text is shifted up one word at a time, certain repositioning control of the line buffer portion of the memory must be effected. This control is accomplished through means of the circuitry depicted in FIG. 46 wherein position counter 1320 receives the MAC count from the data bus over cable 1321. Position counter 1320 in actuality is the same position counter designated 1130 in FIG. 38, but for purposes of discussion is shown here as a separate counter. It should also be understood that certain other input signals to the merge subsystem derive their origins from components previously shown and described in connection with the edit sub-system such as character flip-flop, after row compare flip-flop, etc., and such common elements have not been reproduced.

The position counter 1320 accepts the MAC count from the data bus when the load input goes high when AND gate 1322 is enabled. This gate is enabled as follows: when a carriage return indicator is detected during program count MCC 6 of the row compare line, AND gate 1323 is enabled provided condition 1 exists (that is, the position line is short enough to accept additional words). The output of AND gate 1323 is clocked into latch 1324 during time slot $T_1$ to provide a initiate shift up signal at the output thereof. This signal is applied to a first input to AND gate 1322 during time slot $T_0$ to load a MAC count into position counter 1320 indicative of the character storage location containing the carriage return code. Effectively, this would indicate the present amount of text contained in the position line. The output of latch 1324 is also transmitted over line 1325 to AND gates 1326 and 1327 simultaneously. During time slot $T_2$ AND gate 1326 enables memory address encoder 1328 to apply the memory address code to C PINS 55 through 58 of address bus 28 while during time slot $T_5$ AND gate 1327 is enabled to provide the initiate shift up command to C PIN 57. The output of latch 1324 is also applied to latch 1329 to provide a shift up flip-flop signal which is used to set latch 1330 during MAC O and time slot $T_{p0}$ of display time which is effectively the beginning of the next line of text. The output of latch 1330 is clocked into latch 1331 when the first character flip-flop signal is present indicating the first character in the line of text after the position line. When latch 1331 goes high a series of clock pulses designated PC CLK 3 are transmitted through AND gate 1332 during each time slot $T_{p1}$, this clock pulse being applied through OR gate 1333 to the count input of position counter 1320. The original count is then incremented one time for each clock pulse until latch 1331 is cleared. The latch 1331 is cleared when the end of the first word to be shifted up is detected, this end being detected by the existence of a buried continue word code transmitted over C PIN 45, an active blank indicator transmitted over C PIN 51 or a NUL blank indicator being transmitted over C PIN 52 through OR gate 1334 through AND gate 1335 if the carriage return flip-flop is not set (see latch 1078 in FIG. 37). At such time as latch 1331 is cleared, the position counter 1320 now contains a count indicative of the original line of text plus the one word to be shifted up. This count remains until such time as the count input of position counter 1320 is enabled through the second input of OR gate 1333 designated PC CLK 4. This signal is derived in the following manner. When latch 1331 originally goes high, this provides a clock pulse to latch 1336 which has its input pre-set to a logical 1 signal. The output of latch 1336 is applied to another latch 1337 where it is clocked in during MAC 0 and time slot $T_{p0}$ of display time (the beginning of the next line after the transfer line). The output is then pulsed through AND gate 1338 during each $T_{p1}$ time slot to provide position count clock pulses (PC CLK 4) which are applied to the count input of position counter 1320. When the outputs labeled PC 1 and PC 8 of position counter 1320 go high AND gate 1340 is enabled and applied to the input of AND gate 1341 which has the other input thereof coupled to a shift up flip-flop. The output of AND gate 1341 is applied to latch 1342 when it is clocked in during time slot $T_{p2}$ to provide a text at end output. This is a retiming signal for utilization by the shift up circuitry of FIG. 36 and is transferred through AND gates 1343 and 1344 respectively during time slot $T_7$ to be applied to C PIN 56. This signal is picked up (see FIG. 36) by AND gate 1025 to provide the lower buffer stop LBS signal to stop the lower buffer in proper time sequence with the shift up operation. The signal is basically a retiming signal equivalent in time to the number of MAC counts remaining in the position line from the end of the word shifted up to the last character storage space in that line of memory.

The sequential operation of the merge control subsystem will now be discussed in detail with respect to the program count. It is to be understood in the following discussion that the only program counts that will be listed are those program counts that provide enabling pulses for certain operations. The sequence is as follows:

MCC 0: .Set the merge control flip-flop 1191 (FIG. 41) when the merge key is depressed; inhibit the keyboard.

MCC 2: .Terminate the program by issuance of the TERM 2 signal from AND gate 1227 (FIG. 42) if the merge command is issued in an empty line.

.If no terminate signal, count the number of empty lines between the row compare line and the next line of text by incrementing line counter 1260 and additional empty line counter 1261 (FIG. 44).

.If the terminate (TERM 2) signal is issued indicating the merge command was given in an empty line, issue a row delete command through OR gate 1300 (FIG. 45) to perform row delete operations until the row compare line contains text.

MCC 4: .Terminate the program if there is no more text on the page to merge by setting latch 1225 to provide a TERM 1 signal (FIG. 42).

.If no terminate signal is given and the empty line counter is not equal to 0 enable AND gate 1199 (FIG. 41) to inhibit the counter 1197; set the row delete flip-flop 1305 (FIG. 45) to issue row delete commands through OR gate 1300; count down empty line counter 1260 (FIG. 44) to thereby perform the number of row deletes equal to the count contained in empty line counter 1260 until the empty line count equals 0; when the empty line count equals 0 remove the inhibit signal to enable the counter 1197 (FIG. 41) to again commence counting.

MCC 6: .With concurrence of condition 1 in the position line, row compare and carriage return provide an initiate shift up signal by setting latch 1324 (FIG. 46).

.The shift up operation is then performed during program counts MCC 7–MCC 10.

MCC 15: .Inhibit counter 1197 and start the secondary merge counter 1205 (FIG. 41).

The operations occurring with each secondary merge control count are dependent upon the outputs of the merge state logic 1243 (FIG. 43) which provides the M STATE 1, 2, 3, 4 and 6 signals depending on the condition of the text in the position line as well as the condition of the text in the transfer line. If M STATE 1 exists, this indicates that the text in the position line is in the justify zone and the transfer line was deleted, resulting in the following sequence of operations:

SMCC A: The character +1 flip-flop is set.

SMCC B: A row delete command is issued through OR gate 1300 (FIG. 45) and the row was deleted flip-flop 1316 is set.

SMCC C: The character +1 flip-flop is re-set.

SMCC 1: Count the number of empty lines in empty line counter 1260 by the enabling of AND gate 1266 (FIG. 44), this being the number of lines the cursor will have to increment to the next line of text on the display screen.

SMCC 5: Set the increment cursor flip-flop 1252 (FIG. 43) and issue and increment the cursor command over C PIN 45: count down the empty line counter 1260 by the enabling of AND gate 1290 with the setting of the increment cursor flip-flop.

SMCC 6: If not M STATE 6 issue a terminate TERM 4 signal from AND gate 1228 (FIG. 42) to reset merge flip-flop 1191 (FIG. 41) and clear counter 1197; clear secondary merge counter 1205.

If, on the other hand, M STATE 2 condition exists, this indicates that the text in the position line extends beyond the right hand margin limit zone and the transfer line was deleted.

The program operations for the secondary merge program control count are the same until program count SMCC 5, when the following sequence occurs:

SMCC 5: Set the blink flip-flop 1245 (FIG. 43).

SMCC 6: Issue a terminate program (TERM 4) signal and reset counters 1205 and 1197 (FIG. 41).

If the output of the merge state logic 1243 (FIG. 43) indicates an M STATE 3 condition, this signifies that the text in the position line is within the right hand margin limit zone and the transfer line was not deleted. This results in the following sequence of operations:

SMCC A: Character +1 flip-flop is set.

SMCC B: Row delete is issued through OR gate 1300 from line 1303 (FIG. 35) and the row was deleted flip-flop 1316 is set.

SMCC C: Character +1 flip-flop is reset.

SMCC 1: Load the count from the additional empty line counter 1261 into the empty line counter 1260.

SMCC 2: Set the merge row add flip-flop 1284 (FIG. 44) to perform row adds operations until the additional empty line count equals 0; during this time inhibit counter 1205 (FIG. 41) by disabling OR gate 1209.

SMCC 5: Set the increment cursor flip-flop 1252 (FIG. 43) to increment the cursor to the next line on the display scren containing text at which time the empty line count goes to 0 thereby disabling flip-flop 1252.

SMCC 6: Issue a terminate program signal and reset counters 1205 and 1197 (FIG. 41).

If an M STATE 4 condition exists, this indicates that the text within the position line extends beyond the right hand margin limit zone and the transfer line was not deleted thereby resulting in the following sequence of operations:

SMCC A: Set character +1 flip-flop.

SMCC B: Issue row delete command and set row was deleted flip-flop 1316 (FIG. 45).

SMCC C: Reset character +1 flip-flop.

SMCC 1: Load the additional empty line count into the empty line counter.

SMCC 2: Set the merge row add flip-flop 1284 (FIG. 44) to perform row adds until the additional empty line counter equals 0.

SMCC 5: Set the blink flip-flop 1245 (FIG. 43).

SMCC 6: Issue a terminate program command and clear counters 1197 and 1205 (FIG. 41).

If the merge state logic 1243 issues an M STATE 6 command, this signifies that the text in the position line is short of the right hand margin limit and the transfer line has not been deleted. In this condition during secondary merge program counts SMCC 0 to SMCC 5, no operation takes place, and at SMCC 6 a count is loaded into counter 1197 indicative of program count SMCC 5 to recommence the program count through a merge control counter 1203 and secondary merge control counter 1204. This count will be cycled repeatedly after the last program count SMCC 6 as long as the M STATE 6 condition exists, with one word being transferred from the transfer line to the position line during each cycle until one of the other states exists at which time the merge program will be terminated.

BUFFER MEMORY

In addition to the main memory 876 (FIG. 23*a*), the instant invention also includes a buffer memory which is substantially similar to the main memory. The Buffer Memory, like the main memory is capable of storing up to one page of textual information, that is, 58 displayable lines, with each line having 128 character storage locations. The buffer memory is line organized into 60 lines (the upper and lower of which are non-displayable), and like the main memory as previously discussed, contains an upper line buffer, a lower line buffer and a character buffer. Upon the occurrence of certain coded signals, the buffer memory is enabled to accept information from the main memory a line at a time for further utilization. Subsequently, upon command, the buffer memory can transfer the previously accepted information back to the main memory at a position in text in the main memory, which position is selected under control of the operator.

Figure 47:
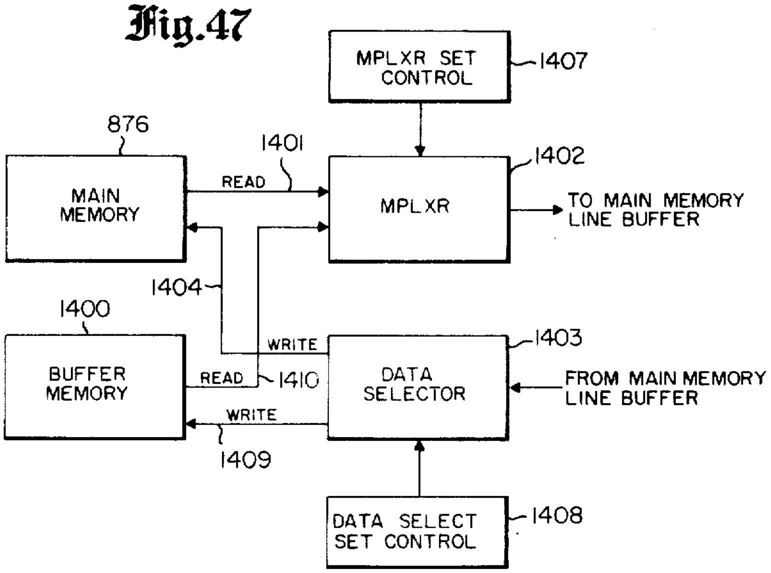
FIG. 47 is a block diagram showing the main memory and buffer memory interrelationship.

Referring now to FIG. 47, there is shown a block diagram of the means for transferring information from the main memory 876 to the buffer memory 1400 and vice versa. The main memory 876 transfers this information out over read line 1401 through a multiplexer 1402 to the main memory line buffer (which corresponds to line 882 of FIG. 23*a*). The information coming in from the main memory line buffer passes through data selector 1403 over the write line 1404 back to the main memory 876. When the multiplexer set control 1407 and the data select set control 1408 are enabled in proper time sequence, information from the main memory line buffer 1403 can be passed into the buffer memory 1400 over write line 1409. Similarly, information can be transferred out of buffer memory 1400 over the read line 1410 through multiplexer 1402 to the main memory line buffer.

Figure 48A:
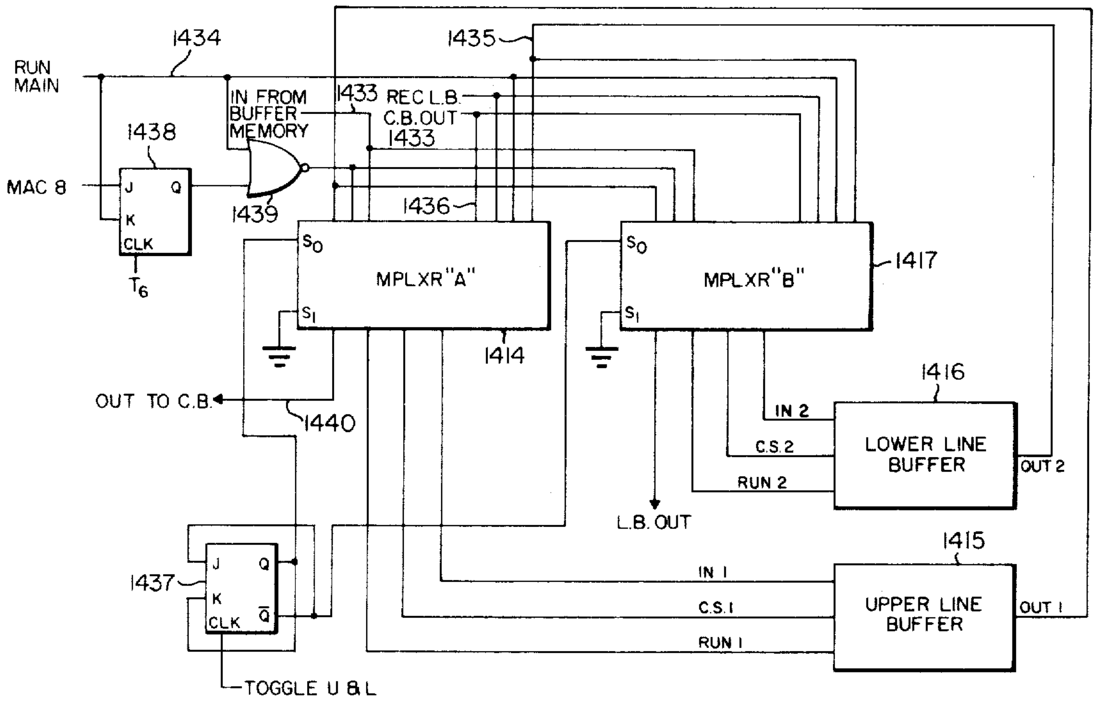
FIGS. 48a and 48b show a detailed block diagram of the line buffer and character buffer of the buffer memory.
Figure 48B:
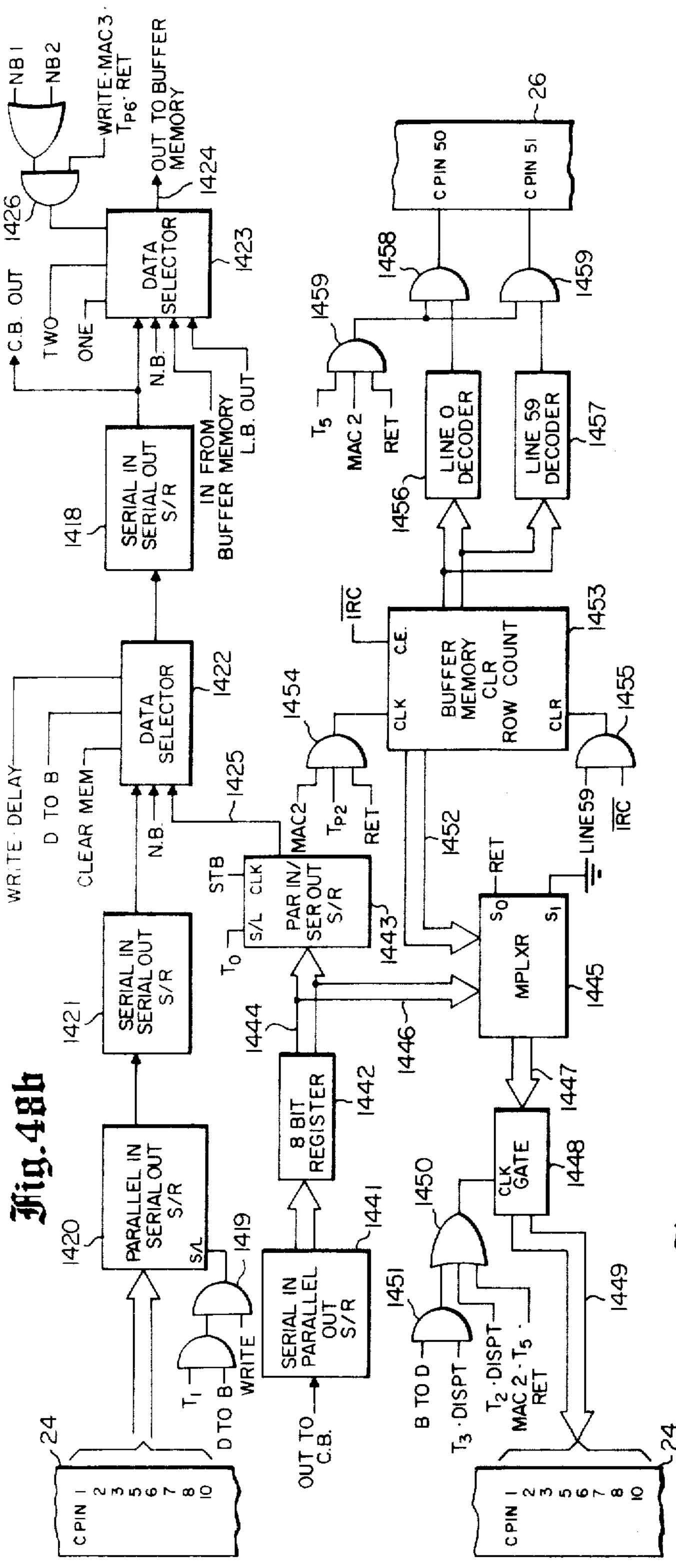

The buffer memory flow is depicted in FIGS. 48*a* and 48*b* (with the buffer memory itself omitted). Like the main memory, the buffer memory includes an upper line buffer 1415, a lower line buffer 1416 and first and second multiplexers 1414 and 1417 respectively, which, upon command, direct the flow of information through the buffer memory line buffers. The buffer memory also contains a character buffer 1418.

Upon command, with a "display to buffer" (D to B) signal, information appearing on data bus 24 is transmitted during time slot $T_1$ with a write signal at AND gate 1419 into parallel in/serial out shift register 1420 through shift register 1421 serially to a first input of a data selector 1422. If the set inputs include the D to B signal as well as the write signal, this information is passed through character buffer 1418 to a first input of second data selector 1423, where if none of the set inputs are enabled tranfers the data out on line 1424 to the buffer memory. The third set of inputs to the data selector 1422 is designated as clear memory which inserts NUL blanks (NB) from the second input of data selector 1422 to all character storage locations in the buffer memory. The third input 1425 to data selector 1422 will be discussed hereinafter.

Figures 49A, 49B, 49C, 49D:
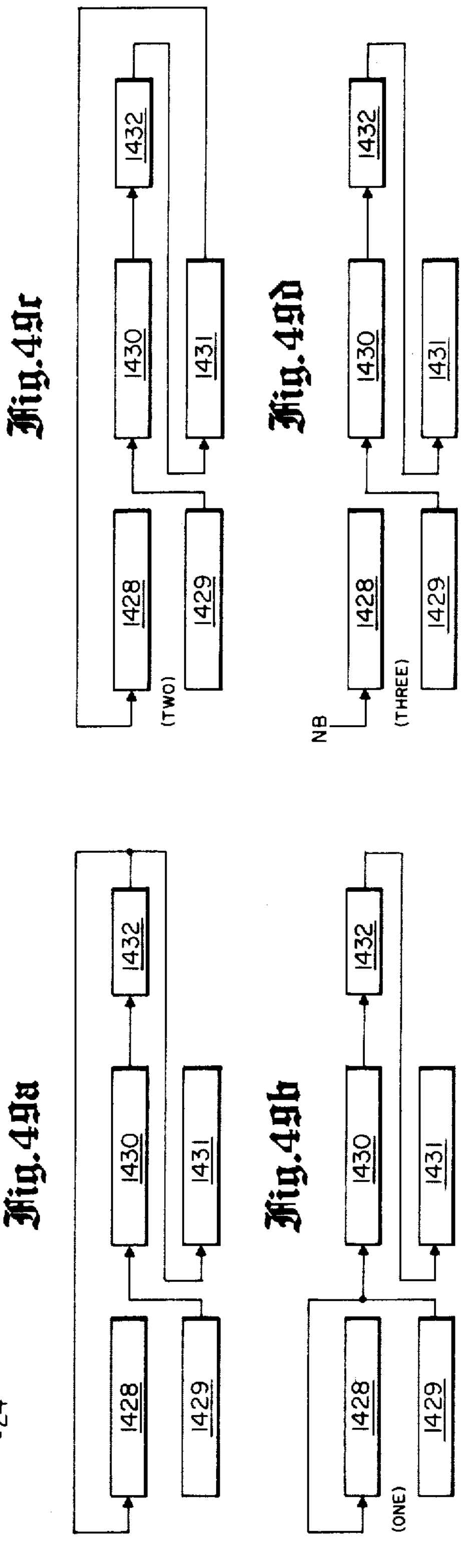
FIGS. 49a–49d show in flow diagram form the states assumable by the buffer memory, line buffers and character buffer.

Data selector 1423 has its set inputs designated 1 RNE, TO and a third input through AND gate 1426 for inserting NUL blanks. This latter input can be designated state THREE. Referring to FIGS. 39*a*–39*d* by selectively and sequentially enabling data selectors 1422 and 1423 respectively as well as multiplexers 1414 and 1417 respectively, the flow of information through the buffer memory can assume one of several states. FIG. 49*a* shows the normal configuration of the buffer memory where information is transferring from line *n*+1 (elongated block 1429) of the buffer memory to the upper line buffer 1430 to the character buffer 1432 where it is simultaneously being transferred to lower line buffer 1431 and line *n* of the buffer memory (elongated block 1428). FIG. 49*b* shows state ONE of the buffer memory which corresponds to state 8 of the main memory as depicted in FIG. 24*g;* FIG. 49*c* shows state TWO of the buffer memory which corresponds to state 4 of the main memory as depicted in FIG. 24*b;* and FIG. 49*d* shows state THREE of the buffer memory which corresponds to state 3 of the main memory as depicted in FIG. 24*e*. With the utilization of these states, the buffer memory can perform hold on line operations as well as row add operations and row delete operations.

Referring again to FIG. 48*a*, information being transferred in from the buffer memory appears on line 1433 where it is simultaneously applied to the inputs of multiplexers 1414 and 1417 along with the run main signal on line 1434. This latter signal is applied to both sets of inputs of both multiplexers 1414 and 1417, with the second set of inputs also receives a recirculate lower buffer signal on line 1435 as well as the input from character buffer 1418 appearing on line 1436. A toggle upper and lower signal can be utilized by clocking into latch 1437 to interchange the total contents of upper line buffer 1415 and lower line buffer 1416. Latch 1438 which has its K input coupled to the run main signal is utilized for timing purposes during MAC 8 and time slot $T_8$ to clock the run main signal through AND gate 1439 to the first set of inputs to the mutliplexers. A detailed discussion of the flow of information through the multiplexers and the line buffers is not deemed necessary due to a substantial similarity to the main memory.

Referring to FIG. 48*b*, information coming out from multiplexer 1414 on line 1440 passes into serial in/parallel out shift register 1441 through an 8 bit register 1442 to a parallel in/serial out shift register 1443 over cable 1444. The information in shift register 1443 appears on line 1425 which provides an input to data selector 1422 for passage therethrough with a write delay signal. Textual information from register 1442 appearing on cable 1444 can also be passed out to multiplexer 1445 over cable 1446 over cable 1447 if gate 1448 is enabled. For passage of textual information through gate 1448 over cable 1449 to data bus 24, OR gate 1450 is enabled at T2 of display time for placing the contents of the buffer memory on the data bus. Alternatively, the textual information can be placed on the data bus at time slot $T_3$ of display time if AND gate 1451 is enabled by a buffer to display (B to D) signal. This latter signal is utilized to transfer information from the buffer memory to the display memory a line at a time upon command at a location picked by the operator. A second set of inputs to multiplexer 1445 is provided over cable 1452 which receives information from the buffer memory row counter 1453. This information is passed out through gate 1448 when the third input to OR gate 1450 is enabled at MAC 2 and time slot $T_5$ of retrace to place the buffer memory row count on the data bus. The buffer memory row count 1453 is incremented by a clock pulse appearing on the enabling of AND gate 1454 at MAC 2 and time slot $T_{p2}$ of retrace if the count enable input does not have a inhibit row count (IRC) signal. The counter is cleared through AND gate 1455 with concurrence of a line 59 signal and a no inhibit row count signal. The count of buffer memory row count 1453 is also monitored by a line 0 decoder 1456 and a line 59 decoder 1457 each of which provides an output with a respective line count. When the line 0 decoder 1456 goes high AND gate 1458 is enabled with the enabling of AND gate 1459 at MAC 2 and time slot $T_5$ of retrace to indicate this event over C PIN 50 of the special control and indicator bus 26. Similarly, when line 59 is reached the decoder 1457 output is transmitted through AND gate 1459 to C PIN 51.

Figure 50:
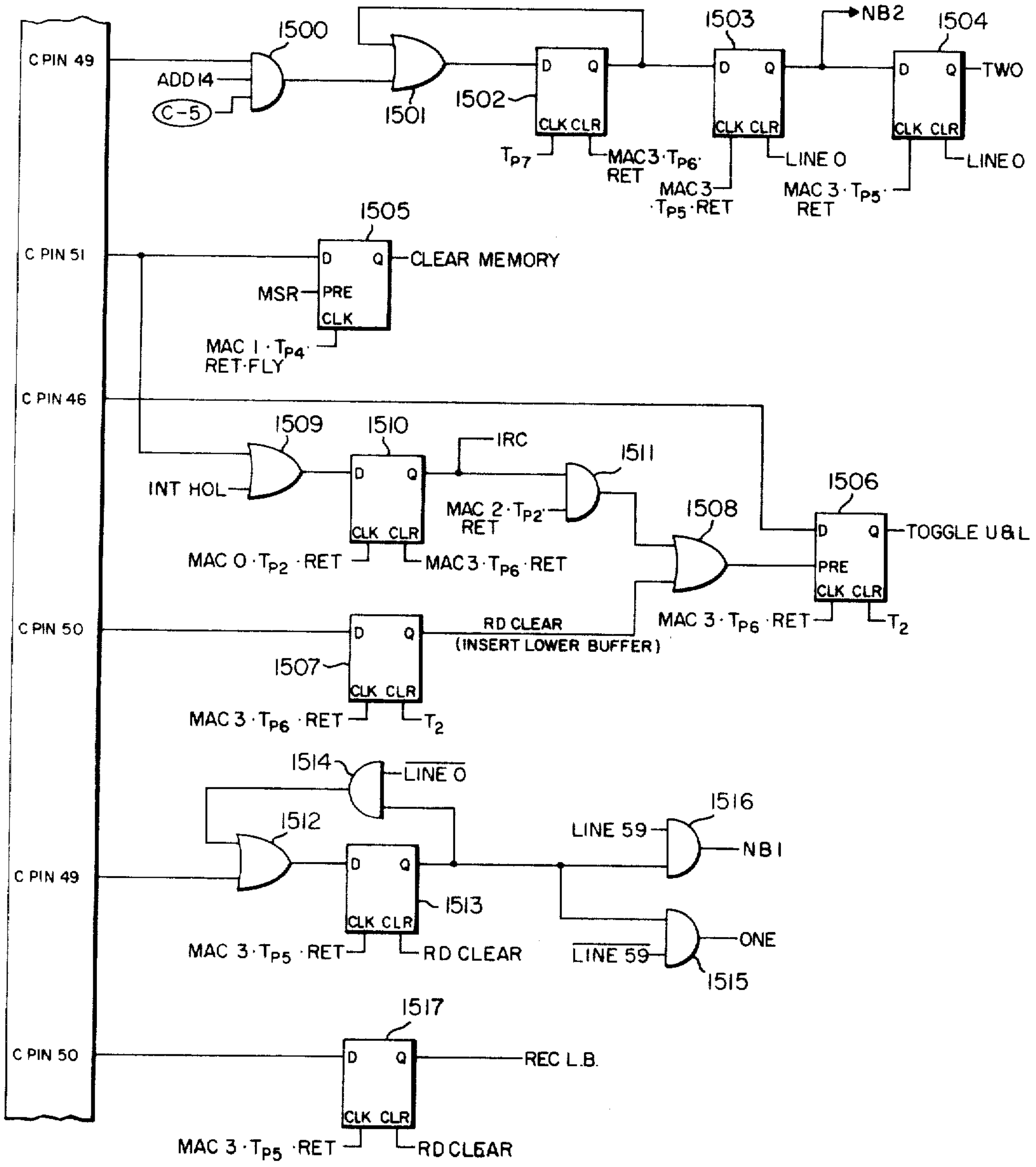
FIGS. 50 and 51 show a detailed block diagram of signals received and transmitted to effect control of the buffer memory, line buffers and character buffer.
Figure 51:
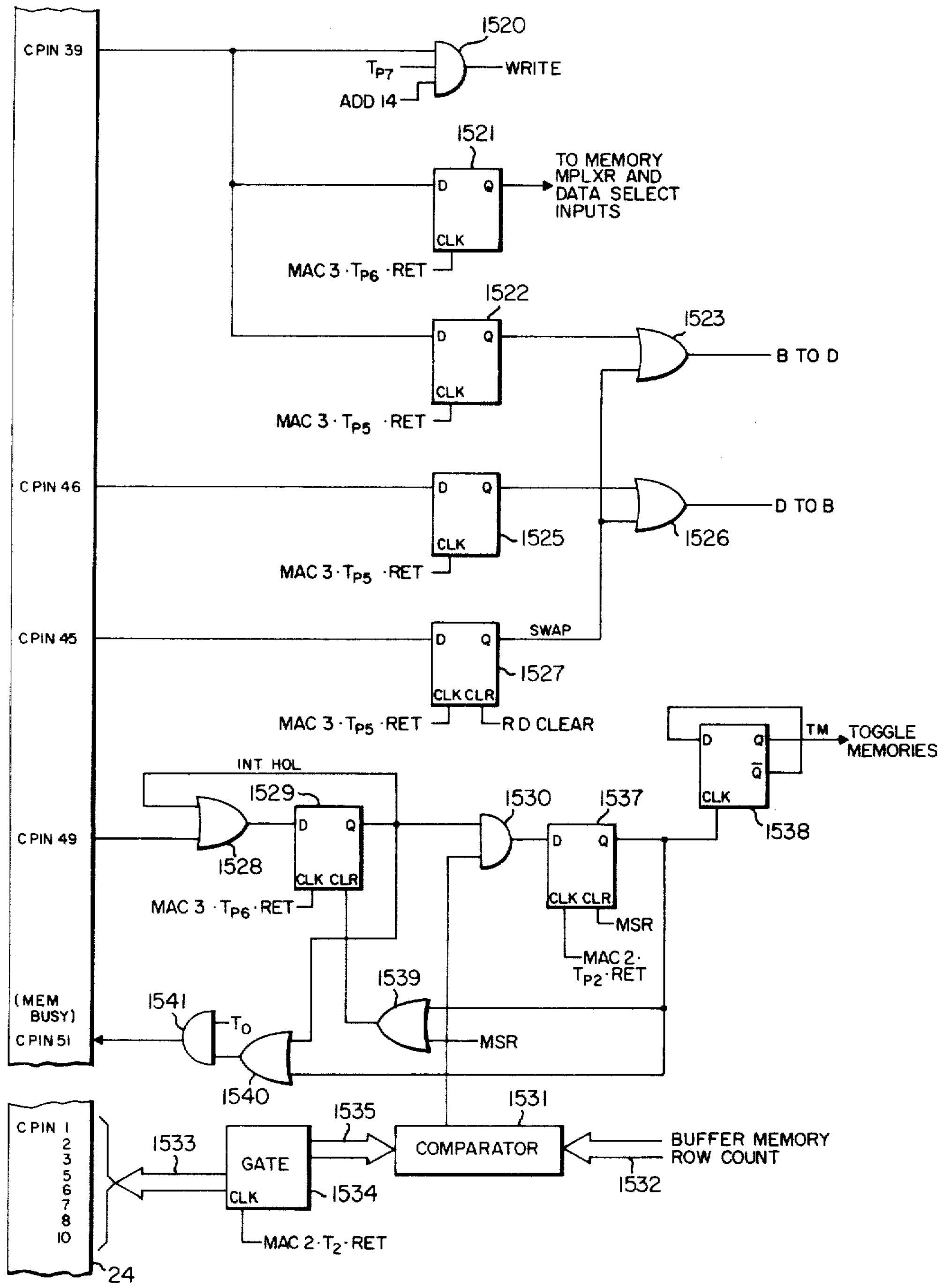

Referring now to FIGS. 50 and 51, details pertaining to the signals utilized by the buffer memory control will now be discussed. Referring to FIG. 50 for a row add operation in the buffer memory a command is issued over C PIN 49 to first input of AND gate 1500 which is enabled if the buffer memory has been addressed by an address (ADD 14) signal and a command issued over C PIN 5 (C-5). The output of AND gate 1500 passes through OR gate 1501 to the input of latch 1502 where it is clocked in during time slot $T_{p7}$ at the next MAC 3 and time slot $T_{p5}$ of retrace the output of latch 1502 is applied to the input of latch 1503 to provide an output designated NB2 (which is applied to AND gate 1426 of data selector 1423 of FIG. 48*b*) to configure the memory as shown in FIG. 49*d*, that is, the state THREE configuration. At the next MAC 3 and time slot $T_{p5}$ of retrace (one line later) the output of latch 1503 is clocked in to latch 1504 to provide a state TWO configuration as shown in FIG. 49*c*. The buffer memory remains in the state TWO configuration until line 0 is detected (the end of the buffer memory) at which time latch 1503 and latch 1504 are clear permitting the buffer memory to return to its normal configuration as shown in FIG. 49*a*.

To clear the buffer memory, the command is issued over C PIN 51 where it is clocked into latch 1505 during MAC 1 at time slot $T_{p4}$ of retrace with flyback to provide a clear memory signal which is applied to data selector 1422 of FIG. 48*b* to permit NUL blanks (NB) to be applied through data selector 1422 until MAC 1 at time slot $T_{p4}$ of the next retrace with flyback thereby inserting NUL blanks into all character storage locations in the buffer memory.

A command to toggle the upper and lower line buffers which is applied to flip-flop 1437 (FIG. 48*a*) can be accomplished in three ways as shown in FIG. 50. A signal can be transmitted over C PIN 46 to the input of latch 1506 during MAC 3 and time slot $T_{p6}$ of retrace to provide the toggle signal. Alternatively, a command could be issued over C PIN 50 during MAC 3 and time slot $T_{p6}$ of retrace where it is clocked into latch 1507 to be applied to OR gate 1508 to the preset input of latch 1506 which drives the Q output of latch 1506 high. A third alternative exists over C PIN 51 to OR gate 1509 where during MAC 0 and time slot $T_{p2}$ of retrace latch 1510 is set to provide an ihibit row count (IRC) signal. The setting of latch 1510 is a command to hold on line the contents of one line of the buffer memory for the duration of one line. This stops the buffer memory row counter 1453 (FIG. 48*b*) from counting for the duration of the one line. The output of latch 1510 subsequently enables AND gate 1511 during MAC 2 and time slot $T_{p2}$ of retrace to provide the output through OR gate 1508 to the preset input of latch 1506 to drive the output thereof high to toggle the upper and lower line buffers 1415 and 1416 respectively (FIG. 48*a*).

If it is desired to perform a row delete operations in the buffer memory, the command is issued over C PIN 49 where it passes through OR gate 1512 to set latch 1513 at MAC 3 and time slot $T_{p5}$ of retrace. The output of latch 1513 is fed back to the input through AND gate 1514 at OR gate 1512 if it is not line 0 of the buffer memory. The output of latch 1513 is transferred to AND gate 1515 if it is not line 59 to provide a state ONE signal. This signal is applied through data selector 1423 (FIG. 48*b*) to configure the memory as shown in FIG. 49*b*. This configuration lasts until line 59 when AND gate 1515 is disabled and the output of latch 1513 enables AND gate 1516 with the occurrence of the line 59 signal to provide a NUL blank (NB1) signal. This latter signal is applied to data selector 1423 to configure the memory in the state THREE configuration shown in FIG. 49*b*. This configuration lasts for one line when AND gate 1516 is disabled thereby terminating the input to data selector 1423.

The command to recirculate the lower buffer is received over C PIN 50 during MAC 3 and time slot $T_{p5}$ of retrace where it is clocked into latch 1517 to provide the recirculate lower buffer signal which is applied to multiplexers 1414 and 1417 (FIG. 48*a*).

Additional commands received by the buffer memory control are illustrated in FIG. 51 wherein a write command is received from C PIN 39 through AND gate 1520 during time slot $T_{p7}$ after the buffer memory has been addressed (ADD 14). Similarly, C PIN 39 during MAC 3 and time slot $T_{p6}$ of retrace receives a command which is latched into latch 1521 to provide the input of memory multiplexer and data select inputs 1407 and 1408 of FIG. 47.

The command to transfer a line of memory from the buffer to the display (B to D) is issued over C PIN 39 to be clocked into latch 1522 during MAC 3 and time slot $T_{p5}$ of retrace, the output being passed through OR gate 1523 to provide the buffer to display signal. To transfer a line of memory from the display to the buffer, a command is issued over C PIN 46 during MAC 3 and time slot $T_{p5}$ of retrace where it is clocked into latch 1525 and passed through OR gate 1526 to provide a display to buffer (D to B) signal. Both OR gates 1523 and 1526 are enabled simultaneously if it is desired to swap a line between the buffer and main memories. This command is issued over C PIN 45 during MAC 3 and time slot $T_{p5}$ of retrace where it is clocked into latch 1527 to provide a SWAP signal which is simultaneously applied to OR gate 1523 and 1526 to transfer a line of text from the buffer memory to the display memory while simultaneously transferring a line of text from the display memory to the buffer memory.

The buffer memory 1400 and main memory 876 can be toggled or completely interchanged by the issuance of a toggle memories command over C PIN 49 which passes through OR gate 1528 where it is latched into latch 1529 at MAC 3 and time slot $T_{p6}$ of retrace. The output of latch 1529 is designated interior hold on line signal. This output is applied to a first input of AND gate 1530 which has a second input thereof coupled to a comparator 1531. The comparator 1531 receives the buffer memory row count over cable 1532 from buffer memory row counter 1453 (FIG. 48*b*). When a command is received over C PIN 49 the buffer memory performs hold on line operations to hold the line count appearing on cable 1532 constant until such time as the buffer memory row count is equal to the main memory row count. The main memory row count is received over the data bus 24 on cable 1533 where it is transferred through gate 1534 each MAC 2 and time slot $T_2$ of retrace (the time when the main memory row count appears on data bus 24). The output of gate 1534 is applied over cable 1535 to comparator 1531. When the buffer memory row count equals the main memory row count, an output appears on line 1536. When line 1536 goes high AND gate 1530 provides an output to latch 1537 which is clocked in during MAC 2 and time slot $T_{p2}$ of retrace to set Q output high. This output is clocked into latch 1538 to provide a toggle memories signal which is simultaneously applied to multiplexer set control 1407 and data select set control 1408 to interchange the positions of main memory 876 and buffer memory 1400 (FIG. 47). The output of latch 1537 is also transferred through OR gate 1539 to clear latch 1529 to discontinue the hold on line operation. The output of latch 1537 is also applied through OR gate 1540 through AND gate 1541 during time slot $T_0$ to apply a signal to C PIN 51 indicating that the memory is busy.

SELECT/INSERT

The utilization of the buffer memory will now be discussed with relation to the select/insert sub-system 38 (FIG. 1). With the present invention, it is possible for the operator having a page of text displayed on the screen to select a portion of that text for insertion in another position within that page of text, or alternatively, to select a portion or all of that page of text for insertion at another location within a document. A document would consist of a number of pages of text recorded on magnetic tape with the position and control of the tape being effected by means of the tape access keys 60*a*, 60*b*, 60*c*, and 60*d* (FIG. 2).

Figure 52:
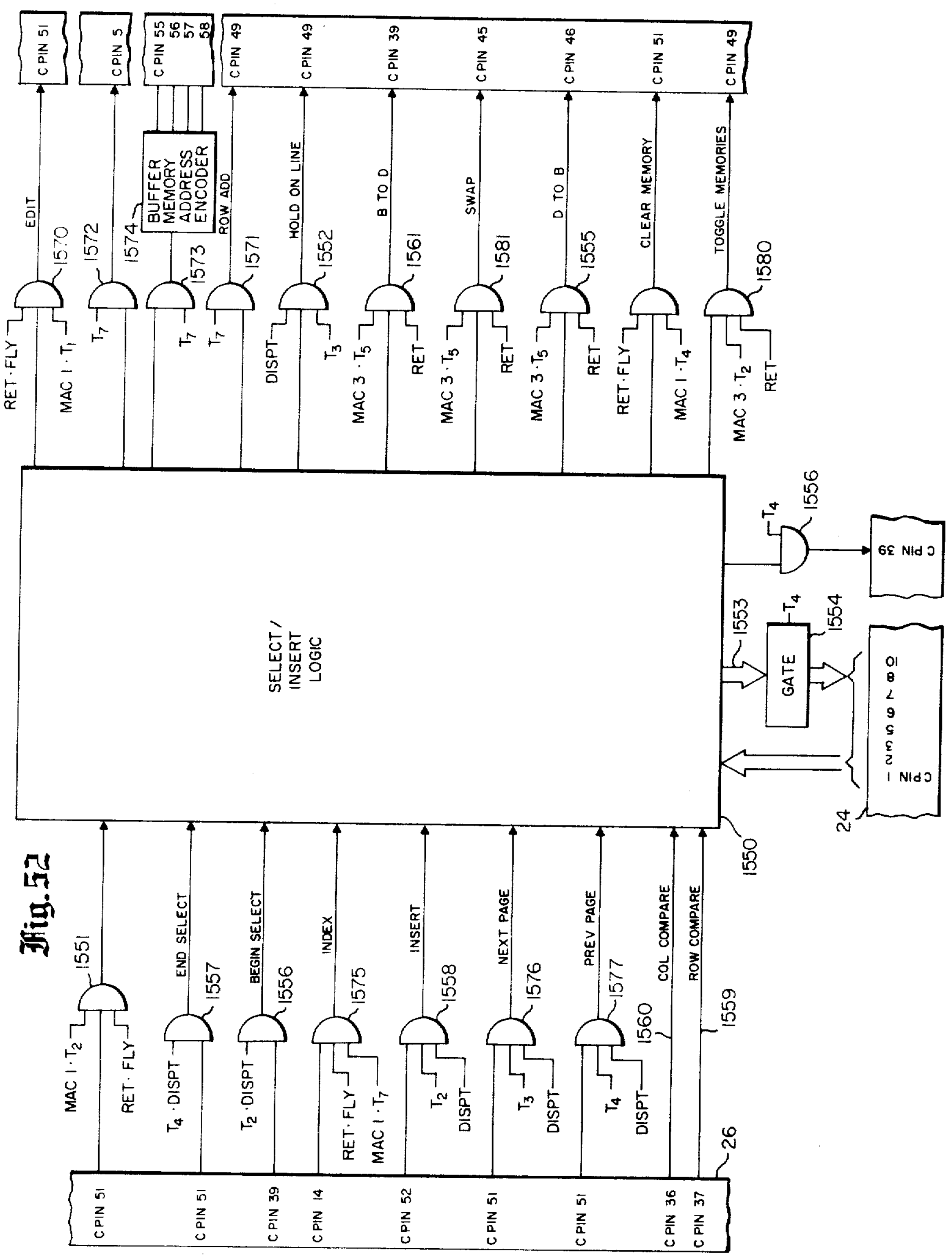
FIG. 52 is a block diagram of the Select/Insert Subsystem.

Referring to FIG. 52, the select/insert logic 1550 is in two-way communication with the data bus 24. When it is desired to utilize the select/insert operation, the operator first determines the beginning and ending of the portion of the selected text. If either the beginning or the end of the selected text falls in the middle of an existing line of text, the operator first isolates the portion selected. For example, if the beginning of the selected text is in the middle of a line, the operator positions the cursor under the first letter of the selected text, and depresses the edit key to perform the previously discussed edit operation in which a line is opened up below the line containing the cursor, and the portion of the text to the right of the cursor is dropped down to the newly created line. The operator then goes to the end of the selected text portion and edits the balance of the line that is to remain with the displayed page. After the operator has isolated the selected text, he then goes back to the first line of the selected text, and depresses the select key 60*q* (FIG. 2). When this occurs, the select command is issued over C PIN 51 during MAC 1 and time slot $T_2$ of retrace with flyback (see FIG. 13), this signal being received by the select/insert logic 1550 over special control and indicator bus 26 through AND gate 1551. The logic 1550 then issues a hold on line command over C PIN 49 during time slot $T_3$ of display time through AND gate 1552. During the time the first line of selected text is held on line the select/insert logic places a begin select code into the data bus 24 over cable 1553 through gate 1554 during time slot $T_4$ of display time as soon as the character storage location prior to the first letter is reached thereby writing in the code prior to the beginning of the selected text.

The operator then places the cursor under the last letter of the selected text and again depresses the select key. The select/insert logic 1550 then writes an end select code on the data bus through cable 1553 and gate 1554 to write the code into the character position immediately following the last character of the selected text portion. After the portion of the text has been selected, the select/insert logic 1550 then issues a display to buffer command to C PIN 46 through AND gate 1555 during MAC 3 and time slot $T_5$ of retrace whereupon the selected text is transferred from the main or display memory to the buffer memory one line at a time. The logic 1550 determines the beginning and ending of the selected text by means of the begin select indicator which is received over C PIN 39 through AND gate 1556 during time slot $T_2$ of display time, this signal being generated by indicator decoder 640 (FIG. 20*a*). Likewise, and end select indicator signal is received over C PIN 51 through AND gate 1557 during time slot $T_4$ of display time.

To recall the information from the buffer memory, one of several approaches can be used. If it is desired to insert the selected text into another area of the text remaining on the display screen, the operator repositions the cursor by use of the platen knobs and the space bar to the desired location for the insertion. She then depresses the insert key which issues a command over C PIN 52 over AND gate 1558 during time slot $T_2$ of display time. The location is detected by the select/insert logic 1550 by means of the row compare signal received over line 1559 from C PIN 37 and by the column compare signal received over line 1560 from C PIN 36. The logic 1550 then issues a buffer to display command over C pin 39 through AND gate 1561 during MAC 3 and time slot $T_5$ of retrace. The selected text sitting in the buffer memory is then transferred back to the main or display memory a line at a time in the following manner. The cursor position on the display screen has text to the right thereof, the logic 1550 initiates an edit command over C PIN 51 through AND gate 1570 during MAC 1 and time slot $T_1$ of retrace and flyback. This then moves the balance of the line to the right of the cursor to a newly created line below. The logic 1550 then initiates a row add command over C PIN 49 through AND gate 1571 during time slot $T_7$. The actual command is issued over C PIN 5 through AND gate 1572 after the memory has been addressed through AND gate 1573 by enabling the buffer memory address encoder 1574 which applies an address for the buffer memory to C PINS 55 through 58. As the text is transferred from the buffer memory to the display memory one line at a time, after each line another row add operation is performed to enable the insertion of one more of line of text into the main or display memory, with the balance of the text on the page dropping down a line at a time as previously discussed.

If the operator desires to insert the selected text into another page of the document recorded on tape, she then depresses her tape accessing keys, the index key 60*d*, the next page key 60*c*, or the previous page key 60*b* (see FIG. 2), the depression of which issues an index command over C PIN 14 through AND gate 1571 during MAC 1 and time slot $T_7$ of retrace and flyback to the select/insert logic 1550; a next page command over C PIN 51 through AND gate 1576 during time slot $T_3$ of display time to the logic 1550; or a previous page command over C PIN 51 through AND gate 1577 during time slot $T_4$ of display time to logic 1550, respectively. The index command issued to the tape access mechanism drives the tape in reverse to display a table of contents, while the next page key drives the tape forward to the next stored page of information in the document, and the previous page key drives the tape backward to the page on the document previous to the displayed page. Once the operator determines the location in the document for the insertion, she then positions the cursor by means of the platen knobs and the space bar to the point of the desired insertion whereupon the select/insert logic issues an edit command, if necessary, then the row add command, and then the buffer memory to display memory command to transfer the contents.

If the operator has selected the entire page by positioning the cursor at the beginning of the top left of the page, depressing the select key, then positioning the cursor at the bottom of the right of the page, and again depressing the select key, the select/insert logic can transfer the entire page to another page location within a document by simply issuing a toggle memories command over C PIN 49 through AND gate 1580 during MAC 3 in time slot $T_2$ of retrace. This command completely interchanges the main or display memory with the buffer memory which is possible since both memories are identical, 60 line, 128 characters per line memories. Other commands issued by the select/insert logic 1550 are the Swap command over C PIN 45 through AND gate 1581 during MAC 3 and time slot $T_5$ of retrace and the clear memory command over C PIN 51 during MAC 1 and time slot $T_4$ of retrace with flyback. The former command transfers a line of information from the display memory to the buffer memory while also transferring a line of memory from the buffer memory to the display memory while the latter command clears the memory by the insertion of NUL blanks into all character storage locations.

As can be seen by the utilization of two identical memories, two line buffers and a character buffer associated with each of the memories the configuration of the flow of information through the various parts of the memory sub-system enables substantial text manipulation capability by any one of a number of sequences of depression of the keys of the keyboard. While there has been shown and described a preferred embodiment, it is to be understood that various other adaptations and modifications of the invention may be made without departing from the spirit and scope of the invention.

What is claimed is:

1. In an electronic text processing system having a display means and an operator controlled keyboard sub-system for entering into the system encoded data indicative of character information to be displayed and for entering signals indiciative of text manipulation functions to be performed by a processor on the character data so entered, the combination comprising:

a memory having X lines of memory of Y storage locations per line;

means for connecting said keyboard sub-system to said memory whereby encoded data entered in said keyboard is stored in said memory;

first and second line buffers each having Y storage locations;

a character buffer having at least one character storage location;

means for interconnecting said memory, first line buffer, second line buffer and character buffer whereby the encoded data stored in a predetermined line of said memory is connected from said predetermined line of memory to said first line buffer to said character buffer and then from said character buffer to said second line buffer and back to said predetermined line of said memory; and control means responsive to signals indicative of text manipulating functions selected by the operator for interconnecting said memory, first line buffer, second line buffer and character generator whereby the encoded data is connected from said character buffer to a preselected one of said first line buffer, said second line buffer and said predetermined line of memory.

2. The combination according to claim 1 further including encoding means for generating a code indicative of a blank, said control means including means for inserting such code into at least one of said given line of memory, said first line buffer and said second line buffer.

3. The combination according to claim 2 wherein said control means includes toggle means for selectively interchanging said first and second line buffers.

4. The combination according to claim 1 further including timing means for generating a first pulse indicative of the time for a retrace cycle of the display means and a second pulse indicative of a flyback cycle of the display means, said control means being enabled at least in part by at least one of said first and second pulses.

5. The combination according to claim 4 further including row counting means for providing a count corresponding to the line of memory flowing through said first line buffer, said control means being enabled at least in part by predetermined ones of said counts.

6. The combination according to claim 5 further including operator controlled means for selecting a line on the display means corresponding to a selected line in memory and other means responsive to said row counting means for generating a row compare pulse when the selected line of memory is flowing through said first line buffer, said control means being enabled at least in part by said row compare pulse.

7. The combination according to claim 6 wherein said operator controlled means provides a visual indicator on the display of the display means and said system further includes means for generating a column compare pulse when the position of the visible indicator within the selected line corresponds to the character storage location in memory, said control means being enabled at least in part by said column compare pulse.

8. In an electronic text processing system having a display means, an operator controlled keyboard subsystem for entering into the system encoded data indicative of character information to be displayed and for entering signals indicative of text manipulation functions to be performed by a processor on the character data so entered, operator controlled means for directing a visible indicator within the text on the display to a particular character location within a line of text, the combination comprising:

- a memory communicating with said keyboard subsystem for storing the encoded data so entered;
- other storage means coupled to said memory for passage therethrough of the encoded data from the memory and back to the memory;
- means for generating a position signal indicative of the line in memory corresponding to the position of the visible indicator in the line selected on the display;
- margin means for storing the orientation of the first displayable character within at least one of said selected line, the first displayable line of text above said selected line, and the first displayable line of text below said selected line;
- control means responsive to a signal selected by the operator and said position signal for selectively and sequentially reconfiguring the passage of the encoded data through said other storage means for transferring at least a portion of the contents of one of said selected line and the line after said selected line to the other of such lines; and
- margin restoration means operative in response to said control means for determining the character storage location of the first displayable character in the line after said selected line in response of said margin storing means.

9. The combination according to claim 8 wherein said means for generating a position signal generates a position signal indicative of the character storage location within the line of memory, said control means opens a line in memory immediately after said selected line, transferring the contents of each line after the selected line to the next succeeding line, said control means then transferring the contents of the line of text within memory to the right of the visible indicator to the newly opened line under control of said margin restoration means with the same margin orientation as the selected line.

10. The combination according to claim 8 further including means for indicating the position of the last displayable character within the selected line, word defining means for sensing a word in the line of text after said selected line, said control means being further responsive to said last displayable character means and said word defining means for transferring to said selected line one word from the line after said selected line, said margin restoration means maintaining the same character storage location of the first displayable character of the balance of the line after said selected line after the transfer of said word.

11. The combination according to claim 10 further including means for defining a right hand margin limit zone, the words being transferred to the selected line a word at a time until the last displayable character of the last word so transferred is within the right hand margin limit zone or the line after said selected line is exhausted of textual information.

12. The combination according to claim 11 further including visual indicator incrementing means, said incrementing means being operative in response to the last displayable character of the last word transferred to the selected line being within the right hand margin limit zone, said incrementing means then repositioning the visible indicator to the next displayable line of text on the display.

13. The combination according to claim 12 further including inhibiting means for inhibiting the incrementing of the visible indicator when the last displayable character of the last word transferred is beyond the right hand margin limit zone.

14. The combination according to claim 8 further including means for determining whether the line in memory after the selected line contains textual information, blank line counting means operable in response to such means, means for operating said control means in response to the absence of textual information for restructuring the memory until the line after said selected line contains textual information, and other means responsive to the completion of the transfer for re-initiating said control means to re-insert the number of blank lines in memory between said selected line and the first line of text thereafter under the control of said blank line counting means.

15. The combination according to claim 10 further including means for defining a right hand margin limit zone, said control means being operative for one cycle as a word is transferred, and other means are provided for recycling said control means successively until the last word so transferred is at least partially within said right hand margin limit zone.

* * * * *